United States Patent
Takeda et al.

(10) Patent No.: US 8,599,991 B2
(45) Date of Patent: Dec. 3, 2013

(54) BOILING WATER REACTOR, CORE OF BOILING WATER REACTOR AND FUEL ASSEMBLY

(75) Inventors: Renzo Takeda, Kawasaki (JP); Junichi Miwa, Mito (JP); Kumiaki Moriya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/018,986

(22) Filed: Jan. 24, 2008

(65) Prior Publication Data
US 2008/0205576 A1  Aug. 28, 2008

(30) Foreign Application Priority Data
Feb. 28, 2007  (JP) ................. 2007-049190

(51) Int. Cl.
*G21C 5/02* (2006.01)
*G21C 15/00* (2006.01)
*G21C 5/00* (2006.01)

(52) U.S. Cl.
USPC ........... 376/370; 376/207; 376/209; 376/210; 376/347; 376/361; 376/366; 376/409; 376/426; 376/434; 376/458

(58) Field of Classification Search
USPC ......... 376/409, 207, 209, 210, 260, 261, 264, 376/267, 347, 361, 366, 370–380, 426, 42, 376/434, 438, 458
See application file for complete search history.

(56) References Cited

U.S. PATENT DOCUMENTS

| | | | | |
|---|---|---|---|---|
| 3,910,818 A | * | 10/1975 | Sofer | 376/210 |
| 4,587,089 A | * | 5/1986 | Takeda et al. | 376/428 |
| 4,851,181 A | * | 7/1989 | Takeda et al. | 376/267 |
| 5,145,635 A | * | 9/1992 | Ishii et al. | 376/373 |
| 5,377,247 A | * | 12/1994 | Yoshioka et al. | 376/428 |
| 5,812,621 A | * | 9/1998 | Takeda et al. | 376/171 |
| 6,512,805 B1 | * | 1/2003 | Takeda et al. | 376/171 |
| 7,215,729 B1 | * | 5/2007 | Yokomizo et al. | 376/370 |
| 2003/0026380 A1 | | 2/2003 | Anegawa et al. | |
| 2006/0210009 A1 | | 9/2006 | Takeda et al. | |

FOREIGN PATENT DOCUMENTS

| | | |
|---|---|---|
| EP | 0 691 657 | 1/1996 |
| JP | 03-191897 | 8/1991 |
| JP | 04-357493 | 12/1992 |

(Continued)

OTHER PUBLICATIONS

Franklin, D. et al., Zirconium in the Nuclear Industry: Sixth International Symposium, 1984, ASTM International, p. 747-762.*
Holdstock, D. et al., Hiroshima and Nagasaki: Retrospect and Prospect, 1995, Routledge, p. 25.*
Pellaud, Proliferation aspects of plutonium recycling, 2002, Journal of the Institute of Nuclear Material Management, pp. 1-9.*
R. Takeda et al., General Features of Resource—Renewable (RBWR) and Scenario of Long-term Energy Supply, Global '95 Versailles, France, Sep. 1995, International Conference on Evaluation of Emerging Nuclear Fuel Cycle System.
G.A. Ducat, et al, Evaluation of the Parfait Blanket Concept for Fast Breeder Reactors, AEC Research and Development Report, Jan. 1974, Cambridge Masachusetts.

*Primary Examiner* — Bernarr Gregory
(74) *Attorney, Agent, or Firm* — Antonelli, Terry, Stout & Kraus, LLP.

(57) ABSTRACT

A boiling water reactor has a core disposed in the reactor pressure vessel and loaded with a plurality of fuel assemblies including transuranic nuclides. A ratio of Pu-239 in all of the transuranic nuclides included in the fuel assembly, which is loaded in the core, with a burnup of 0 is 3% or more but 45% or less. In the fuel assembly having a channel box and a plurality of fuel rods disposed in the channel box, a transverse cross section of a fuel pellet in the fuel rod occupies 30% or more but 55% or less of a transverse cross section of a unit fuel rod lattice in the channel box.

74 Claims, 40 Drawing Sheets

(56) References Cited

FOREIGN PATENT DOCUMENTS

| JP | 04357493 A | * 12/1992 |
| JP | 07-092288 | 4/1995 |
| JP | 8-21890 | 1/1996 |
| JP | 2000-019280 | 1/2000 |
| JP | 3428150 | 5/2003 |
| JP | 2003-222694 | 8/2003 |
| JP | 2006-208226 | 8/2006 |

* cited by examiner

○ FRESH FUEL ASSEMBLY 1A
▨ ONCE-BURNED FUEL ASSEMBLY 1B
▦ TWICE-BURNED FUEL ASSEMBLY 1C
▓ THREE-TIMES BURNED FUEL ASSEMBLY 1D

INNER REGION

OUTERMOST PERIPHERAL REGION

○ FRESH FUEL ASSEMBLY 1A
◐ ONCE-BURNED FUEL ASSEMBLY 1B
⬣ TWICE-BURNED FUEL ASSEMBLY 1C
⊞ THREE-BURNED TIMES FUEL ASSEMBLY 1D
▦ FOUR- BURNED TIMES FUEL ASSEMBLY 1E

FRESH FUEL ASSEMBLY 1A

ONCE-BURNED FUEL ASSEMBLY 1B

TWICE-BURNED FUEL ASSEMBLY 1C

THREE-TIMES BURNED FUEL ASSEMBLY 1D

○ FRESH FUEL ASSEMBLY 1A
 ONCE-BURNED FUEL ASSEMBLY 1B
 TWICE-BURNED FUEL ASSEMBLY 1C
 THREE-TIMES BURNED FUEL ASSEMBLY 1D

○ FRESH FUEL ASSEMBLY 1A
▨ ONCE-BURNED FUEL ASSEMBLY 1B
▩ TWICE-BURNED FUEL ASSEMBLY 1C
▦ THREE-TIMES BURNED FUEL ASSEMBLY 1D

☐ FRESH FUEL ASSEMBLY 1a

▨ ONCE-BURNED FUEL ASSEMBLY 1b

▨ TWICE-BURNED FUEL ASSEMBLY 1c

▦ THREE-TIMES BURNED FUEL ASSEMBLY 1d

■ FOUR-TIMES BURNED FUEL ASSEMBLY 1e

FRESH FUEL ASSEMBLY 1A

ONCE-BURNED FUEL ASSEMBLY 1B

TWICE-BURNED FUEL ASSEMBLY 1C

THREE-TIMES BURNED FUEL ASSEMBLY 1D

FRESH FUEL ASSEMBLY 1A

ONCE-BURNED FUEL ASSEMBLY 1B

TWICE-BURNED FUEL ASSEMBLY 1C

THREE-TIMES BURNED FUEL ASSEMBLY 1D

BOILING WATER REACTOR, CORE OF BOILING WATER REACTOR AND FUEL ASSEMBLY

CLAIM OF PRIORITY

The present application claims priority from Japanese application serial no. 2007-049190, filed on Feb. 28, 2007, the content of which is hereby incorporated by reference into this application.

BACKGROUND OF THE INVENTION

The present invention relates to a light water reactor, a core of the light water reactor and fuel assembly, and more particularly, to a light water reactor, a core of the light water reactor and fuel assembly preferably applied to a boiling water reactor.

When actinide nuclide, which has many isotopes and is included in a nuclear fuel material in a fuel assembly loaded in a core of a light water reactor, burns in a core, the actinide nuclide to transfers among isotopes in succession by nuclear transmutation such as nuclear fission and neutron absorption. Since odd-numbered nucleus that has a large nuclear fission cross section with respect to a resonance and thermal neutrons, and even-numbered nucleus that undergoes fission only for fast neutrons are present as the actinide nuclide, in general, present ratios of the isotopes present in the actinide nuclides included in the fuel assembly largely change as the actinide nuclides burn. It is known that this present ratio change depends on the neutron energy spectrum at the position at which the fuel assembly is loaded in the core.

Current light water rectors use slightly enriched uranium as nuclear fuel. However, since the natural uranium resource is finite, it is necessary to successively replace fuel assemblies used in the light water reactor with recycled fuel assemblies including a nuclear fuel material which is formed by enriching depleted uranium, which is a residual after uranium enrichment, with the transuranic nuclide (TRU) extracted from spent fuel assemblies in the light water reactor. TRU needs to be recycled as a useful resource over a very long period predicted to be necessary for commercial reactors, and during this period, the amount of TRU needs to always increase or to be maintained nearly constant. JP 3428150 B describes technology to implement a breeder reactor in which the amount of fissionable Pu is increased or maintained nearly constant in light water reactors that occupy most of the current commercial reactors. In a light water reactor in which the breeder reactor described in JP 3428150 B and R. TAKEDA et al., "General Features of Resource-Renewable BWR (RBWR) and Scenario of Long-term Energy Supply", Proc. of International Conference on Evaluation of Emerging Nuclear Fuel Cycle Systems. GLOBAL '95 Versailles, France, September, 1995, P. 938 is became a reality, a plurality of fuel assemblies, each of which has a hexagonal transverse cross section, are disposed in the core, each fuel assembly being formed by closely arranging a plurality of fuel rods in a triangular grid. In the core of this light water reactor, the amount of water around the fuel rods is lessened due to the close arrangement of the fuel rods, and thereby the ratios of resonant energy neutrons and fast energy neutrons are increased. In addition, the height of a mixed oxide fuel section of the TRU is reduced and blanket zones loaded with depleted uranium are disposed above and below the mixed oxide burning part so as to maintain a negative void coefficient, which is a safety criterion. The core is formed in two stacked stages by applying the concept of a parfait-type core described in G. A. Ducat et al., Evaluation of the Parfait Blanket Concept for Fast Breeder Reactors, MITNE-157, ABSTRACT, January, 1974, thereby a breeding ratio of 1 or more is ensure, keeping the economy.

To recycle TRU, the reprocessing of spent fuel is indispensable. Due to a fear that consumer TRU is diverted to weapons of mass destruction, there has been an increasing demand for nuclear non-proliferation and thereby restrictions on TRU recycling have been severe.

It is certain that an electric power generating system superior to a fission reactor is put into practical use on some day in the future. At that time, the value of TRU is lowered from a very useful fuel equivalent to enriched uranium to a cumbersome long-lived waste material. Accordingly, the most important object in nuclear power development is to establish a TRU disposal method.

SUMMARY OF THE INVENTION

At present, there is a result that only Pu out of TRU included in spent fuel of a light water reactor was burnt only once, but multi-recycling of Pu and TRU is considered to be impossible. Since a fast neutron field is considered to be effective in TRU burning, development is proceeding in two ways, that is, one method for stopping a beam from an accelerator even in a system having a positive reactivity coefficient so as to ensure safety by an accelerator driven system (ADS) obtained by combining a sub-critical system and a large accelerator, and another method for using a fast breeder reactor (FBR). However, the development in these methods remains in a scenario in which the weight of TRU is partially reduced.

The light water reactors described in JP 3428150 B and R. TAKEDA et al., "General Features of Resource-Renewable BWR (RBWR) and Scenario of Long-term Energy Supply" Proc. of International Conference on Evaluation of Emerging Nuclear Fuel Cycle Systems. GLOBAL '95 Versailles, France, September, 1995, P. 938, in which TRU is recycled, are thermally restricted by a maximum linear heat generating rate (MLHGR), which stipulates the temperature at the center of each fuel pellet, and a minimum critical power ratio (MCPR), which prevents a cladding tube of the fuel rod from being burnt out. The limitation by the MCPR has prevented the improvement of the core performance. During a transition to the recycling age, TRU elements with different ratios of isotopes are supplied from the core, which is loaded with uranium fuel, in the light water reactor. Accordingly, various reactivity coefficients, which are important restrictive conditions from the viewpoint of safety, are worsened and a margin for the restrictive conditions is lessened. This forces the recycling to stop and thereby the multi-recycling may not be realized.

Recently, nuclear non-proliferation has attracted much attention on a worldwide scale, making it difficult to use TRU, which may be diverted to weapons of mass destruction, in consumer applications. Accordingly, a system that can recycle TRU with a high nuclear proliferation resistance, in which the ratio of Pu-239 is small, is demanded.

If recycling is repeated to have TRU disappear, only fissionable odd-numbered nuclides disappear first and the ratio of the even-numbered nuclides, in which only fast energy neutrons undergo nuclear fission, increases. Accordingly, criticality cannot be maintained and thus nuclear fission chain reaction cannot be continued, or reactivity coefficients, which are provided as restrictive conditions for safety, become positive, so the TRU disappearance work has to be canceled in an incomplete state. These problems are examples to be solved to realize multi-recycling.

light water reactor, a core of the light water reactor and fuel assembly that has a large nuclear proliferation resistance while satisfying restrictive conditions for safety, can increase a burnup, and can perform multi-recycling.

The present invention for achieving the above object is characterized in that the ratio of Pu-239 in all transuranic nuclides included in a fuel assembly, which is loaded in a core, with a burnup of 0 is within the range from 3% to 45%, and that the fuel assembly having a channel box and a plurality of fuel rods disposed in the channel box, is such that the transverse cross section of fuel pellets in the fuel rods occupies 30% to 55% of the transverse cross section of a unit fuel rod lattice in the channel box.

Another aspect of the present invention that can attain the above object provides a light water reactor characterized in that there are a core loaded with a plurality of fuel assemblies including transuranic nuclides, a coolant supplying apparatus for supplying a coolant to the core, and a coolant flow rate control apparatus for adjusting a flow rate of the coolant supplied to the core by controlling the coolant supplying apparatus, wherein the coolant flow rate control apparatus sets a coolant flow rate in an operation cycle to a set coolant flow rate, which is determined from a ratio of Pu-239 in transuranic nuclides included in a fuel assembly with a burnup of 0, which is loaded in the core before an operation starts in the operation cycle, so that the ratios of a plurality of isotopes of transuranic nuclides present in the core upon the completion of the operation in the operation cycle are substantially the same as the ratios of the plurality of isotopes in a state in which the operation in the operation cycle can be started.

According to the present invention, a nuclear proliferation resistance can be increased while restrictive conditions for safety are satisfied, a burnup can be increased, and multi-recycling can be performed.

DETAILED DESCRIPTION OF THE PREFERRED EMBODIMENTS

Figure 1:
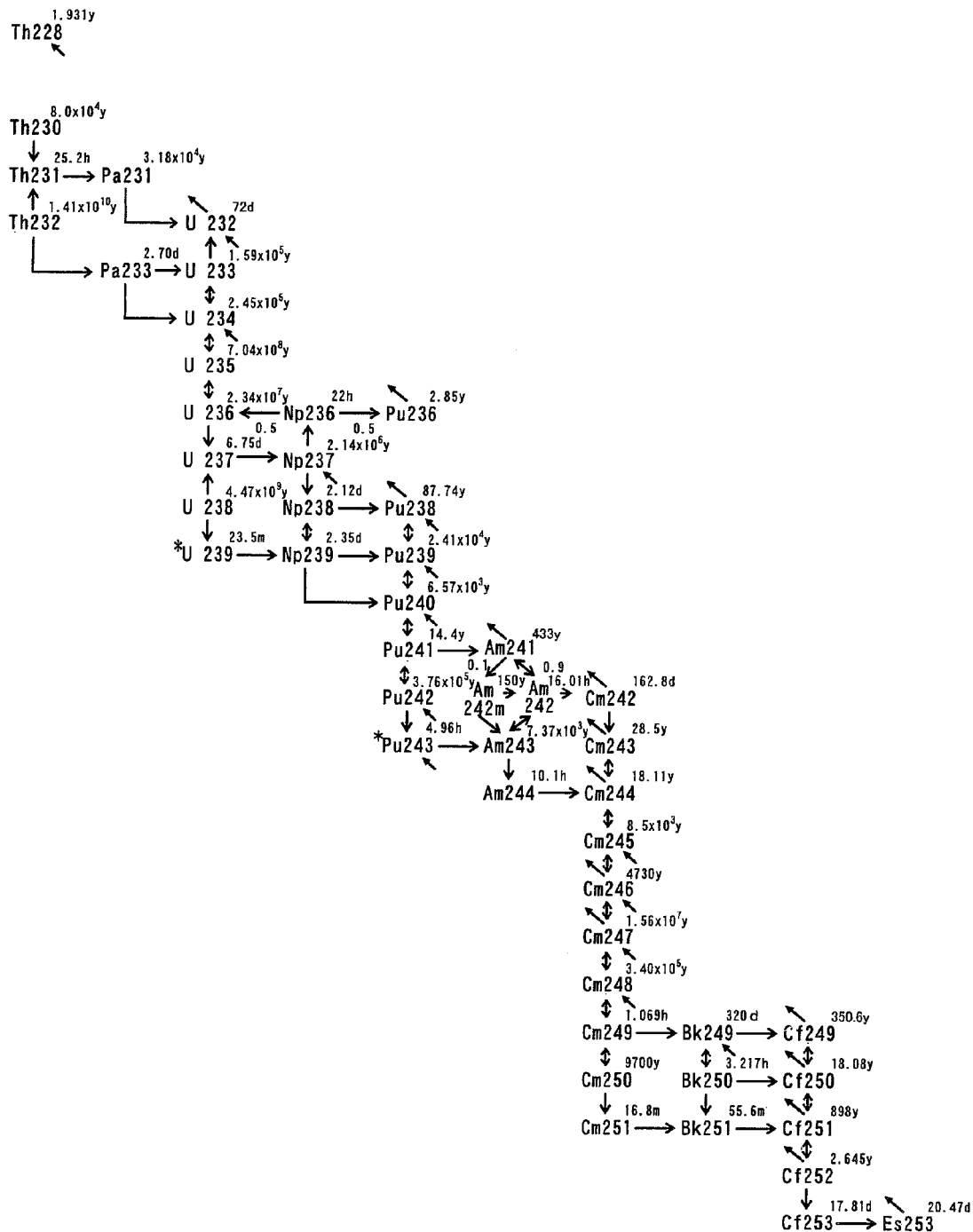
FIG. 1 is an explanatory diagram showing a generation and decay chain of actinide nuclides.

A Na-cooled fast nuclear reactor with the aim of breeding TRU is designed so that neutron flux, in a fast neutron field having a high ν value, which indicates the number of neutrons generated in a single nuclear fission, is increased as much as possible in order to increase a breeding ratio. The design of the fast core focuses only on fissionable Pu that is important to maintain criticality, that is, Pu-239 and Pu-241. A light water breeder reactor also applies this design idea, and is reduced the amount of water used to moderate neutrons to a minimum amount necessary to cool fuel rods so as to increase the neutron energy in the field. Light water used as a coolant in a light water reactor classified as a thermal neutron reactor has two major features, as compared with heavy water, graphite, Na, Pb, and the like as coolants used in other type of reactors.

First, many neutrons can be supplied to the resonance and thermal regions, which occupy a major part in a neutron capturing cross section used by the even-numbered nuclides to transfer to the odd-numbered nuclides because a hydrogen atom in light water used to moderate neutrons has almost the same mass as the neutron and has a high slowing down power.

Second, a fast neutron flux at 0.1 MeV or higher is higher than in other systems and thus many neutrons can be supplied even to a high energy region that contributes to fast nuclear fission of the even-numbered nuclides because a scattering cross section of the hydrogen atom is as large as about 20 barns in a range from thermal energy to about 10 keV, and the scatting cross section rapidly starts to decrease around 10 keV, and falls to 10 barns at 200 keV, to 2 barns or less at 4 MeV or higher, and to 1 barn at 10 MeV which is smaller than the entire cross section of Na.

The inventors noted not only fissionable Pu but also all TRU nuclides with the above two features sufficiently taken into consideration, and newly found that because reactor cooling water, which is a feature of a boiling water reactor (BWR), which is one type of light water reactor, is separated in a channel box in each fuel assembly, fuel assemblies having different internal fuel assembly structures can be loaded in a single core. Another new finding of the inventors is that when fuel assemblies having different isotope ratios need to be loaded in a core, if the ratio of Pu-239 present in TRU is maintained at a fixed value or less, a light water reactor that can cause TRU to be increased, maintained at a fixed level, or immediately reduced with a sufficient thermal margin while maintaining a negative void coefficient can be provided; to maintain the ratio of Pu-239 at the fixed value or less, the fuel assembly is used while its isotope ratio is being changed to a desired value by changing water-to-fuel volume ratio of the fuel assembly to change the neutron energy spectrum, a function for changing the neutron energy spectrum is used to adjust the ratio of isotopes by core flow rate control, and recycling is performed under a condition that the TRU isotope ratio is substantially fixed between each of cycles.

The present invention aims to expand functions of a recycling type of light water reactor and improve its performance. In a case where the performance of a breeder reactor may need to be improved in the light water reactor described in JP 3428150 B, and in a case where TRU that is considered to be discarded as a long-lived radioactive waste when the TRU becomes unnecessary may be used as a nuclear fuel and all TRU elements other than TRU elements for one core may be finally undergo nuclear fission, such present invention was devised to increase the burnup of a fuel assembly including TRU and enable TRU multi-recycling by the inventors.

An overview of a parfait-type core will be now described. The parfait-type core has fuel assemblies, which are new fuel assemblies with a burnup of 0, including a lower blanket zone, a lower fissile zone, an internal blanket zone, an upper fissile zone, and an upper blanket zone disposed in that order from bottom to top. Therefore, in a parfait-type core as well, a lower blanket zone, a lower fissile zone, an internal blanket zone, an upper fissile zone, and an upper blanket zone are formed from bottom to top. The lower fissile zone and upper fissile zone include TRU oxide fuel (or mixed oxide fuel of a TRU oxide and uranium oxide). A core that lacks the internal blanket zone between the upper blanket zone and the lower blanket zone and includes only a single fissile zone is referred to as a one fissile zone core. The fissile zone in the one fissile zone core also includes TRU oxide fuel (or mixed oxide fuel of a TRU oxide and uranium oxide).

The present invention is intended for the above recycling type of light water reactor and the core of the light water reactor. Study results obtained by the inventors will be described below, in which a BWR core with an electric power of 1350 MW is used as an example; 720 fuel assemblies, each of which includes 271 fuel rods, are loaded in the core, and the breeding ratio is 1.01.

Suppose that this BWR core has conventional fuel assemblies in which a burnup of a core zone including the upper and lower fissile zones and the internal blanket zone and excluding the upper and lower blanket zones described in JP 3428150 B and R. TAKEDA et al., "General Features of Resource-Renewable BWR (RBWR) and Scenario of Long-term Energy Supply" Proc. of International Conference on Evaluation of Emerging Nuclear Fuel Cycle Systems. GLOBAL '95 Versailles, France, September, 1995, P. 938, is 45 GWd/t. If the burnup of these conventional fuel assemblies is further increased without alternation, a problem arises in the BWR core. This problem is caused due to a void coefficient insufficient to maintain criticality, a reduced Pu isotope ratio, a lowered breeding ratio, a change of the void coefficient, which is a safety index, to a positive value, and the like. TRU recycling then has to be stopped in midstream. That is, multi-recycling becomes impossible.

To continue TRU recycling while a BWR having the above BWR core is safely operated, the void coefficient must be maintained within a predetermined range. As a result of the study by the inventors, the inventors found that when a core flow rate, which is a parameter specific to the BWR, is set to a predetermined value to adjust the void fraction of the core and thereby to adjust the neutron energy spectrum, the burnup of the fuel assembly can be increased and the TRU multi-recycling can be achieved. According to the finding by the inventors, when the core flow rate is set, as found by the inventors, the ratios of a plurality of TRU isotopes present in the BWR core upon the completion of a BWR operation in an operation cycle can be made substantially the same as the ratios of the plurality of TRU isotopes present in the BWR core in a state in which the BWR is ready for operation in that operation cycle, for example, in a state immediately before an operation starts in that operation cycle. The void coefficient can also be maintained within a predetermined range (substantially fixed) in that operation cycle. Immediately before the above operation starts, the BWR core includes new fuel assemblies (fuel assemblies having a burnup of 0) and fuel assemblies that have been present in the BWR core for at least one operation cycle. When a certain fuel assembly loaded in the BWR core is noted, the fuel assembly undergoes an operation in, for example, four operation cycles in the BWR core until the fuel assembly is taken out of the BWR core as a spent fuel. When the core flow rate is adjusted, as found by the inventors, the ratios of a plurality of TRU isotopes included in the fuel assembly when the fuel assembly is taken out of the BWR core as a spent fuel can be made substantially the same as the ratios of the plurality of TRU isotopes included in a new fuel assembly to be loaded in the BWR core. The new fuel assembly is yet to undergo an operation in the nuclear reactor and thus its burnup is 0.

For convenience, it is called TRU isotope ratio conservation that, as described above, the ratios of a plurality of TRU isotopes present in the BWR core upon the completion of a BWR operation in an operation cycle can be made substantially the same as the ratios of the plurality of TRU isotopes present in the BWR core in a state in which the BWR is ready for operation in that operation cycle. The ratios of a plurality of TRU isotopes included in the fuel assembly when the fuel assembly is taken out of the BWR core as a spent fuel can also be made substantially the same as the ratios of the plurality of TRU isotopes included in a new fuel assembly to be loaded in the BWR core. This is another aspect of the TRU isotope ratio conservation.

Figure 2:
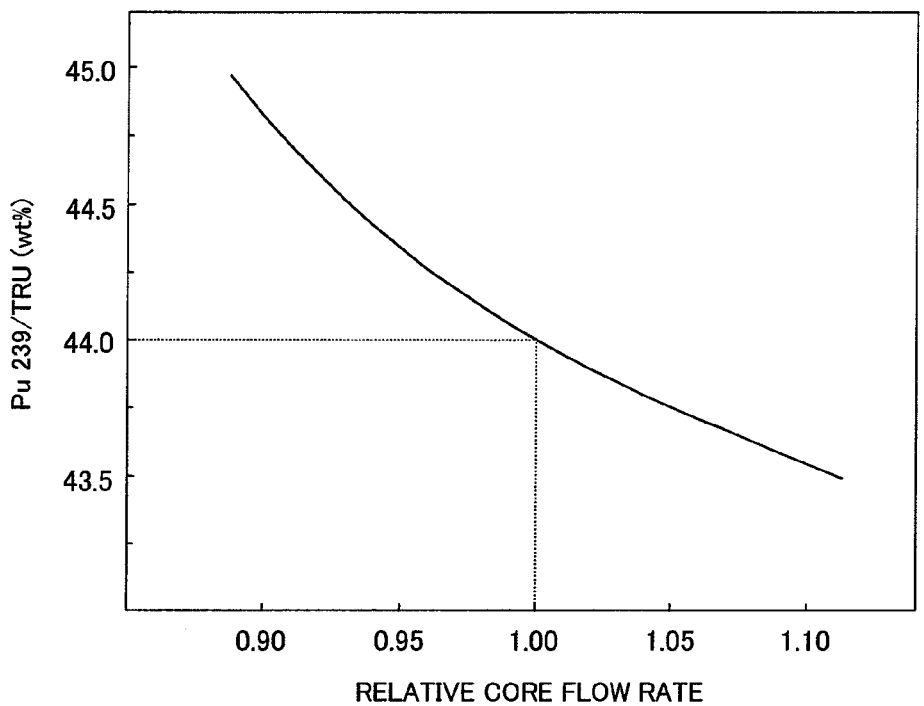
FIG. 2 is a graph showing a relation between relative core flow rate and ratio of Pu-239 in TRU.

The reactor core flow adjustment as described above in the above BWR is performed so that a relative core flow rate determined according to the characteristics shown in FIG. 2 is obtained. FIG. 2 shows the relation between the relative core flow rate and the ratio of Pu-239 in TRU included in a new fuel assembly to be loaded in the core. A core flow rate at which the ratios of TRU isotopes having different ratios of Pu-239 in TRU included in a new fuel assembly can be maintained is determined from FIG. 2. The inventors investigated the composition of the TRU isotopes included in a spent fuel assembly in a light water reactor, and newly found that if a core flow rate is set with the ratio of Pu-239 in TRU taken into consideration, the TRU isotope ratio conservation can be achieved. The above core flow rate is set so that the void coefficient in each operation cycle keeps within a predetermined range. The setting of the core flow rate is performed on the basis of a relative core flow rate (referred to as a set core flow rate), which is determined from FIG. 2 according to the ratio of Pu-239 in TRU included in the new fuel assembly to be loaded in the core. In each operation cycle, when the reactor power reaches at least its rated power, at least the core flow rate has been adjusted and has been set to the above set core flow rate. The core flow rate is maintained at the set core flow rate until the operation cycle is completed. Accordingly, control rods are used in reactor power control.

Another solution to an insufficient reactivity may be to increase the ratio of Pu-239 in TRU in each fuel rod. In the other solution, the ratios of the TRU isotopes in the core upon the completion of an operation cycle cannot be made substantially the same as the ratios at the start of the operation cycle. To make these ratios substantially the same, the core flow rate must be reduced from the set core flow rate, preventing the MCPR standard, which is a thermal restrictive condition, from being satisfied. As a result of a study by the inventors, as shown in FIG. 2, when the ratio of Pu-239 in all TRU elements included in a new fuel assembly was lowered to 45% or less, all restrictive conditions were satisfied, core performance including a high burnup and the like of the fuel assembly could be improved while the 1.01 breeding ratio was maintained, and TRU multi-recycling could be achieved. To further increase the burnup of the fuel assembly and efficiently use TRU by achieving TRU multi-recycling, the ratio of Pu-239 in all TRU elements included in the new fuel assembly is preferably set within a range from 40% to 45%. When the ratio is included in the range, the amount of TRU in the BWR core can be fixed until the operation cycle ends, without being reduced from the amount at the start of the operation cycle. In some cases, the amount of TRU can be increased upon the completion of the operation cycle.

In the description that follows, another BWR core is used as an example. In this BWR core, its electric power is 1350 MW, and 720 fuel assemblies, each of which includes 331 fuel rods, are loaded. The BWR core has a function for making TRU disappear.

When a TRU cycle is repeated to have TRU disappear, only odd-numbered nuclides usually burn first and subcriticality is brought in midstream, leaving non-burnt TRU. This problem can be solved when the ratios of the TRU isotopes are substantially fixed by the above TRU isotope ratio conservation found by the inventors and TRU is burnt. Accordingly, the burnup of the fuel assembly can be further increased and TRU multi-recycling can be achieved. However, to reduce TRU, the ratio of Pu-239 to all TRU elements in TRU must be lowered and the amount of Pu-239 supplied from U-238 for each recycle must be reduced.

Figure 3:
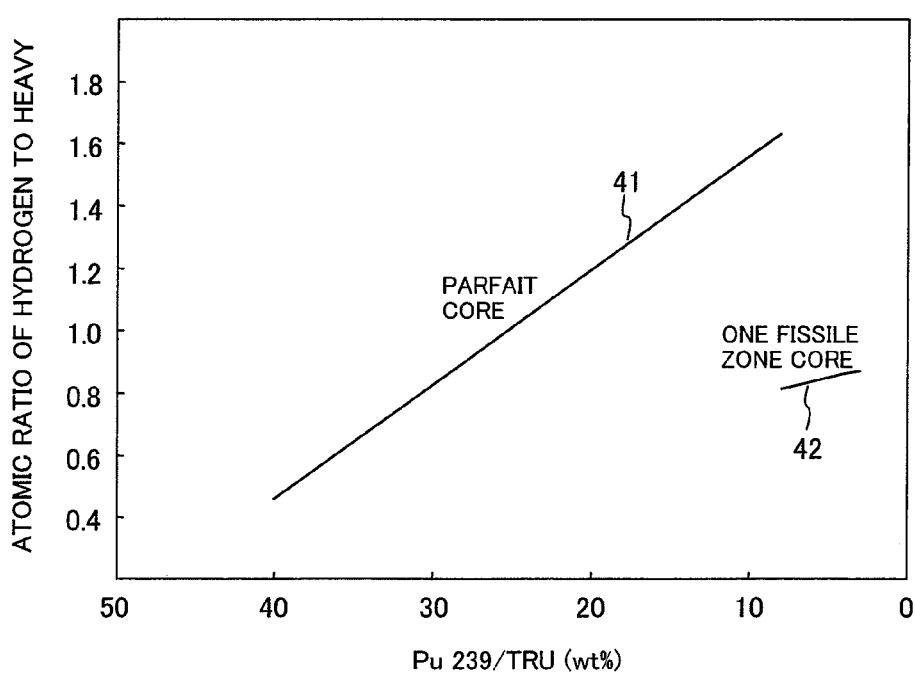
FIG. 3 is a graph showing a relation between ratio of Pu-239 in TRU and atomic ratio of hydrogen to heavy metal.

FIG. 3 indicates a relation between the ratio of Pu-239 in TRU included in a new fuel assembly to be loaded and atomic ratio of hydrogen to heavy metal in a parfait-type core and a one fissile zone core. This relation indicated in FIG. 3 was determined by the inventors, assuming that the TRU isotope ratio conservation can be achieved in each core. Characteristic 41 is concerned with the parfait-type core, and characteristic 42 is concerned with the one fissile zone core. As seen from FIG. 3, when the diameter of the fuel rod in the new fuel assembly is reduced, the ratio of water to TRU is increased (atomic ratio of hydrogen to heavy metal is increased), so the number of each of neutrons in the resonance and thermal region increases. This increase in neutrons promotes the capturing of neutrons of the even-numbered nuclides, increasing the efficiency of nuclear conversion from the even-numbered nuclides to the odd-numbered nuclides and thereby increasing the TRU fission efficiency. Accordingly, TRU can be reduced faster. The TRU fission efficiency is defined as a net amount by which TRU is reduced with respect to a total amount of nuclear fission during the lifetime of the fuel assembly.

Figure 4:
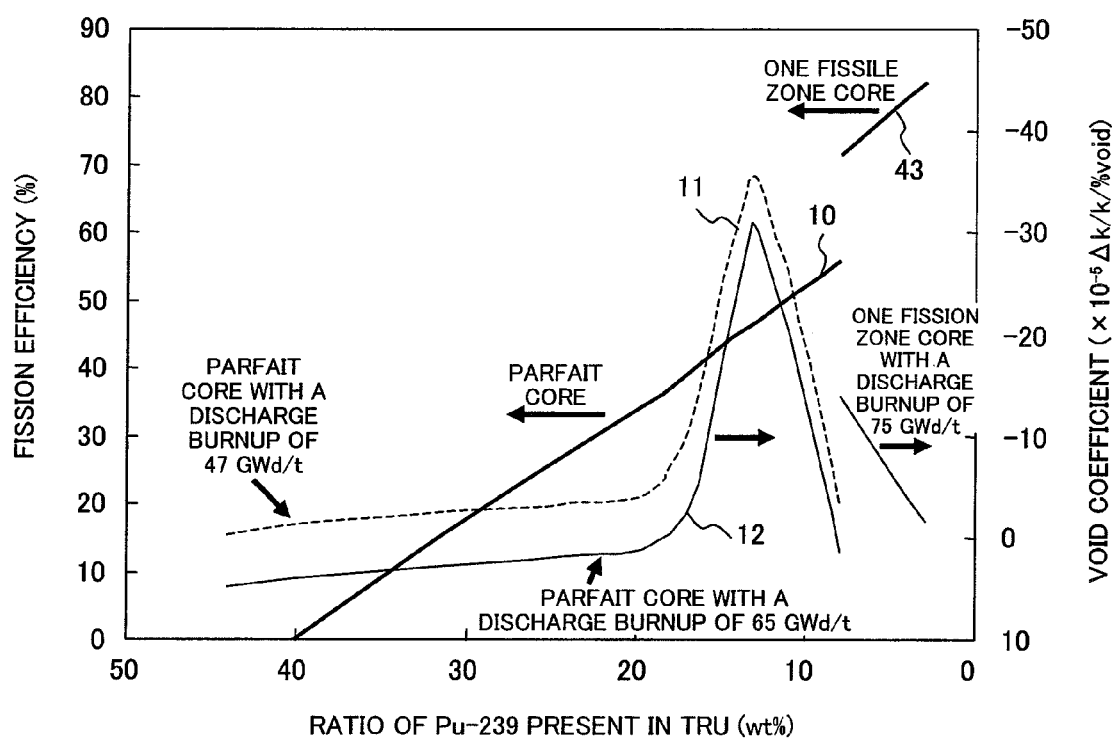
FIG. 4 is a graph showing a relation between fission efficiency of TRU and ratio of Pu-239 in TRU and a relation between void coefficient and the ratio of Pu-239 in TRU.

FIG. 4 indicates a relation between the fission efficiency and the ratio of Pu-239 in TRU included in a new fuel assembly to be loaded in the parfait-type core and a one fissile zone core and a relation between the void coefficient and the ratio of Pu-239 in TRU. The relation between the ratio of Pu-239 in TRU and the fission efficiency is represented by characteristic 10 for the parfait-type core and characteristic 43 for the one fissile zone core. The relation between the ratio of Pu-239 in TRU and the void coefficient is represented by characteristic 11 for the parfait-type core with a core discharge burnup of 47 GWd/t, characteristic 12 for the parfait-type core with a core discharge burnup of 65 GWd/t, and characteristic 44 for the one fissile zone core with a core discharge burnup of 75 GWd/t. As shown in FIG. 4, as long as the ratios of the TRU isotopes are substantially fixed during burn-up, as the ratio of Pu-239 is reduced, the fast energy component having a positive void reactivity component is reduced relative to a core with a breeding ratio of 1. Therefore, the void coefficient in a system in which the ratio of Pu-239 is reduced is maintained negative. The amount of water in the core is larger than the amount of water in a core with a breeding ratio of 1, so there is no problem with MCPR. When the ratio of Pu-239 in all TRU elements falls to less than 8% in the parfait-type core, the ratio of the even-numbered nuclides, which can undergo nuclear fission only in the fast energy region, is increased. Thus, since, to maintain criticality, the height of the core must be increased and thereby the void coefficient becomes positive, the parfait-type core can no longer satisfy the safety standard for light water rectors. In the one fissile zone core as well, which is lower in height more negative in void coefficient than the parfait-type core, when the ratio of Pu-239 in all TRU elements falls to less than 3%, the void coefficient becomes positive, in which case, the one fissile zone core can also no longer satisfy the safety standard for light water rectors. To satisfy the safety standard for light water rectors, the ratio of Pu-239 in all TRU elements must be 8% or more for the parfait-type core and 3% or more for the one fissile zone core. To reduce TRU in the core, the ratio of Pu-239 in all TRU elements must be 8% or more but less than 40% for the parfait-type core and 3% or more but less than 40% for the one fissile zone core. In the one fissile zone core, however, when the ratio of Pu-239 in all TRU elements is 8% or more, even if the TRU fission efficiency is slightly increased, the net amount by which TRU is reduced is lowered because the reactor power of the one fissile zone core is small. When the ratio is 3% or more but 8% or less, the TRU fission efficiency can be further increased and the net amount by which TRU is reduced can also be increased. When the ratio of Pu-239 in all TRU elements falls to 15% or less within the range from 3% or more to less than 40%, the TRU fission efficiency is greatly increased, so TRU can be abruptly reduced.

For both cores, when the ratio by which the transverse cross section of fuel pellet occupies the transverse cross section of a unit fuel rod lattice in a channel box exceeds 55%, the gap between fuel rods is less than 1 mm, making fuel assemblies extremely difficult to assemble. Accordingly, the ratio by which the transverse cross section of fuel pellet to the transverse cross section of a unit fuel rod lattice needs to be 55% or less. When the cross section ratio falls to less than 30%, the fuel rod becomes too thin, reducing the amount of the nuclear fuel material on the transverse cross section is lessened. To compensate for the reduction, the fuel rod must be elongated, making the void coefficient positive. Accordingly, the cross section ratio must be 30% or more.

It is also possible to load a core such as a parfait-type core with a new fuel assembly produced by the use of a nuclear fuel material from which minor actinide has been removed by TRU reprocessing. In this type of core as well, when the core flow rate is adjusted so that it becomes the set core flow rate determined based on the ratio of Pu-239 in all Pu elements included in a new fuel assembly to be loaded in the core, the TRU isotope ratio conservation described above can be achieved. To increase the burnup of a fuel assembly and achieve TRU multi-recycling when a nuclear fuel material from which minor actinide has been removed is used, the ratio of Pu-239 in all Pu elements included in the new fuel assembly must be 3% or more but 50% or less and the ratio of Pu-240 in all Pu elements included in the new fuel assembly must be 35% or more but 45% or less. When the ratio of Pu-239 exceeds 50%, the heat removal capacity is reduced, so the reactor power must be reduced to a value lower than its rated power. This prevents the electric power generation capacity of the BWR from being fully used. From these reasons, the ratio of Pu-239 must be 50% or less. When the ratio of Pu-239 in all Pu elements fall to less than 3%, the void coefficient becomes positive, so the ratio of Pu-239 must be 3% or more. When the ratio of Pu-240 in all Pu elements exceeds 45%, the void coefficient becomes positive, so the ratio of Pu-240 must be 45% or less. When the ratio of Pu-240 in all Pu elements falls to less than 35%, the heat removal capacity is lowered, the electric power generation capacity of the BWR cannot be fully used. Accordingly, the ratio of Pu-240 must be 35% or more.

Embodiments of the present invention will be described below in detail with reference to the drawings.

First Embodiment

A light water reactor according to a first embodiment, which is a preferred embodiment of the present invention, will be described below in detail with reference to FIGS. 1 and 5 to 11 as well as Table 1. The light water reactor of the present embodiment has a core intended to generate 1350-MW electric power.

TABLE 1

| Nuclide | Composition (wt %) |
|---------|--------------------|
| Np-237  | 0.5                |
| Pu-238  | 3.0                |
| Pu-239  | 44.0               |
| Pu-240  | 36.1               |
| Pu-241  | 5.0                |
| Pu-242  | 4.9                |
| Am-241  | 3.7                |

TABLE 1-continued

| Nuclide | Composition (wt %) |
| --- | --- |
| Am-242M | 0.1 |
| Am-243 | 1.3 |
| Cm-244 | 1.0 |
| Cm-245 | 0.3 |
| Cm-246 | 0.1 |

However, the power scale is not limited to this value. It is possible to implement a light water reactor having another power scale to which the present embodiment can be applied by changing the number of fuel assemblies loaded in the core.

Figure 5:
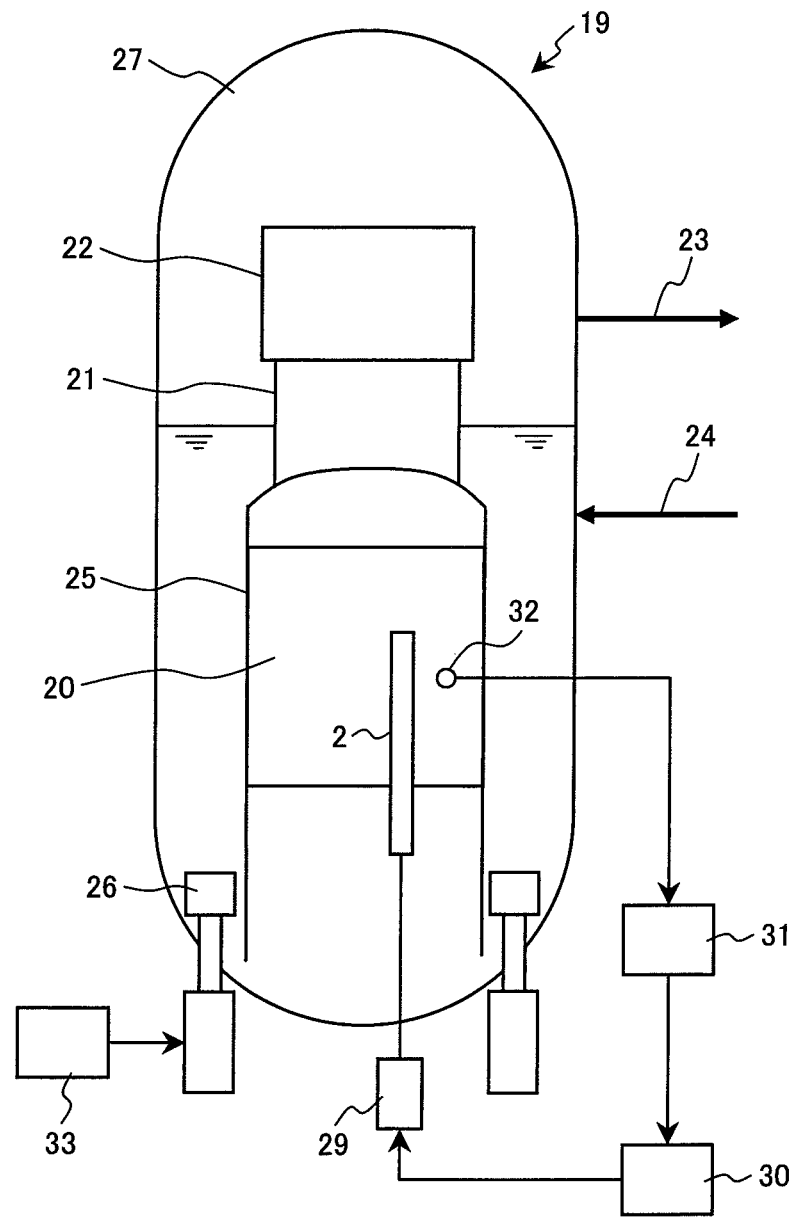
FIG. 5 is a structural diagram showing a light water reactor according to a first embodiment which is a preferred embodiment of the present invention.
Figure 6:
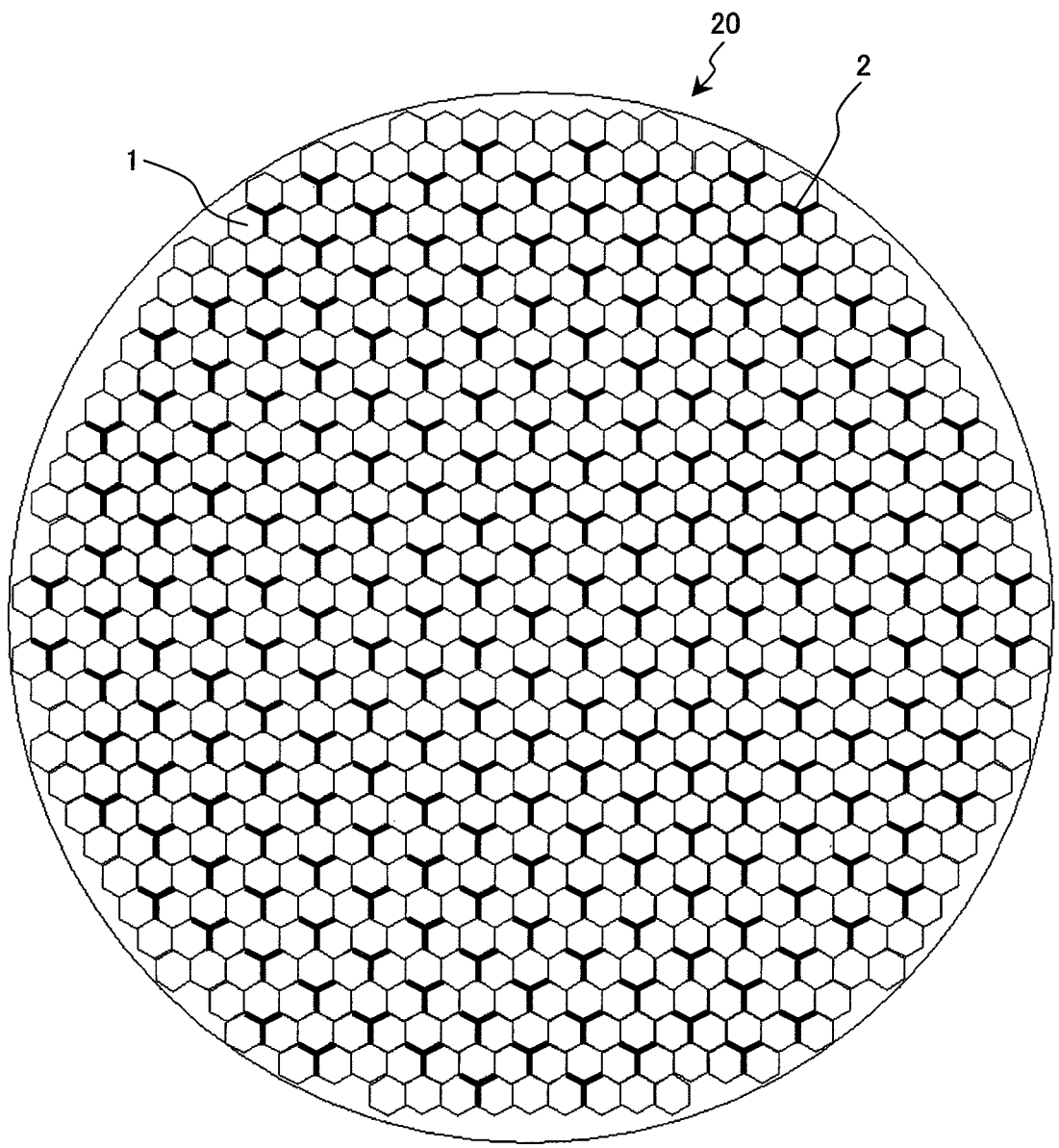
FIG. 6 is a transverse cross sectional view of a core shown in FIG. 5.

The light water reactor in the present embodiment, which is a BWR intended to generate 1350-MW electric power, will be outlined with reference to FIG. 5. The BWR 19 disposes a core 20, a steam separator 21, and a steam dryer 22 in a reactor pressure vessel 27. The core 20 is a parfait-type core, which is surrounded by a core shroud 25 in the reactor pressure vessel 27. The steam separator 21 is disposed above the core 20, and the steam dryer 22 is disposed above the steam separator 21. A plurality of internal pumps 26 are provided at the bottom of the reactor pressure vessel 27. Impellers of each internal pump 26 are disposed in a downcorner formed between the reactor pressure vessel 27 and the core shroud 25. A main steam pipe 23 and feed water pipe 24 are connected to the reactor pressure vessel 27. The core 20 includes 720 fuel assemblies 1 as shown in FIG. 6. A Y-shaped control rod 2 is provided for each three fuel assemblies 1. A total of 223 control rods 2 are insertably disposed in the core 20. Each control rod 2 is linked individually to control rod drive mechanisms 29 disposed at the bottom of the reactor pressure vessel 27. The control rod drive mechanism 29, which is driven by a motor, can fine adjust the motion of the control rod 2 in its axial direction. The control rod drive mechanism 29 performs operation for withdrawing the control rod 2 from the core 20 and inserting the control rod 2 into the core 20. A plurality of local power range monitors (LPRMs) 32, each of which is a neutron detector, are disposed in the core 20. These LPRMs 32 are connected to an average power range monitor (APRM) 31, which is connected to a control rod drive control apparatus 30.

Figure 7:
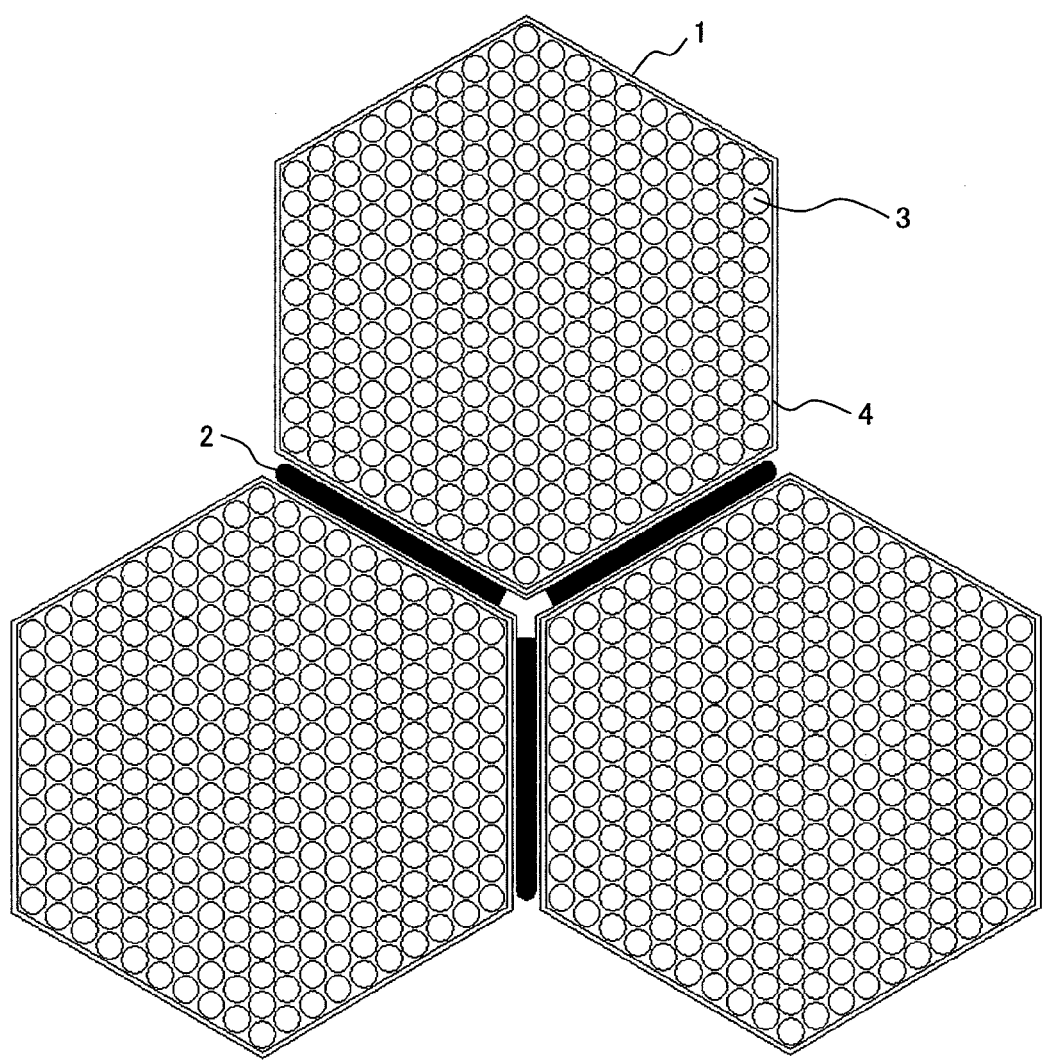
FIG. 7 is an explanatory drawing showing a fuel assembly lattice shown in FIG. 6.

FIG. 7 is a transverse cross sectional view of a fuel assembly lattice. The fuel assembly 1 has 271 fuel rods 3 with a diameter of 10.1 mm in a regular triangle lattice in a channel box 4 being a hexagonal tube. The transverse cross section of the fuel assembly 1 is hexagonal, and the gap between fuel rods 3 is 1.3 mm. A plurality of fuel pellets (not shown) made of a nuclear fuel substance are disposed in a cladding tube (not shown) of the fuel rod 3 so that they are arranged in the axial direction. The fuel rod row in the outermost peripheral layer includes nine fuel rods 3. The transverse cross section of the fuel pellets occupies 54% of the transverse cross section of a unit fuel rod lattice in the channel box 4. The Y-shaped control rod 2 has three blades, which externally extends from a tie rod disposed at the center. These blades, each of which has a plurality of neutron absorbing rods loaded with $B_4C$, are disposed around the tie rod at intervals of 120 degrees. The control rod 2 has a follower made of carbon, which has a smaller slowing down power than light water, in an insertion end, which is first inserted into the core 20.

While the BWR 19 is in operation, the coolant in the downcorner is pressurized by the rotation of the internal pump (coolant supplying apparatus) 26 and then supplied into the core 20. The coolant supplied into the core 20 is introduced to the fuel assemblies 1, and heated by heat generated by nuclear fission of the nuclear fission material, causing part of the coolant to turn into steam. The coolant in a gas-liquid two-phase flow state is introduced from the core 20 to the steam separator 21, where the steam is separated. Moisture including in the separated steam is further removed by the steam dryer 22. The steam from which moisture has been removed is supplied through the main steam pipe 23 to a turbine (not shown), rotating the turbine. A power generator (not shown) linked to the turbine rotates and generates electric power. The steam is exhausted from the turbine and then condensed in a condenser (not shown), turning into condensed water. The condensed water (feed water) is introduced through the feed water pipe 24 to the reactor pressure vessel 27. The liquid coolant separated by the steam dryer 22 is mixed with the feed water and the mixture is pressurized again by the internal pump 26.

Figure 8:
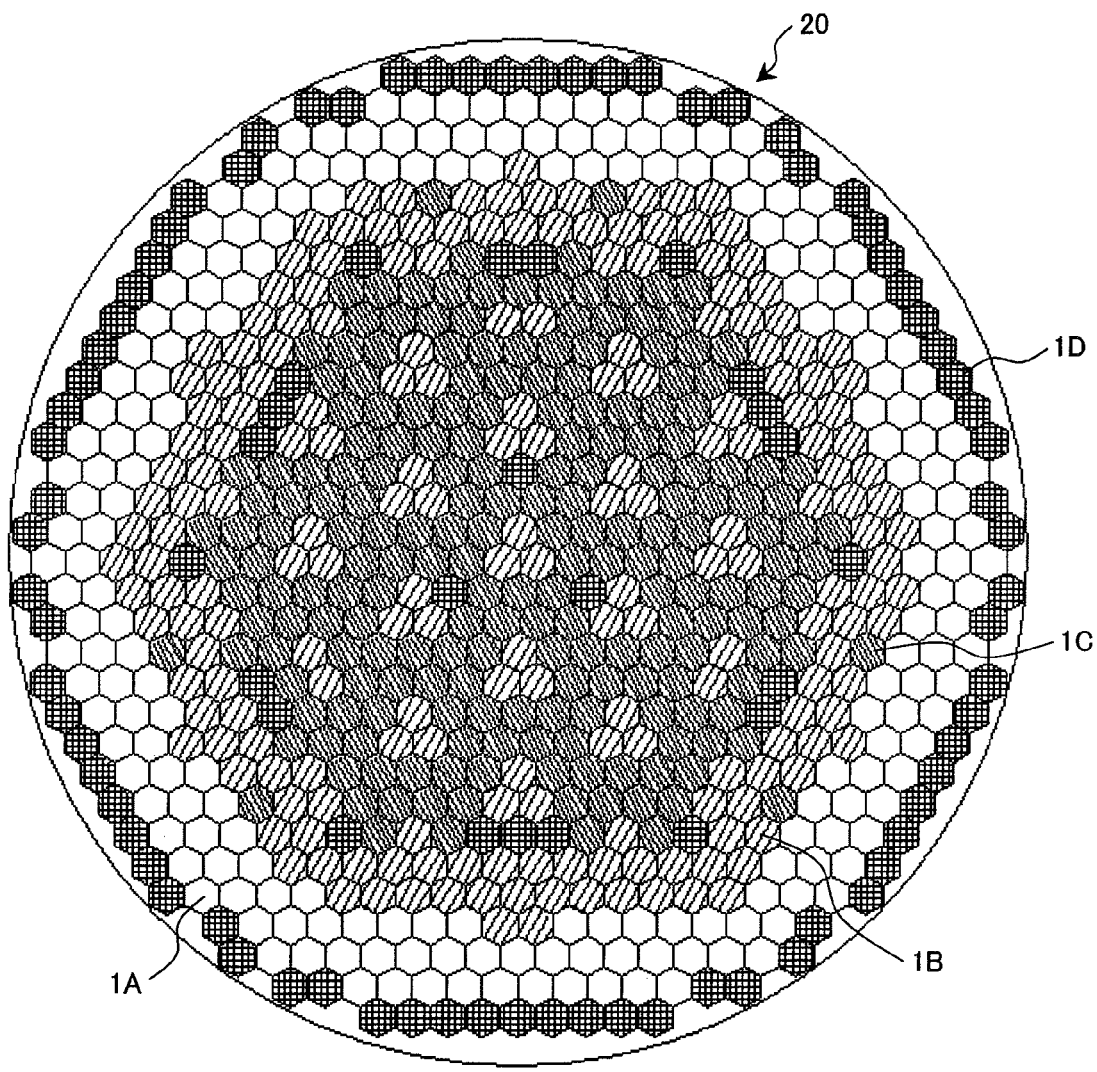
FIG. 8 is an explanatory drawing showing the arrangement of fuel assemblies in an equilibrium core of the core shown in FIG. 6.
Figure 9:
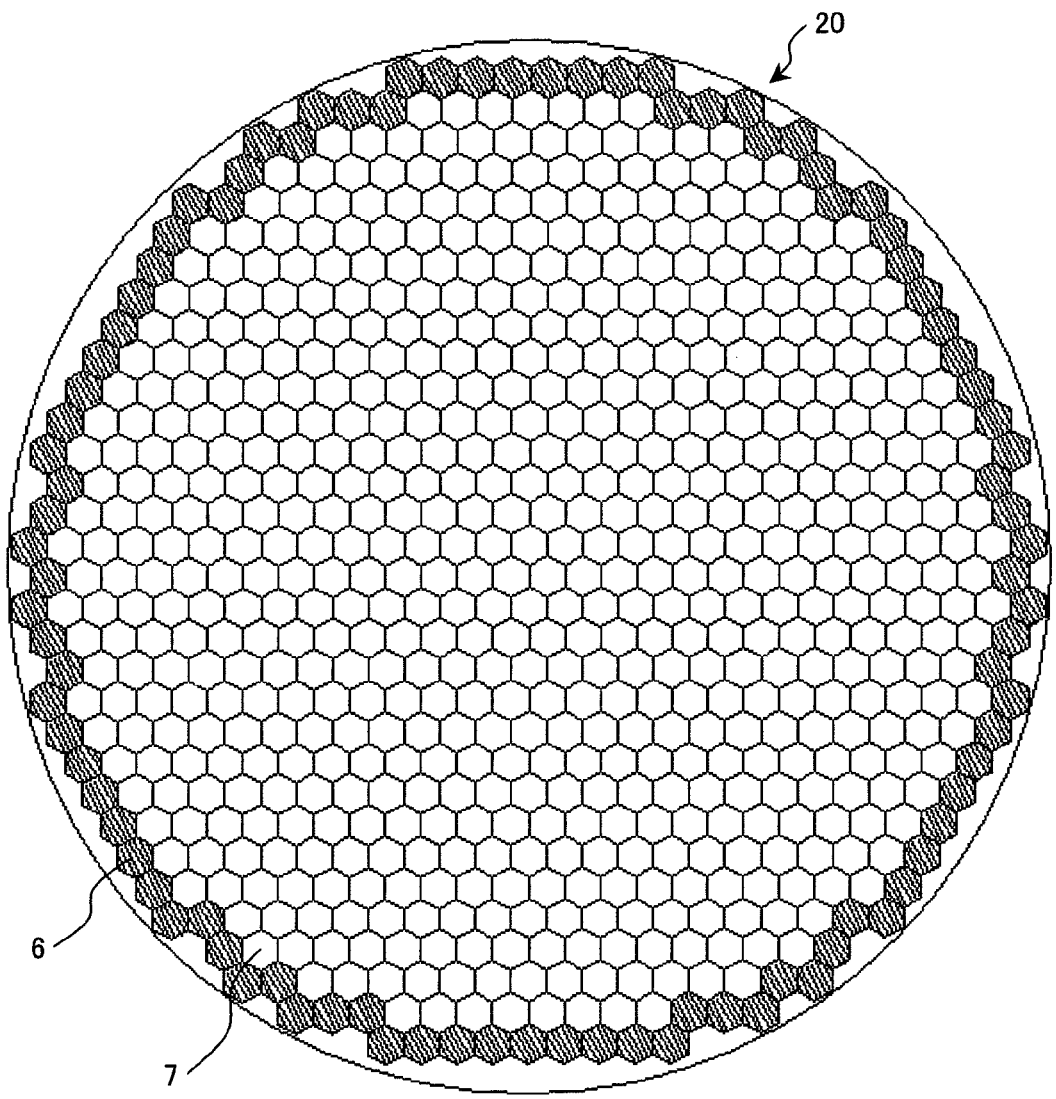
FIG. 9 is an explanatory drawing showing an open distribution of an orifice in the equilibrium core shown in FIG. 8.
Figure 9:
Figure 9:
Figure 10:
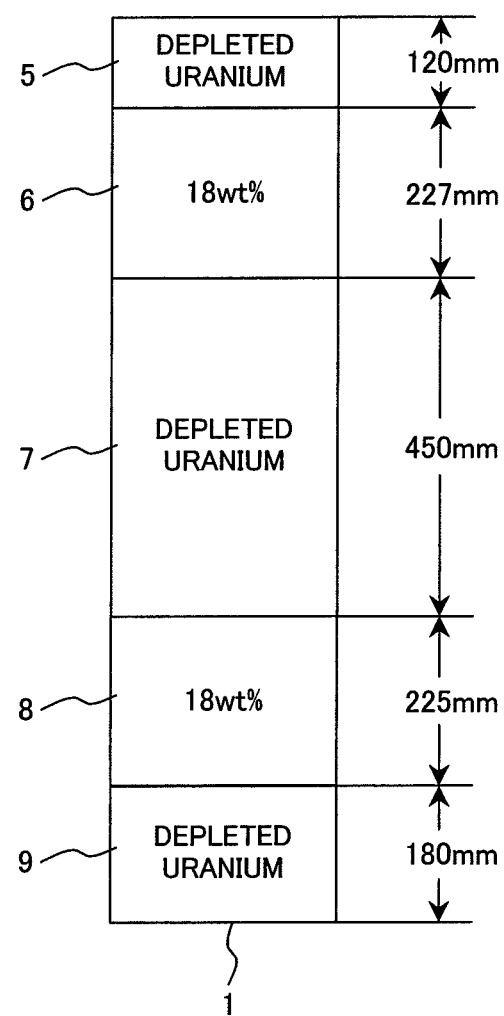
FIG. 10 is an explanatory drawing showing an enrichment distribution of fissionable Pu in a new fuel assembly, in its axial direction, which is to be loaded in an equilibrium core of the core shown in FIG. 6.
Figure 11:
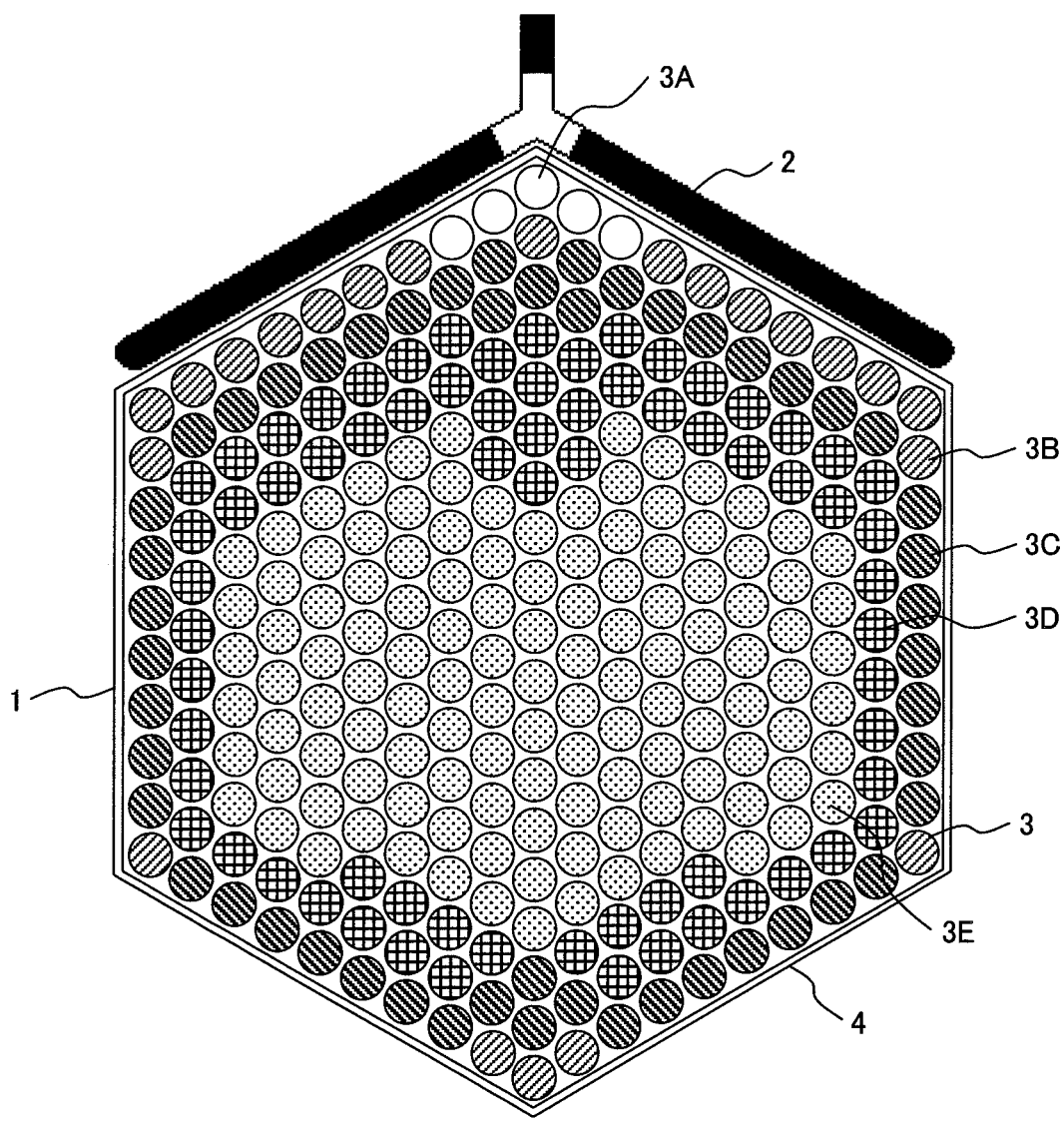
FIG. 11 is an explanatory drawing showing an arrangement of fuel rods having different enrichments of fissionable Pu on the transverse section of a fuel assembly shown in FIG. 7.

The arrangement of the fuel assemblies 1 in the core 20 in a state of an equilibrium core state will be described with reference to FIG. 8. Fuel assemblies 1D in the operation cycle of which is the fourth cycle and staying in the core for the longest time in the in-core fuel dwelling time, are disposed in the outermost peripheral region of the core having a low neutron impedance. A core outer region internally adjacent to the outermost peripheral region includes fuel assemblies 1A, which have the highest neutron infinite multiplication factor and stay in the core in a first cycle in the in-core fuel dwelling time, flattening the power distribution in radial directions of the core. In a core inner region, fuel assemblies 1B, 1C, and 1D, the operation cycles of which are respectively second cycle, third cycle, and fourth cycle in the in-core fuel dwelling time, are dispersed, as shown in FIG. 8. This dispersion flattens the power distribution in the core inner region. Each of the fuel assemblies 1A, 1B, 1C, and 1D is the fuel assembly 1 shown in FIG. 7 and FIGS. 10 and 11 given later. Lower tie plates (not shown) of the fuel assemblies are supported individually by a plurality of fuel supports (not shown) attached to a core plate disposed at the bottom of the core 20. A coolant passage through which the coolant is fed to the fuel assembly is formed in the fuel support. An orifice (not shown) attached in the fuel support is disposed at the inlet of the coolant passage. The core 20 forms two areas in its radial directions, the outer reactor core region 6 and inner reactor core region 7 (see FIG. 9). The orifice disposed in the outermost peripheral region 6, where the power of the fuel assembly 1 is small, has a smaller bore diameter than the orifice disposed in the internal area 7.

The fuel assembly 1 has five zones, which are an upper blanket zone 5, an upper fissile zone 6, an internal blanket zone 7, a lower fissile zone 8, and a lower blanket zone 9, in succession from an upper end of an active fuel length to a lower end of the active fuel length in that order, as shown in FIG. 10. The upper blanket zone 5 is 120 mm high, the upper fissile zone 6 is 227 mm high, the internal blanket zone 7 is 450 mm high, the lower fissile zone 8 is 225 mm high, and the lower blanket zone 9 is 180 mm high. When the fuel assembly 1 is a new fuel assembly with a burnup of 0, each fuel rod 3 of the fuel assembly 1 is loaded with depleted uranium in the three blanket zones and with mixed oxide fuel in the upper fissile zone 6 and lower fissile zone 8, the mixed oxide fuel including 172 parts by weight of depleted uranium per 100 parts by weight of TRU. The enrichment of fissionable Pu in the mixed oxide fuel is 18 wt %. The blanket zones are not loaded with the mixed oxide fuel. In the blanket zones, natural uranium or depleted uranium recovered from spent fuel assemblies may be used instead of the depleted uranium.

The fuel assembly 1 includes five types of fuel rods 3 shown in FIG. 11. These fuel rods 3 are fuel rods 3A to 3E.

The fuel rods 3A to 3E are disposed in the fuel assembly 1, as shown in FIG. 11. In a state the new fuel assembly, the enrichment of fissionable Pu in mixed oxide fuel loaded in the upper fissile zone 6 and lower fissile zone 8 of each of the fuel rods 3A to 3E is 10.7 wt % in the fuel rod 3A, 13.5 wt % in the fuel rod 3B, 16.8 wt % in the fuel rod 3C, 18.2 wt % in the fuel rod 3D, and 19.5 wt % in the fuel rod 3E. The blanket zones in each fuel rod 3 do not include TRU, but the mixed oxide fuel in the upper fissile zone 6 and lower fissile zone 8 in the each fuel rod 3 includes TRU with the composition shown in Table 1. When the fuel assembly 1 is a new fuel assembly, the ratio of Pu-239 in all TRU elements is 44 wt %. The composition in Table 1 is also a TRU composition of a fuel assembly 1 that is taken out of the core 20, stays in a fuel storage pool and fuel reprocessing facility for two years and in a fuel manufacturing facility for one year, totaling three years, and then loaded again in the core as new fuel.

After the operation of the BWR 19 is stopped in one operation cycle, one-fourth, for example, of the fuel assemblies 1 disposed in the core 20, which is an equilibrium core, is replaced with fuel assemblies (new fuel assemblies) 1 having a burnup of 0. After the new fuel assemblies 1 have been loaded in the core 20, the operation of the BWR 19 in the next operation cycle starts. In the next operation cycle, the new fuel assemblies 1 are used as fuel assemblies in the first operation cycle. When the internal pumps 26 are driven, the coolant is supplied to the core 20, as described above. The flow rate of the coolant supplied to the core 20 (core flow rate) is set to a minimum flow rate. The rotational speed of the internal pump 26 is controlled by a core flow rate control apparatus (coolant flow rate control apparatus) 33. The control rod drive mechanism 29 is driven according to a control signal from the control rod driving control apparatus 30, and the control rod 2 is withdrawn from the core 20. After the BWR 19 reaches the critical state and heatup mode of BWR is completed, another control rod 2 is further withdrawn, increasing the reactor power. The increasing of the reactor power caused by withdrawing control rods 2 is tentatively stopped.

A storage apparatus (not shown) in the core flow rate control apparatus 33 stores the characteristics in FIG. 2. An operator enters, from an input apparatus (not shown), information about the ratio of Pu-239 in all TRU elements included in the new fuel assembly 1 loaded in the core 20 at the time of the above fuel replacement (this information is referred to as ratio information), that is, 44 wt %. The core flow rate control apparatus 33 sets a set core flow rate, which is determined based on the entered ratio information and the characteristics in FIG. 2. From the characteristic in FIG. 2, it is found that the set core flow rate at 44 wt %, which is the ratio information, is a relative core flow rate 1.00. The core flow rate control apparatus 33 increases the rotational speed of the internal pump 26 until the core flow rate reaches the set core flow rate. When the core flow rate reaches the set core flow rate, the core flow rate control apparatus 33 stops the rotational speed of the internal pump 26 from increasing to stop the core flow rate from increasing. After that, the core flow rate is maintained by the core flow rate control apparatus 33 at the set core flow rate until the operation of the BWR 19 is stopped in the operation cycle. As the core flow rate increases up to the set core flow rate, the reactor power also increases. After the increasing of the core flow rate has been stopped, the withdrawal of the control rod 2 is resumed and the reactor power is increased up to 100%, which is the rated power. Upon the completion of the operation cycle, the control rod 2 is inserted into the core 20 and the operation of the BWR 19 is stopped.

Figure 12:
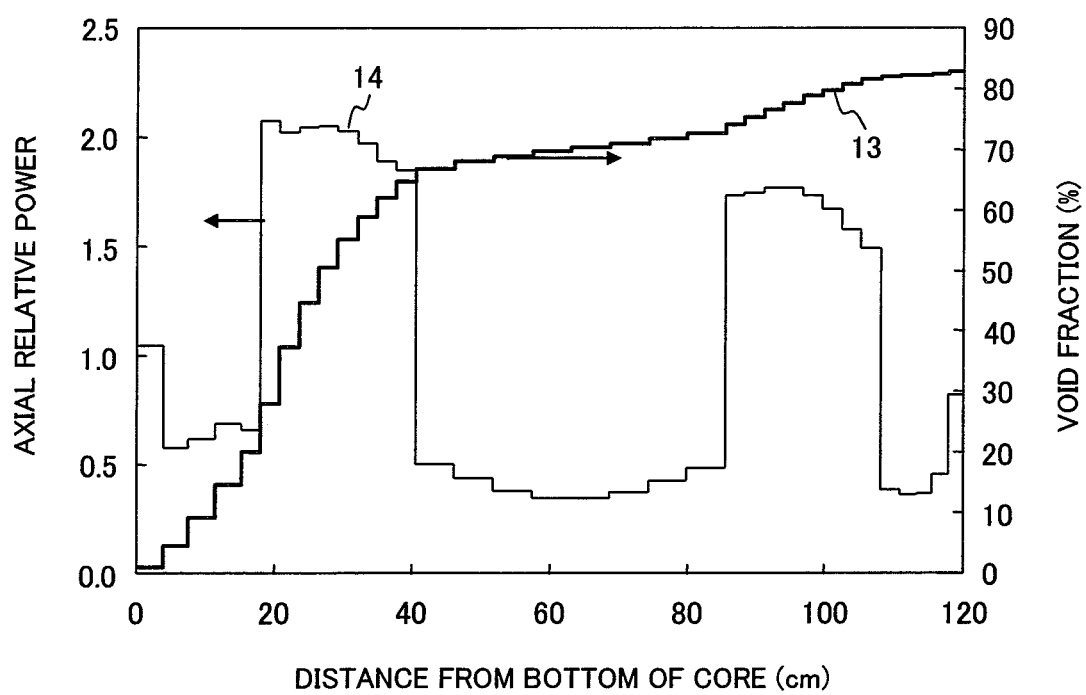
FIG. 12 is an explanatory drawing showing a relative power distribution and void fraction distribution in the axial direction of the core shown in FIG. 5.

FIG. 12 illustrates an axial relative power distribution and void fraction distribution of the core 20 when the BWR 19 is operating at a reactor power of 100%. The average void fraction of the core is 67%, and the steam weight percent at the outlet of the core is 41 wt %. When the BWR 19 is operating at the rated power, each LPRM 32 outputs a detection signal according to the detection of a neutron generated in nuclear fission. The APRM 31 inputs and averages these detection signals to obtain reactor power. This reactor power obtained by APRM 31 is input to the control rod drive control apparatus 30. The control rod drive control apparatus 30 operates the control rod drive mechanism 29 to have it withdraw the control rod 2 out of the core 20 so that the input reactor power becomes the rated power. The reactor power is maintained at the rated power during the operation cycle, in this way.

In the present embodiment in which the ratio of Pu-239 in all TRU elements included in the new fuel assembly 1 is 44 wt % and the set core flow rate, that is, the relative core flow rate, is 1.00, the reason why the TRU isotope ratio conservation can be achieved will be specifically described below by using the generation and decay chain of actinide nuclides shown in FIG. 1.

The absolute amount of each of a plurality of TRU isotopes, shown in Table 1, included in the new fuel assembly 1 decreases in a in-core fuel dwelling time (four operation cycles) during which the new fuel assembly 1 stays in the core 20 until it is taken out of the core 20 as a spent fuel assembly. Since nuclear fission occurs as indicated by the generation and decay chain of the actinide nuclide, when the fuel assembly 1 is taken out of the core 20 as a spent fuel assembly and loaded again in the core 20 as a new fuel assembly, however, the ratios of the TRU isotopes in the fuel assembly 1 are substantially the same as their ratios in the above new fuel assembly 1. In the description that follows, Pu-239, Pu-240, Pu-241, and Am-243 shown in Table 1, which are typical TRU isotopes, are used as examples. When the new fuel assembly 1 is taken out from the core 20 as a spent fuel assembly, the amount of Pu-239 included in the upper fissile zone 6 and lower fissile zone 8 of the new fuel assembly 1 has been reduced. During the four operation cycles, however, U-238 present in each blanket zone is converted into Pu-239 due to the neutron capturing reaction and subsequent β decay, generating new Pu-239. The amount of Pu-240 included in the upper fissile zone 6 and lower fissile zone 8 has been also reduced when the fuel assembly 1 is taken out from the core 20, but new Pu-240 is generated from U-238 in each blanket zone. The ratio of Am-243 newly generated from other TRU isotopes present in the upper fissile zone 6 and lower fissile zone 8 is the same as the ratio of Am-243 decreased due to neutron capturing. The amount of Pu-241 increased in each blanket zone is greater than the amount of Pu-241 reduced in the upper fissile zone 6 and lower fissile zone 8 due to nuclear fission, so the amount of Pu-241 in the spent fuel assembly is about 20% more than the amount of Pu-241 in the new fuel assembly. Since the half-life of Pu-241 is 14.4 years, which is relatively short, however, its amount is reduced due to decay while the fuel assembly is taken out of the core 20 as a spent fuel assembly and loaded again in the core as the new fuel assembly. Accordingly, when the fuel assembly is taken as a spent fuel assembly and loaded again in the core as a new fuel assembly, the ratios of the TRU isotopes included in the fuel assembly are substantially the same as their ratios in new fuel assembly 1. The ratios of a plurality of TRU isotopes present in the BWR core upon the completion of the BWR operation in an operation cycle are also substantially the same as the ratios of the plurality of TRU isotopes present in the BWR core in a state in which the BWR is ready for an operation in that operation cycle.

According to the present embodiment, the core flow rate control apparatus 33 adjusts the core flow rate so that it reaches the set core flow rate determined based on the ratio of Pu-239 in TRU included in the new fuel assembly 1, which is 44 wt %. As a result of this adjustment, the neutron energy spectrum is also adjusted. The TRU isotope ratio conservation can be achieved by the decrease of the amount of a relevant TRU isotope included in the upper fissile zone 6 and lower fissile zone 8 and the generation of the relevant isotope in each blanket zone, and further, for a TRU isotope that is hardly generated in each blanket zone, by disappearance of the amount of this isotope lost and the generation of this isotope from other TRU isotopes included in the upper fissile zone 6 and lower fissile zone 8, as described above. The TRU isotope ratio conservation can be achieved in this way. In the present embodiment, therefore, the burnup can be further increased and TRU multi-recycling becomes feasible. In the present embodiment, a nuclear proliferation resistance can be increased while restrictive conditions for safety are satisfied. In addition, since the ratio of Pu-239 in TRU is 44 wt %, the fuel assembly 1 taken out of the core 20 can have much more TRU than the new fuel assembly 1.

Specifically, according to the present embodiment, the BWR 19 generating a 1350 MW electric power, which is the same as the electric power of a current ABWR, by using the reactor pressure vessel 27 having almost the same size as the ABWR can achieve a discharge burnup of 45 GWd/t in the core zone including the upper and lower fissile zones and the internal blanket zone excluding the upper and lower blanket zones, a discharge burnup of 54 GWd/t in the core zone, which is larger than in the breeder reactor in the light water reactor described in JP 3428150 B, and a discharge burnup of 47 GWd/t in the core 20 including the upper and lower blanket zones. In the present embodiment, the void coefficient is $-2 \times 10^{-6}$ $\Delta k/k/\%$ void, MCPR is 1.3, and when the ratios of the TRU isotopes are substantially fixed as described above, a breeding ratio of 1.01 can be attained.

In the present embodiment, when the reactor power is lowered from a set reactor power (the rated power, for example), the reactor power is controlled by operating (withdrawing) the control rod 2 by the control rod drive mechanism 29 which is controlled by the control rod drive control apparatus 30, rather than the core flow rate control apparatus 33. Accordingly, the present embodiment can achieve both the TRU isotope ratio conservation and reactor power control.

Second Embodiment

Figure 13:
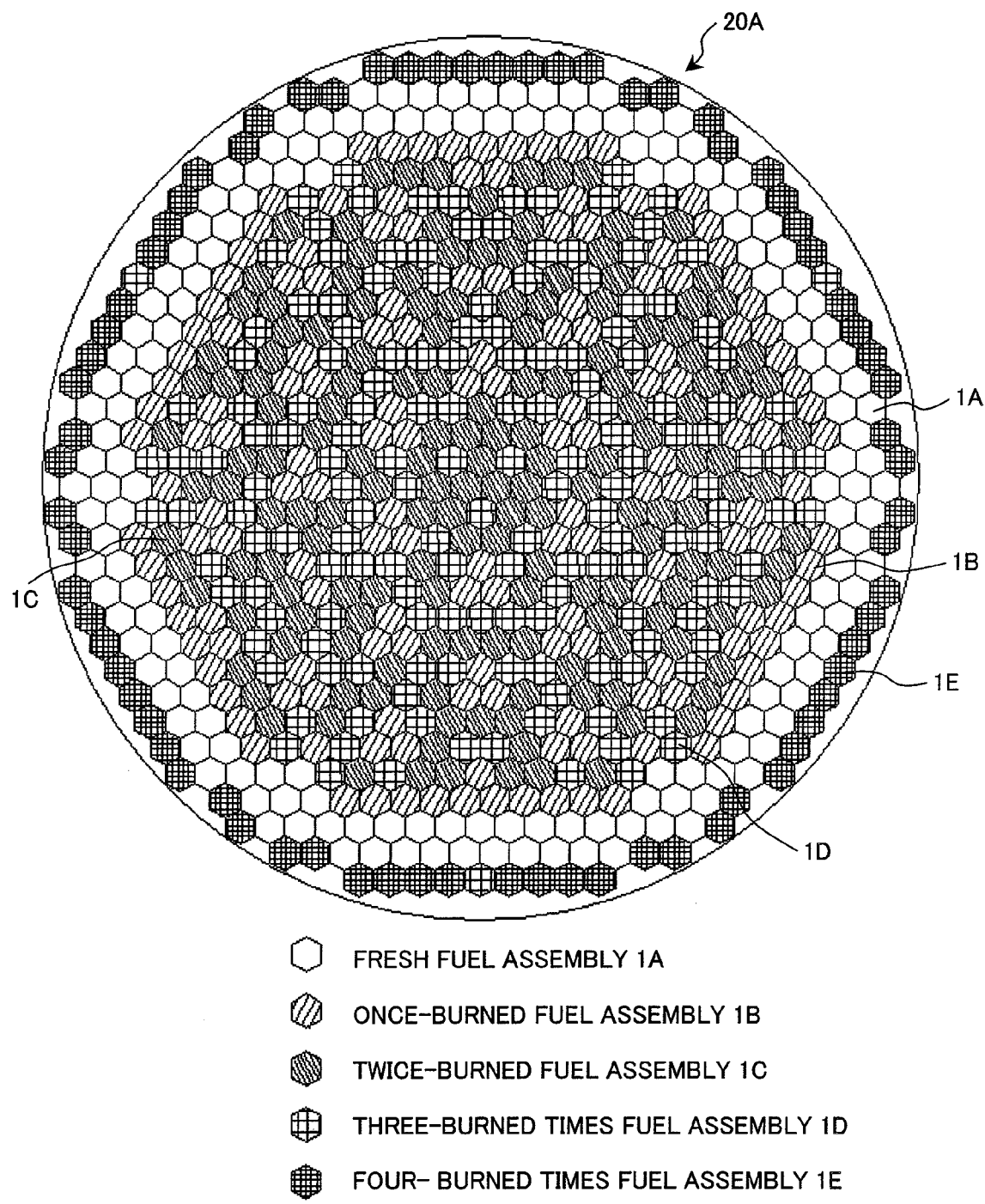
FIG. 13 is an explanatory drawing showing the arrangement of fuel assemblies in an equilibrium core of a light water reactor according to a second embodiment which is another embodiment of the present invention.

A light water reactor according to a second embodiment which is another embodiment of the present invention will be described below in detail with reference to FIGS. 13 and 14 as well as Table 2. The light water reactor of the present embodiment has a structure in which the core 20 and the fuel assembly 1 in the first embodiment are respectively replaced with a core 20A shown in FIG. 13 and a fuel assembly 1H shown in FIG. 14. Other structures of

TABLE 2

| Nuclide | Composition (wt %) |
| --- | --- |
| Pu-238 | 1.0 |
| Pu-239 | 48.6 |
| Pu-240 | 39.7 |

TABLE 2-continued

| Nuclide | Composition (wt %) |
| --- | --- |
| Pu-241 | 6.0 |
| Pu-242 | 4.4 |
| Am-241 | 0.3 | the core 20A are the same as in the first embodiment. In the present embodiment, only structures different from the first embodiment will be described, and the explanation of the same structures as in the first embodiment will be omitted. The core 20A is a parfait-type core.

Figure 14:
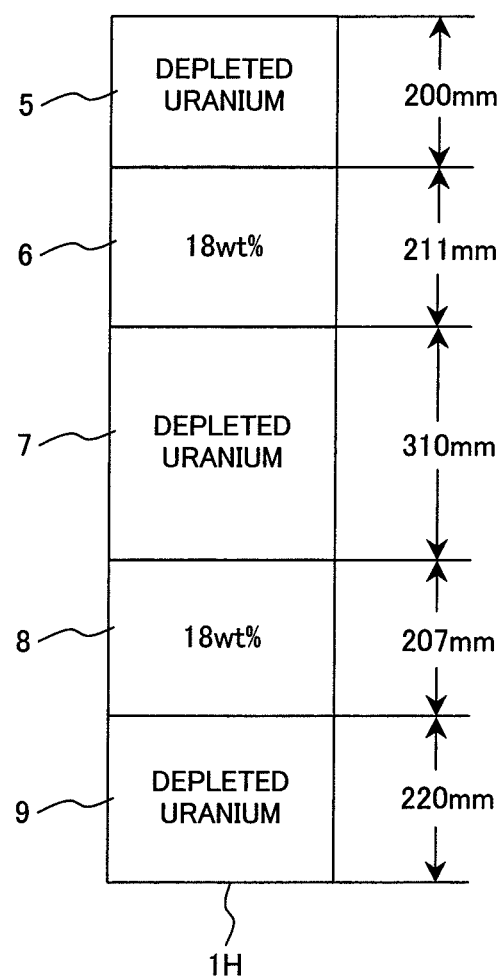
FIG. 14 is an explanatory drawing showing an enrichment distribution of fissionable Pu in a new fuel assembly, in its axial direction, which is to be loaded in an equilibrium core of the core shown in FIG. 13.

The fuel assembly 1H disposed in the core 20A has the same structure as the fuel assembly 1 used in the first embodiment, except the dimensions shown in FIG. 14 and the TRU composition indicated in Table 2. In the fuel assembly 1H as well, the transverse cross section of the fuel pellet occupies 54% of the transverse cross section of a unit fuel rod lattice, as in the first embodiment. In state of an equilibrium core, the core 20A includes fuel assemblies 1A to 1E as shown in FIG. 13. The fuel assemblies 1E, the operation cycle of which is the fifth cycle, staying in the core for the longest time of the in-core fuel dwelling time, are disposed in an outermost peripheral region of the core. A core outer region internally adjacent to the outermost peripheral region includes the fuel assemblies 1A, the operation cycle of which is the first cycle. In a core inner region, the fuel assemblies 1B, 1C, and 1D, the operation cycles of which are respectively the second cycle, third cycle, and fourth cycle, are dispersed. Three fuel assemblies 1D are included in the outermost peripheral region. This arrangement of the fuel assemblies enables the power distribution in the radial directions of the core 20A to be flattened. Each of the fuel assemblies 1A to 1E used in the present embodiment is the fuel assembly 1H. A high burnup can be achieved by using mixed oxide fuel of depleted uranium, and plutonium and Am-241 from which minor actinide has been removed by TRU reprocessing. Am-241 included in new fuel is generated due to decay of Pu-241 in the plutonium from which minor actinide has been removed by TRU reprocessing before the plutonium is loaded in the core 20A as the new fuel.

As with the fuel assembly 1, the fuel assembly 1H has five zones within its active fuel length. As shown in FIG. 14, the upper blanket zone 5 is 200 mm high, the upper fissile zone 6 is 211 mm high, the internal blanket zone 7 is 310 mm high, the lower fissile zone 8 is 207 mm high, and the lower blanket zone 9 is 220 mm high. When the fuel assembly 1H is a new fuel assembly with a burnup of 0, each fuel rod 3 of the fuel assembly 1H is loaded with depleted uranium in the three blanket zones and with mixed oxide fuel in the upper fissile zone 6 and lower fissile zone 8, the mixed oxide fuel including 198 parts by weight of depleted uranium per 100 parts by weight of plutonium from which minor actinide has been removed by TRU reprocessing and Am-241 generated due to decay of Pu-241. The enrichment of fissionable Pu in the mixed oxide fuel is 18 wt %. The blanket zones are not loaded with the mixed oxide fuel. The fuel assembly 1H also includes fuel rods 3A to 3E, as in the first embodiment. Each of the fuel rods 3A to 3E is the fuel rod 3. The mixed oxide fuel present in the upper fissile zone 6 and lower fissile zone 8 has the composition indicated in Table 2. When the fuel assembly 1H is a new fuel assembly, the ratio of Pu-239 in all Pu elements and Am-241 is 48.6 wt % and the ratio of Pu-240 in all Pu elements and Am-241 is 39.7 wt %.

The core flow rate control apparatus 33 sets a set core flow rate, which is determined based on ratio information (indicating that a ratio of Pu-239 in all Pu elements and Am-241 is 48.6 wt %) entered from the input apparatus and the same characteristics as shown in FIG. 2. This characteristics are obtained, in a core that uses Pu and Am-241 from which minor actinide has been removed by TRU reprocessing as a new fuel assembly, by determining a core flow rate at which the ratios of all Pu elements and Am-241 isotopes can be maintained in each of a plurality of cores having different ratios of Pu-239 in all Pu elements and Am-241 isotopes in the new fuel assembly. The core flow rate control apparatus 33 increases the rotational speed of the internal pump 26 until the core flow rate reaches the set core flow rate, as in the first embodiment. When the core flow rate reaches the core flow rate setting, the core flow rate control apparatus 33 stops the increase of the rotational speed of the internal pump 26. After that, the core flow rate is maintained at the set core flow rate until the BWR 19 is shut down in the operation cycle.

In the present embodiment as well, adjustment is performed so that the set core flow rate determined by the ratio of Pu-239 in all Pu elements in the new fuel assembly 1H loaded in the core 20A, which is 48.6 wt %, is reached, so the TRU isotope ratio conservation can be implemented as in the first embodiment. In the present embodiment, therefore, the burnup can be further increased and TRU multi-recycling becomes feasible. In the present embodiment as well, the fuel assembly 1H taken out of the core 20A can have much more TRU than the new fuel assembly 1H.

Specifically, according to the present embodiment, the BWR 19 generating a 1350 MW electric power, which is the same as the electric power of a current ABWR, by using the reactor pressure vessel 27 having almost the same size as the ABWR can achieve a discharge burnup of 51 GWd/t for the core 20A, which is higher than the burnup in the first embodiment, and 68 GWd/t for the core zone excluding the upper and lower blanket zones. In the present embodiment, the void coefficient is $-3 \times 10^{-5}$ $\Delta k/k/\%$ void, MCPR is 1.3, and when the ratios of the Pu and Am-241 isotopes are substantially fixed as described in the first embodiment, a breeding ratio of 1.01 can be attained.

Third Embodiment

Figure 15:
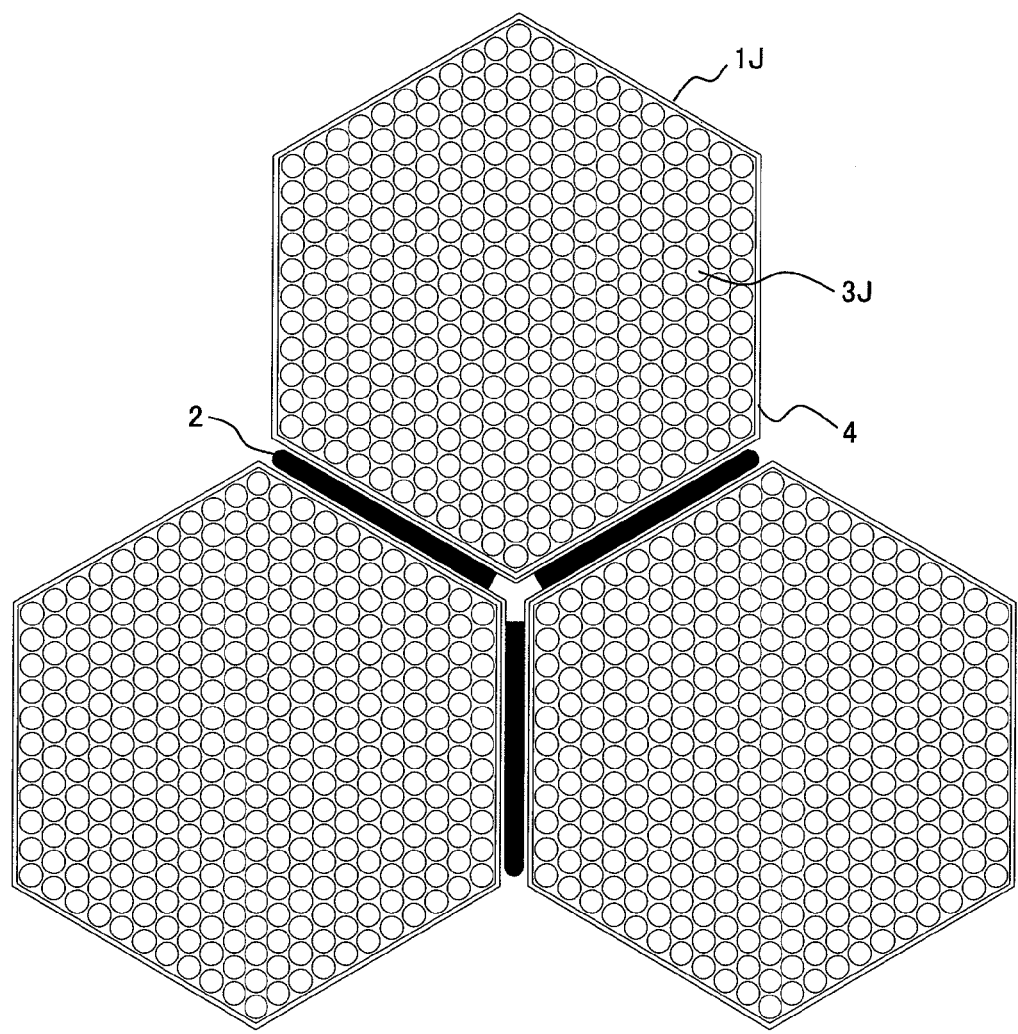
FIG. 15 is an explanatory drawing showing a fuel assembly lattice in a light water reactor according to a third embodiment which is another embodiment of the present invention.
Figure 16:
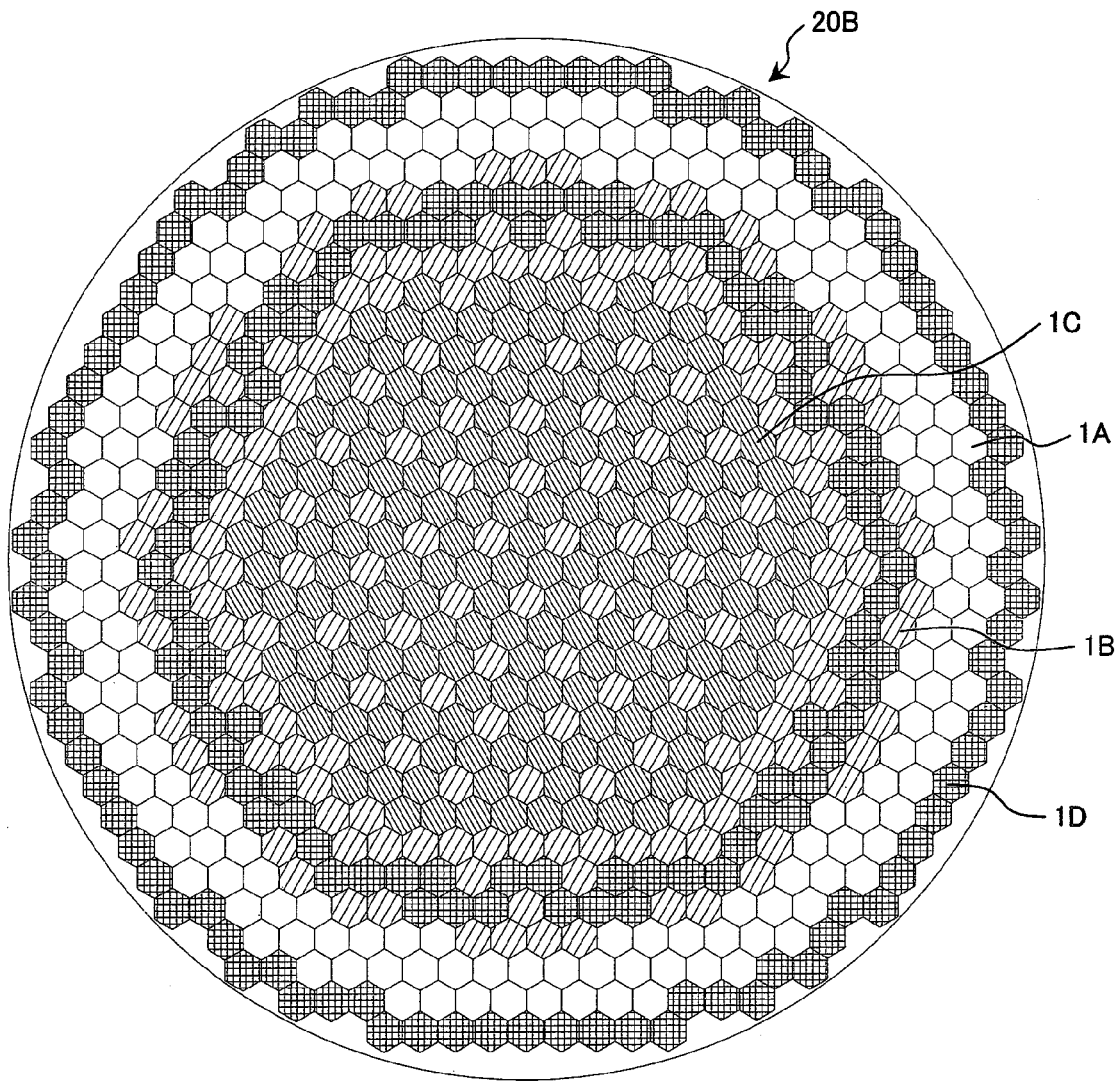
FIG. 16 is an explanatory drawing showing the arrangement of fuel assemblies in an equilibrium core of the light water reactor according to the third embodiment.
Figure 16:
Figure 16:
Figure 16:
Figure 16:

A light water reactor according to a third embodiment which is another embodiment of the present invention will be described below in detail with reference to FIGS. 15 to 17 as well as Table 3. The light water reactor of the present embodiment has a structure in which the core 20 and the fuel assembly 1 in the first embodiment are respectively replaced with a core 20B shown in FIG. 16 and a fuel assembly 1J shown in FIGS. 15 and 17. Other

TABLE 3

| Nuclide | Composition (wt %) |
|---|---|
| Np-237 | 0.6 |
| Pu-238 | 3.3 |
| Pu-239 | 40.1 |
| Pu-240 | 37.1 |
| Pu-241 | 5.4 |
| Pu-242 | 6.0 |
| Am-241 | 3.7 |
| Am-242M | 0.2 |
| Am-243 | 1.6 |
| Cm-244 | 1.4 |
| Cm-245 | 0.5 |
| Cm-246 | 0.2 | structures of the core 20B are the same as in the first embodiment. In the present embodiment, only structures different from the first embodiment will be described, and the explanation of the same structures as in the first embodiment will be omitted. The core 20B is a parfait-type core.

The fuel assembly 1J disposed in the core 20B will be described with reference to FIG. 15. The fuel assembly 1J, the transverse cross section of which is hexagonal, has 331 fuel rods 3J with a diameter of 9.2 mm in a regular triangle lattice in the channel box 4. The gap between fuel rods 3J is 1.1 mm. The transverse cross section of the fuel pellet occupies 53% of the transverse cross section of a unit fuel rod lattice. In state of an equilibrium core, the core 20B includes fuel assemblies 1A to 1D as shown in FIG. 16. As with the core 20, the fuel assemblies 1D, the operation cycle of which is the fourth cycle, staying in the core for the longest time of the in-core fuel dwelling time, are disposed in an outermost peripheral region of the core. A core outer region internally adjacent to the outermost peripheral region includes the fuel assemblies 1A, the operation cycle of which the first cycle. In an inner core zone, the fuel assemblies 1B, 1C, and 1D, the operation cycles of which are respectively the second cycle, third cycle, and fourth cycle, are dispersed. There is an intermediate region, in which a plurality of fuel assemblies 1D are disposed in a loop, between the core inner region and the core outer region. In the core 20B, the power distribution in its radial directions is flattened. Each of the fuel assemblies 1A to 1E shown in FIG. 16 is the fuel assembly 1J.

Figure 17:
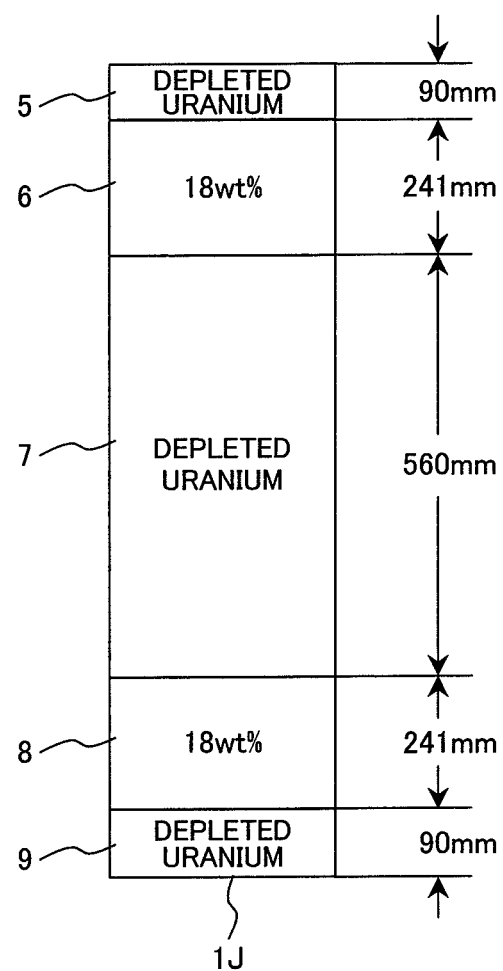
FIG. 17 is an explanatory drawing showing an enrichment distribution of fissionable Pu in a new fuel assembly, in its axial direction, which is to be loaded in an equilibrium core of the core shown in FIG. 16.

As with the fuel assembly 1, the fuel assembly 1J has five zones within its active fuel length (see FIG. 17). The upper blanket zone 5 is 90 mm high, the upper fissile zone 6 is 241 mm high, the internal blanket zone 7 is 560 mm high, the lower fissile zone 8 is 241 mm high, and the lower blanket zone 9 is 90 mm high. When the fuel assembly 1J is a new fuel assembly with a burnup of 0, each fuel rod 3J of the fuel assembly 1J is loaded with depleted uranium in the three blanket zones and with mixed oxide fuel in the upper fissile zone 6 and lower fissile zone 8, the mixed oxide fuel including 153 parts by weight of depleted uranium per 100 parts by weight of TRU. The enrichment of fissionable Pu in the mixed oxide fuel is 18 wt %. The blanket zones are not loaded with the mixed oxide fuel. The fuel assembly 1J also includes fuel rods 3A to 3E, as in the first embodiment. Each of the fuel rods 3A to 3E is the fuel rod 3J. The mixed oxide fuel present in the upper fissile zone 6 and lower fissile zone 8 includes TRU having the composition indicated in Table 3. When the fuel assembly 1J is a new fuel assembly, the ratio of Pu-239 in all TRU elements is 40.1 wt %. The blanket zones are not loaded with the mixed oxide fuel.

The core flow rate control apparatus 33 sets a set core flow rate, which is determined based on ratio information (40.1 wt %) entered from the input apparatus and the same characteristics shown in FIG. 2. The core flow rate control apparatus 33 increases the rotational speed of the internal pump 26 until the core flow rate reaches the set core flow rate, as in the first embodiment. When the core flow rate reaches the set core flow rate, the core flow rate control apparatus 33 stops the rotational speed of the internal pump 26 from increasing. After that, the core flow rate is maintained at the set core flow rate until the BWR 19 is shut down in the operation cycle.

In the present embodiment as well, adjustment is performed so that the set core flow rate determined by the ratio of Pu-239 in TRU in the new fuel assembly 1J loaded in the core 20B, which is 40.1 wt %, is reached, so the TRU isotope ratio conservation can be implemented as in the first embodiment. In the present embodiment, therefore, the burnup can be further increased and TRU multi-recycling becomes feasible.

In the present embodiment as well, the fuel assembly 1J taken out of the core 20B can have much more TRU than the new fuel assembly 1J.

Specifically, according to the present embodiment, the BWR 19 generating a 1350 MW electric power, which is the same as the electric power of a current ABWR, by using a reactor pressure vessel having almost the same size as the ABWR can achieve a discharge burnup of 53 GWd/t for the core 20B and a void coefficient of $-3 \times 10^{-6}$ $\Delta k/k/\%$ void. In the present embodiment, MCPR is 1.3, and the TRU isotope ratio conservation and a breeding ratio of 1.01 can be achieved as described above.

Fourth Embodiment

Figure 18:
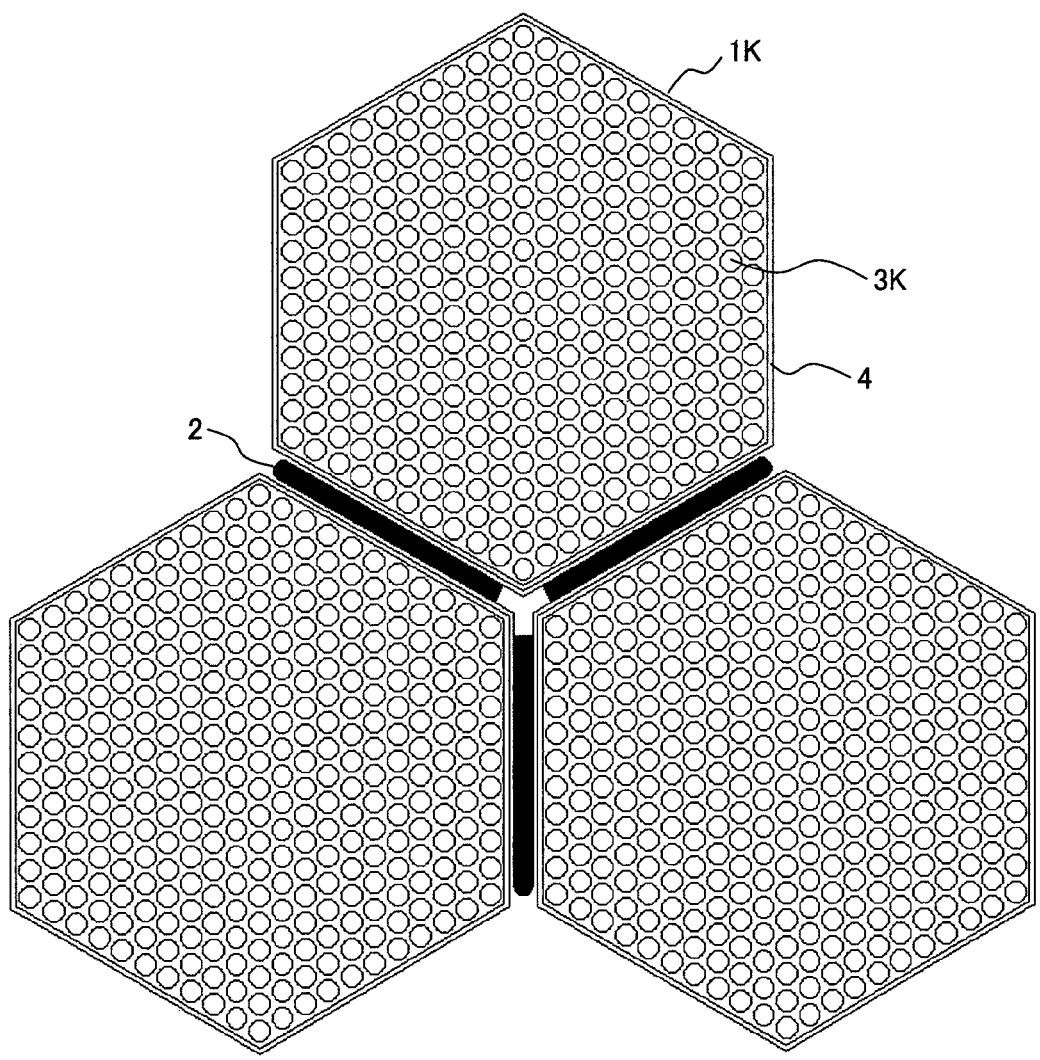
FIG. 18 is an explanatory drawing showing a fuel assembly lattice in a light water reactor according to a fourth embodiment which is another embodiment of the present invention.
Figure 19:
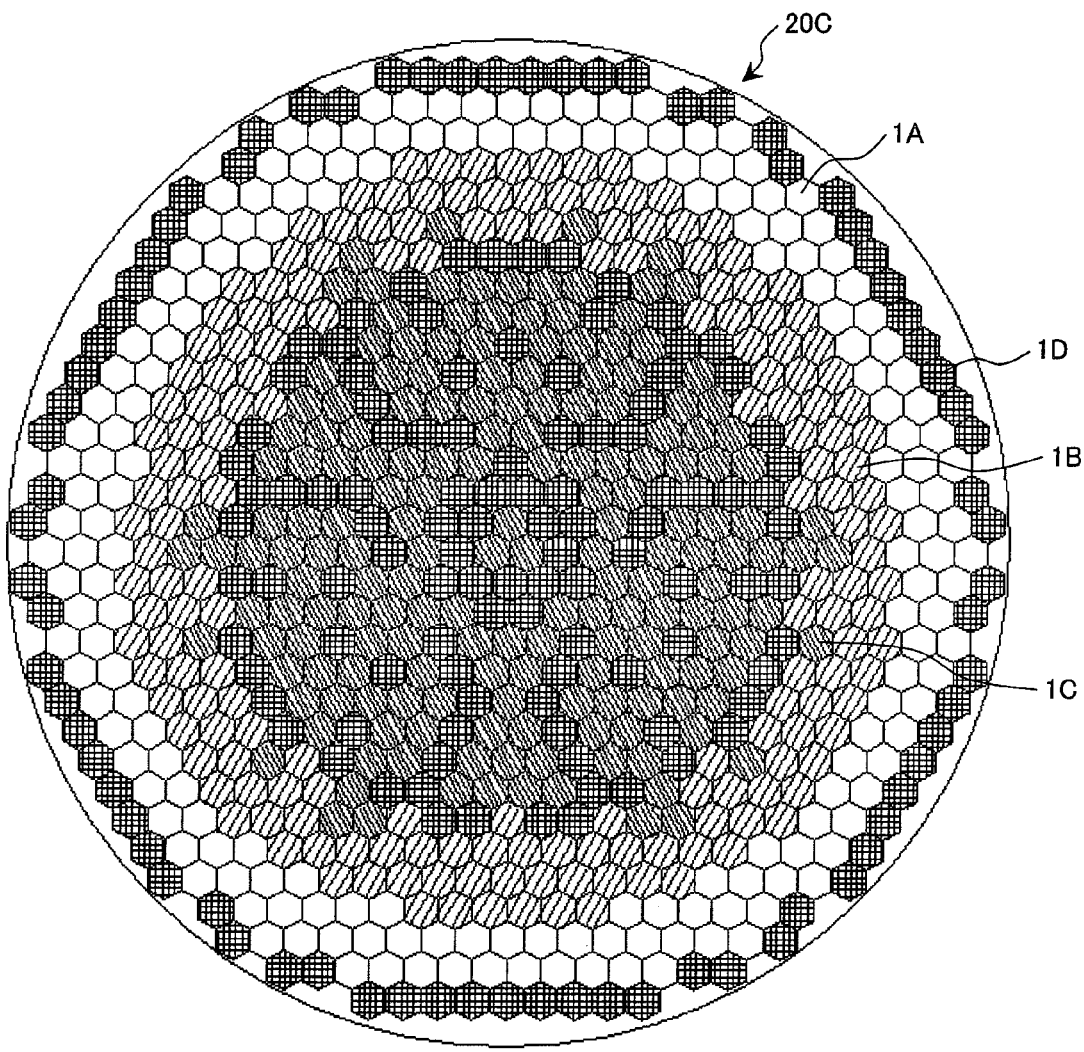
FIG. 19 is an explanatory drawing showing the arrangement of fuel assemblies in an equilibrium core of the light water reactor according to the fourth embodiment.
Figure 19:
Figure 19:
Figure 19:

A light water reactor according to a fourth embodiment which is another embodiment of the present invention will be described below in detail with reference to FIGS. 18 to 20 as well as Table 4. The light water reactor in the present embodiment has a structure in which the core 20 and the fuel assembly 1 in the first embodiment are respectively replaced with a core 20C shown in FIG. 19 and a fuel assembly 1K shown in FIGS. 18 and 20. Other

TABLE 4

| Nuclide | Composition (wt %) |
|---------|--------------------|
| Np-237  | 0.2                |
| Pu-238  | 5.1                |
| Pu-239  | 14.4               |
| Pu-240  | 40.2               |
| Pu-241  | 4.8                |
| Pu-242  | 20.5               |
| Am-241  | 4.7                |
| Am-242M | 0.2                |
| Am-243  | 4.0                |
| Cm-244  | 3.6                |
| Cm-245  | 1.1                |
| Cm-246  | 0.8                |
| Cm-247  | 0.2                |
| Cm-248  | 0.2                | structures of the core 20c are the same as in the first embodiment. In the present embodiment, only structures different from the first embodiment will be described, and the explanation of the same structures as in the first embodiment will be omitted. The core 20C is also a parfait-type core.

The fuel assembly 1K (see FIG. 18) disposed in the core 20C has 331 fuel rods 3K with a diameter of 7.7 mm in a regular triangle lattice in the channel box 4. The gap between fuel rods 3K is 2.6 mm. The fuel rod row in the outermost peripheral layer includes 10 fuel rods 3K. The transverse cross section of the fuel pellet occupies 36% of the transverse cross section of a unit fuel rod lattice. The core 20C includes fuel assemblies 1A to 1D that have experienced a different number of operation cycles, as shown in FIG. 19, in state of an equilibrium core. The fuel assemblies 1D, the operation cycle of which is the fourth cycle, are disposed in an outermost peripheral region. A core outer region includes the fuel assemblies 1A, the operation cycle of which is the first cycle. In a core inner region, the fuel assemblies 1B, 1C, and 1D, the operation cycles of which are respectively the second cycle, third cycle, and fourth cycle, are dispersed. There is an intermediate region, in which plurality of fuel assemblies 1B are disposed in a loop, between the core inner region and the core outer region. In this type of core 20C, the power distribution in its radial directions is more flattened. Each of the fuel assemblies 1A to 1E shown in FIG. 19 is the fuel assembly 1K.

Figure 20:
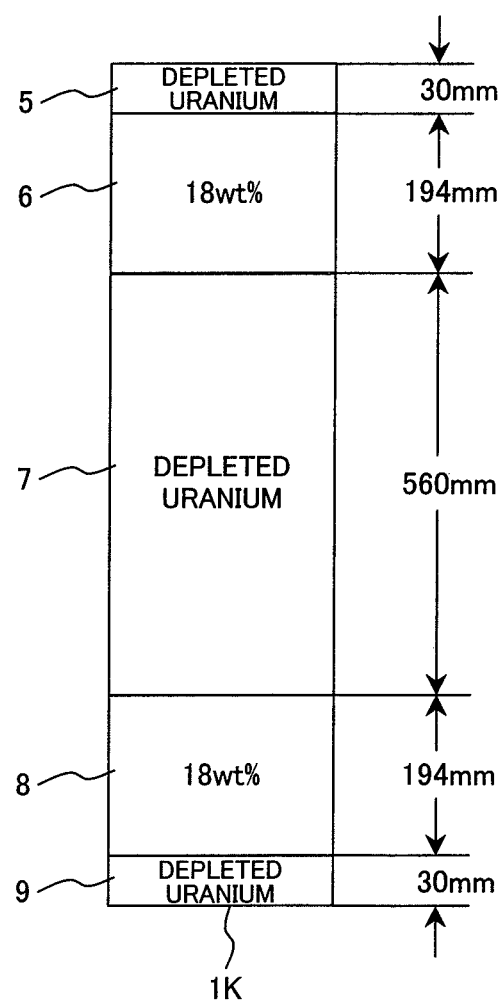
FIG. 20 is an explanatory drawing showing an enrichment distribution of fissionable Pu in a new fuel assembly, in its axial direction, which is to be loaded in an equilibrium core of the core shown in FIG. 19.

As with the fuel assembly 1, the fuel assembly 1K has five zones within its active fuel length (see FIG. 20). The upper blanket zone 5 is 30 mm high, the upper fissile zone 6 is 194 mm high, the internal blanket zone 7 is 560 mm high, the lower fissile zone 8 is 194 mm high, and the lower blanket zone 9 is 30 mm high. When the fuel assembly 1K is a new fuel assembly with a burnup of 0, each fuel rod 3K of the fuel assembly 1K is loaded with depleted uranium in the three blanket zones and with mixed oxide fuel in the upper fissile zone 6 and lower fissile zone 8, the mixed oxide fuel including 7 parts by weight of depleted uranium per 100 parts by weight of TRU. The enrichment of fissionable Pu in the mixed oxide fuel is 18 wt %. The blanket zones are not loaded with the mixed oxide fuel. The fuel assembly 1K also includes fuel rods 3A to 3E, each of which is the fuel rod 3K. The mixed oxide fuel present in the upper fissile zone 6 and lower fissile zone 8 includes TRU having the composition indicated in Table 4. When the fuel assembly 1K is a new fuel assembly, the ratio of Pu-239 in all TRU elements is 14.4 wt %.

The core flow rate control apparatus 33 sets a set core flow rate, which is determined from ratio information (14.4 wt %) and the characteristics shown in FIG. 2, as in the first embodiment. The core flow rate control apparatus 33 controls the internal pump 26 and increases the core flow rate until it reaches the set core flow rate. When the core flow rate reaches the set core flow rate, the core flow rate control apparatus 33 stops the increase of the rotation of the internal pump 26. After that, the core flow rate is maintained at the set core flow rate until the BWR 19 is shut down in the operation cycle.

In the present embodiment as well, adjustment is performed so that the set core flow rate determined by the ratio of Pu-239 in TRU in the new fuel assembly 1K loaded in the core 20C, which is 14.4 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1K taken out of the core 20C can have less TRU than the new fuel assembly 1K.

Specifically, according to the present embodiment, the BWR 19 generating a 1350 MW electric power, which is the same as the electric power of a current ABWR, by using a reactor pressure vessel having almost the same size as the ABWR can achieve a discharge burnup of 65 GWd/t for the core 20C. In the present embodiment, the fission efficiency of TRU is 44%, the void coefficient is $-2 \times 10^{-4}$ $\Delta k/k/\%$ void, MCPR is 1.3, the TRU isotope ratio conservation can be achieved, and the amount of TRU can be reduced.

Fifth Embodiment

Figure 21:
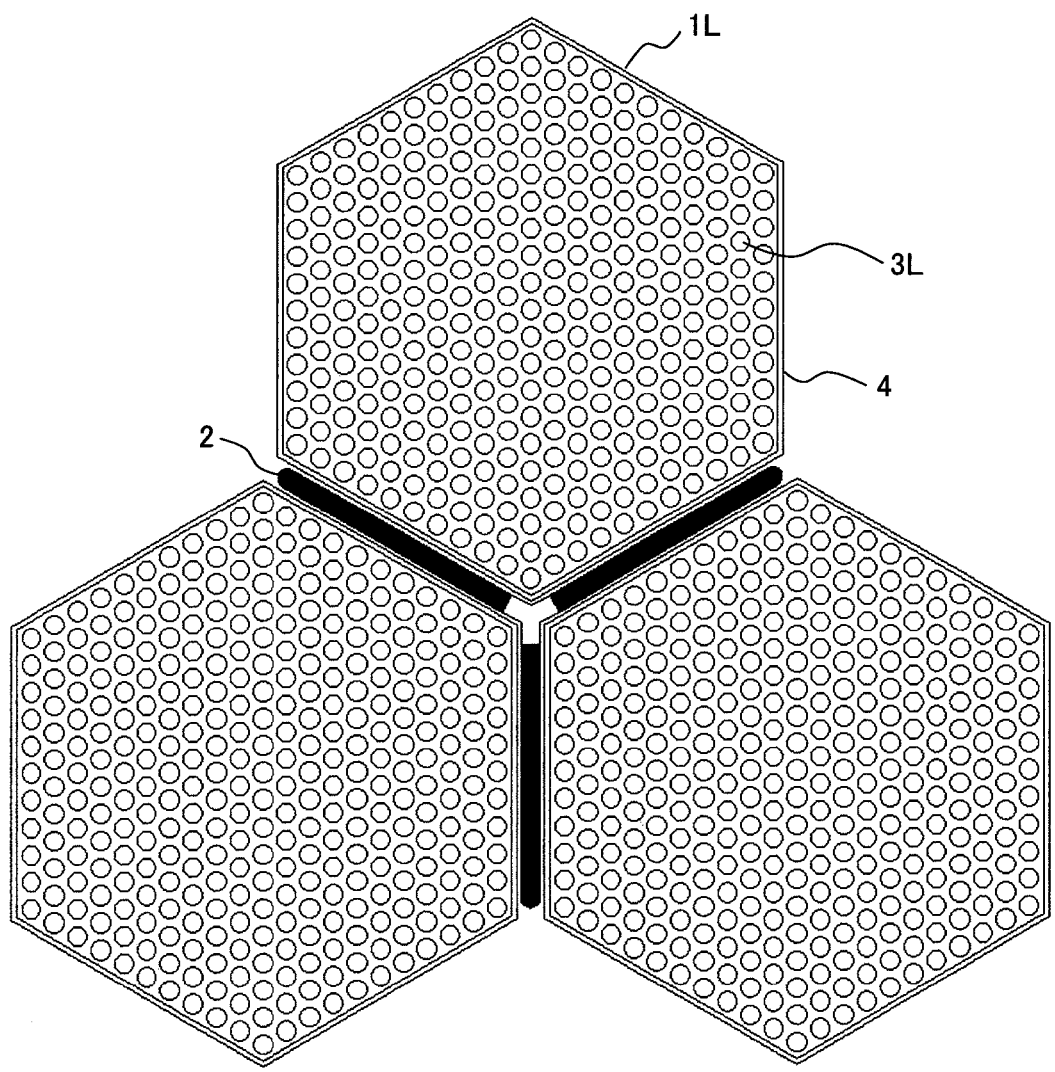
FIG. 21 is an explanatory drawing showing a fuel assembly lattice in a light water reactor according to a fifth embodiment which is another embodiment of the present invention.

A light water reactor according to a fifth embodiment which is another embodiment of the present invention will be described below in detail with reference to FIGS. 21 and 22 as well as Table 5. The light water reactor of the present embodiment has a structure in which the fuel assembly 1K disposed in the core 20C in the fourth embodiment is replaced with a fuel assembly 1L shown in FIGS. 21 and 22. Other structures of the core of the

TABLE 5

| Nuclide | Composition (wt %) |
|---------|--------------------|
| Np-237  | 0.2                |
| Pu-238  | 5.2                |
| Pu-239  | 8.5                |

TABLE 5-continued

| Nuclide | Composition (wt %) |
|---|---|
| Pu-240 | 38.9 |
| Pu-241 | 4.8 |
| Pu-242 | 25.4 |
| Am-241 | 4.3 |
| Am-242M | 0.2 |
| Am-243 | 4.7 |
| Cm-244 | 4.8 |
| Cm-245 | 1.4 |
| Cm-246 | 1.2 |
| Cm-247 | 0.2 |
| Cm-248 | 0.2 | present embodiment are the same as in the fourth embodiment. In the present embodiment, only structures different from the fourth embodiment will be described. The core used in this embodiment is also a parfait-type core.

The structure of the fuel assembly 1L will be described with reference with FIGS. 21 and 22. The fuel assembly 1L has 331 fuel rods 3L with a diameter of 7.4 mm in a regular triangle lattice in the channel box 4. The gap between fuel rods 3L is 2.9 mm. The fuel rod row in the outermost peripheral layer includes 10 fuel rods 3L. The transverse cross section of the fuel pellet occupies 31% of the transverse cross section of a unit fuel rod lattice. The arrangement of the fuel assemblies 1L in the radial directions of the core in the present embodiment is the same as the arrangement shown in FIG. 19.

Figure 22:
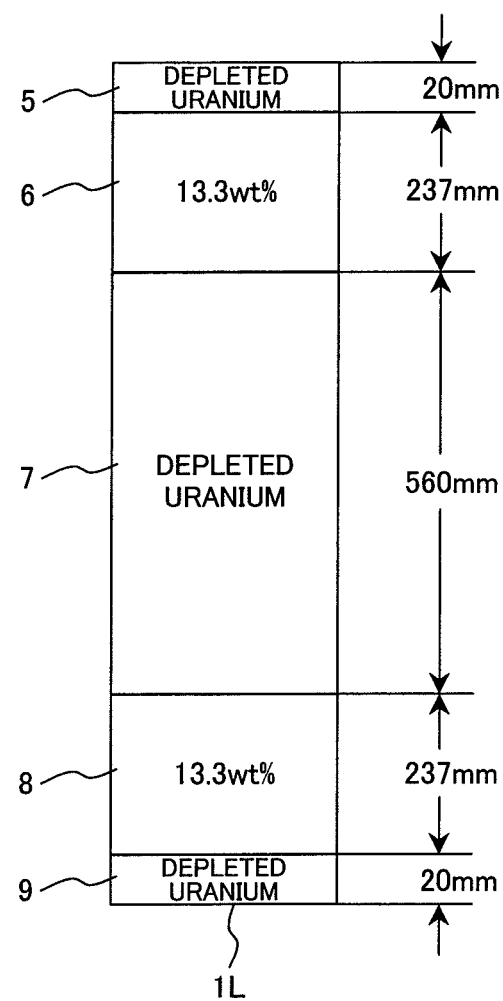
FIG. 22 is an explanatory drawing showing an enrichment distribution of fissionable Pu in a new fuel assembly, in its axial direction, which is to be loaded in a core of the light water reactor according to the fifth embodiment.

As with the fuel assembly 1K, the fuel assembly 1L has five zones within its active fuel length (see FIG. 22). The upper blanket zone 5 is 20 mm high, the upper fissile zone 6 is 237 mm high, the internal blanket zone 7 is 560 mm high, the lower fissile zone 8 is 237 mm high, and the lower blanket zone 9 is 20 mm high. When the fuel assembly 1L is a new fuel assembly with a burnup of 0, each fuel rod 3L in the fuel assembly 1L is loaded with depleted uranium in the three blanket zones and with TRU oxide fuel in the upper fissile zone 6 and lower fissile zone 8. The enrichment of fissionable Pu in the TRU fuel is 13.3 wt %. The upper fissile zone 6 and lower fissile zone 8 are not loaded with mixed oxide fuel of TRU and depleted uranium. The blanket zones are not loaded with the TRU oxide fuel The fuel assembly 1L also includes fuel rods 3A to 3E, each of which is the fuel rod 3L. The TRU fuel present in the upper fissile zone 6 and lower fissile zone 8 includes TRU having the composition indicated in Table 5. When the fuel assembly 1L is a new fuel assembly, the ratio of Pu-239 in all TRU elements is 8.5 wt %.

The core flow rate control apparatus 33 sets a set core flow rate, which is determined from ratio information (8.5 wt %) and the characteristics shown in FIG. 2. The core flow rate control apparatus 33 controls the internal pump 26 and increases the core flow rate until it reaches the set core flow rate. When the core flow rate reaches the set core flow rate, the core flow rate control apparatus 33 stops the increase of the rotation of the internal pump 26. After that, the core flow rate is maintained at the set core flow rate until the operation of the BWR 19 is stopped in the operation cycle.

In the present embodiment as well, adjustment is performed so that the set core flow rate determined by the ratio of Pu-239 in TRU in the new fuel assembly 1L loaded in the core, which is 8.5 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1L taken out of the core can have less TRU than the new fuel assembly 1L.

Specifically, according to the present embodiment, the BWR 19 generating a 1350 MW electric power, which is the same as the electric power of a current ABWR, by using a reactor pressure vessel having almost the same size as the ABWR can achieve a discharge burnup of 65 GWd/t for the core. In the present embodiment, the fission efficiency of TRU is 55%, the void coefficient is $-3 \times 10^{-5}$ $\Delta k/k/\%$ void, MCPR is 1.3, the TRU isotope ratio conservation can be achieved, and the amount of TRU can be reduced.

Sixth Embodiment

Figure 23:
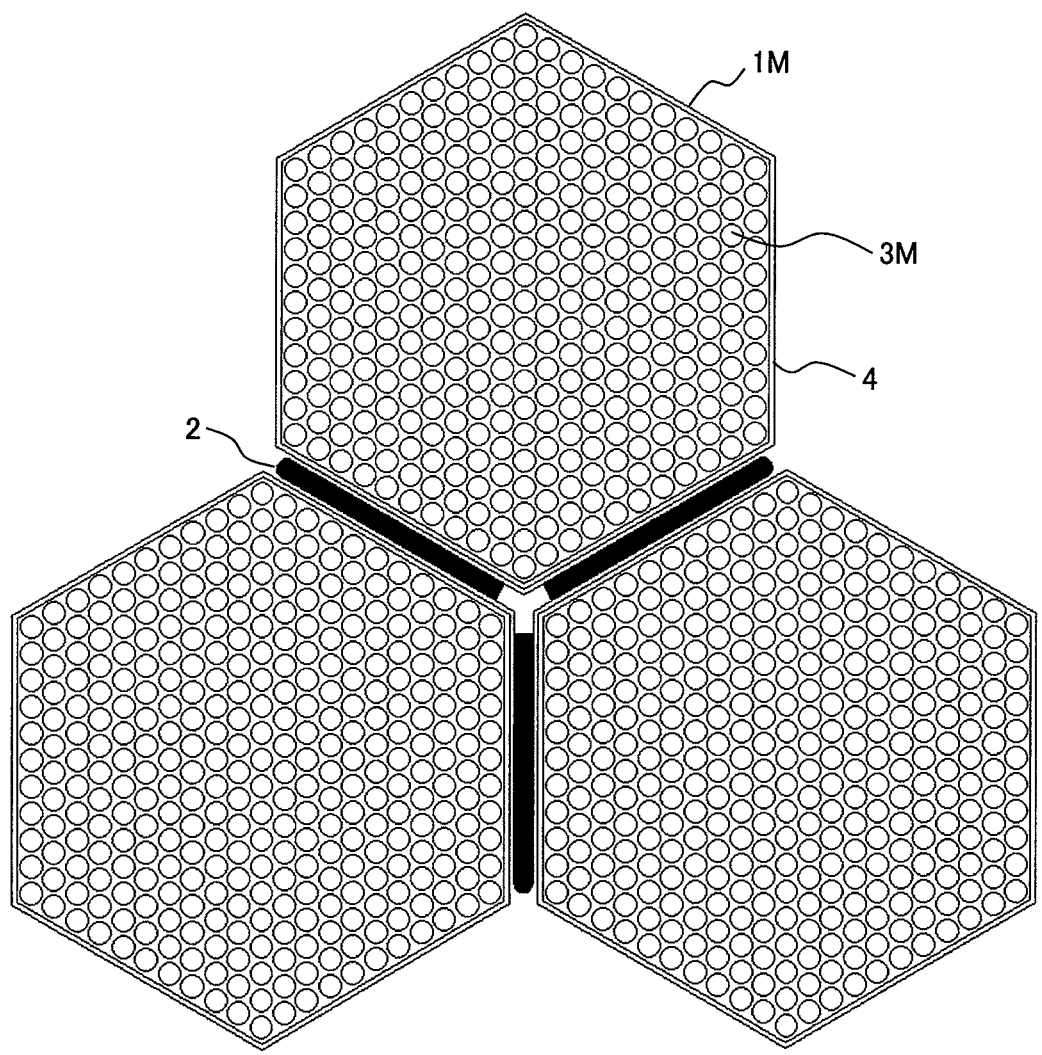
FIG. 23 is an explanatory drawing showing a fuel assembly lattice in a light water reactor according to a sixth embodiment which is another embodiment of the present invention.
Figure 24:
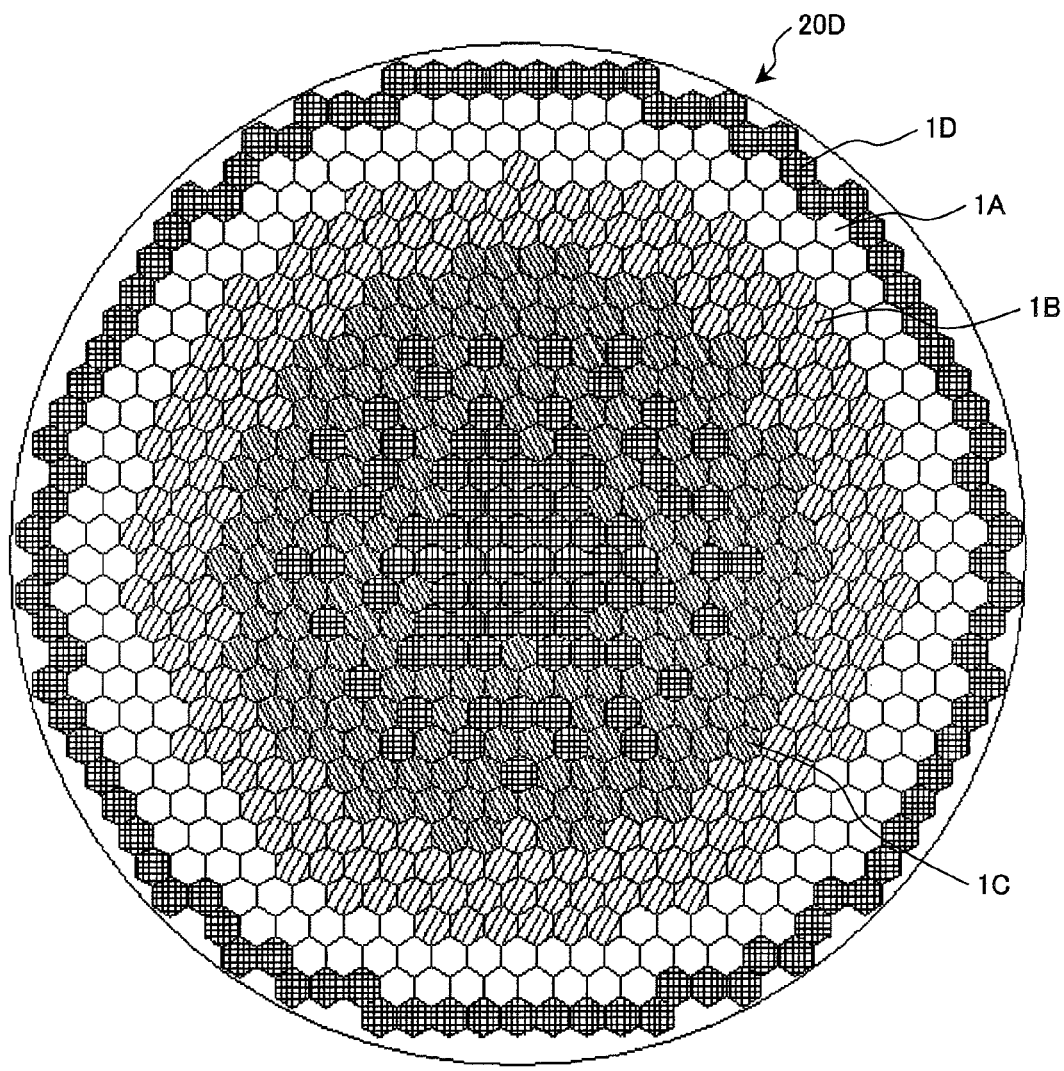
FIG. 24 is an explanatory drawing showing the arrangement of fuel assemblies in an equilibrium core of the light water reactor according to the sixth embodiment.

A light water reactor according to a sixth embodiment which is another embodiment of the present invention will be described below in detail with reference to FIGS. 23 to 25 as well as Table 6. The light water reactor of the present embodiment has a structure in which the core 20 and the fuel assembly 1 in the first embodiment are respectively replaced with a core 20D shown in FIG. 24 and a fuel assembly 1M shown in FIGS. 23 and 25. Other

TABLE 6

| Nuclide | Composition (wt %) |
|---|---|
| Np-237 | 0.2 |
| Pu-238 | 4.2 |
| Pu-239 | 4.0 |
| Pu-240 | 37.7 |
| Pu-241 | 3.4 |
| Pu-242 | 33.0 |
| Am-241 | 4.3 |
| Am-242M | 0.2 |
| Am-243 | 5.7 |
| Cm-244 | 4.4 |
| Cm-245 | 1.3 |
| Cm-246 | 1.1 |
| Cm-247 | 0.2 |
| Cm-248 | 0.3 | structures of the core 20D are the same as in the first embodiment. In the present embodiment, only structures different from the first embodiment will be described. The light water reactor of the present embodiment produces an electric power of 450 MW, and the core 20D is a one fissile zone core.

The fuel assembly 1M (see FIG. 23) disposed in the core 20D has 331 fuel rods 3M with a diameter of 8.7 mm in a regular triangle lattice in the channel box 4. The gap between fuel rods 3M is 1.6 mm. The fuel rod row in the outermost peripheral layer includes 10 fuel rods 3M. The transverse cross section of the fuel pellet occupies 46% of the transverse cross section of a unit fuel rod lattice. FIG. 24 shows the core 20D in state of an equilibrium core. The fuel assemblies 1D, the operation cycle of which is the fourth cycle, are disposed in an outermost peripheral region of the core. A core outer region includes the fuel assemblies 1A, the operation cycle of which is the first cycle. In a core inner region, the fuel assemblies 1B, 1C, and 1D, the operation cycles of which are respectively the second cycle, third cycle, and fourth cycle, are dispersed. There is an intermediate region, in which a plurality of fuel assemblies 1B are disposed in a loop, between the core inner region and the core outer region. In this type of core 20D, the power distribution in its radial directions is more flattened. Each of the fuel assemblies 1A to 1E shown in FIG. 24 is the fuel assembly 1M.

Figure 25:
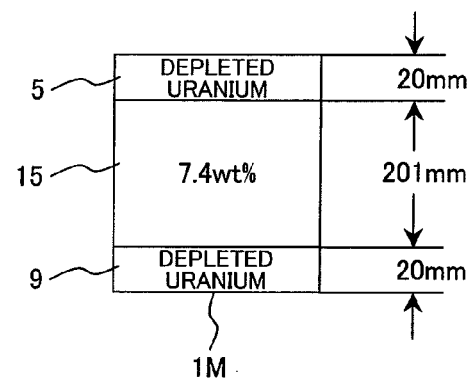
FIG. 25 is an explanatory drawing showing an enrichment distribution of fissionable Pu in a new fuel assembly, in its axial direction, which is to be loaded in an equilibrium core of the core shown in FIG. 24.
Figure 26:
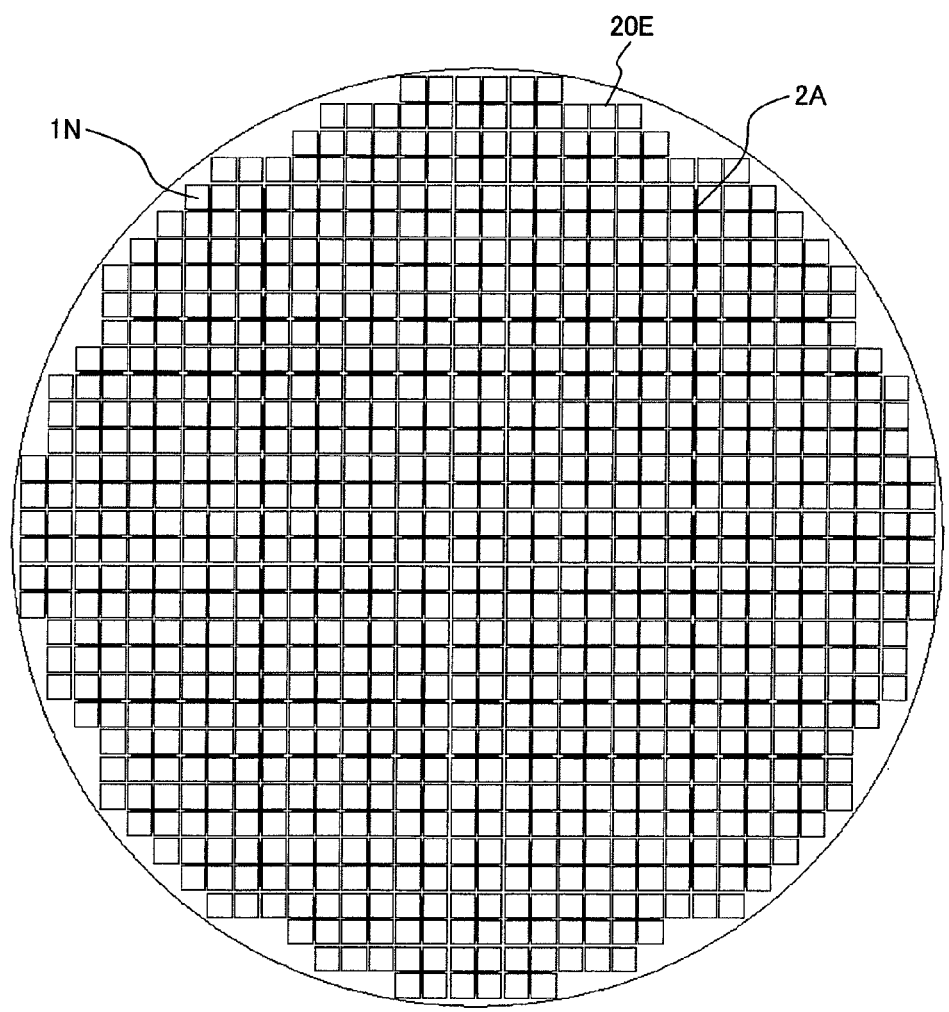
FIG. 26 is a transverse cross sectional view of a core of a light water reactor according to a seventh embodiment which is another embodiment of the present invention.
Figure 27:
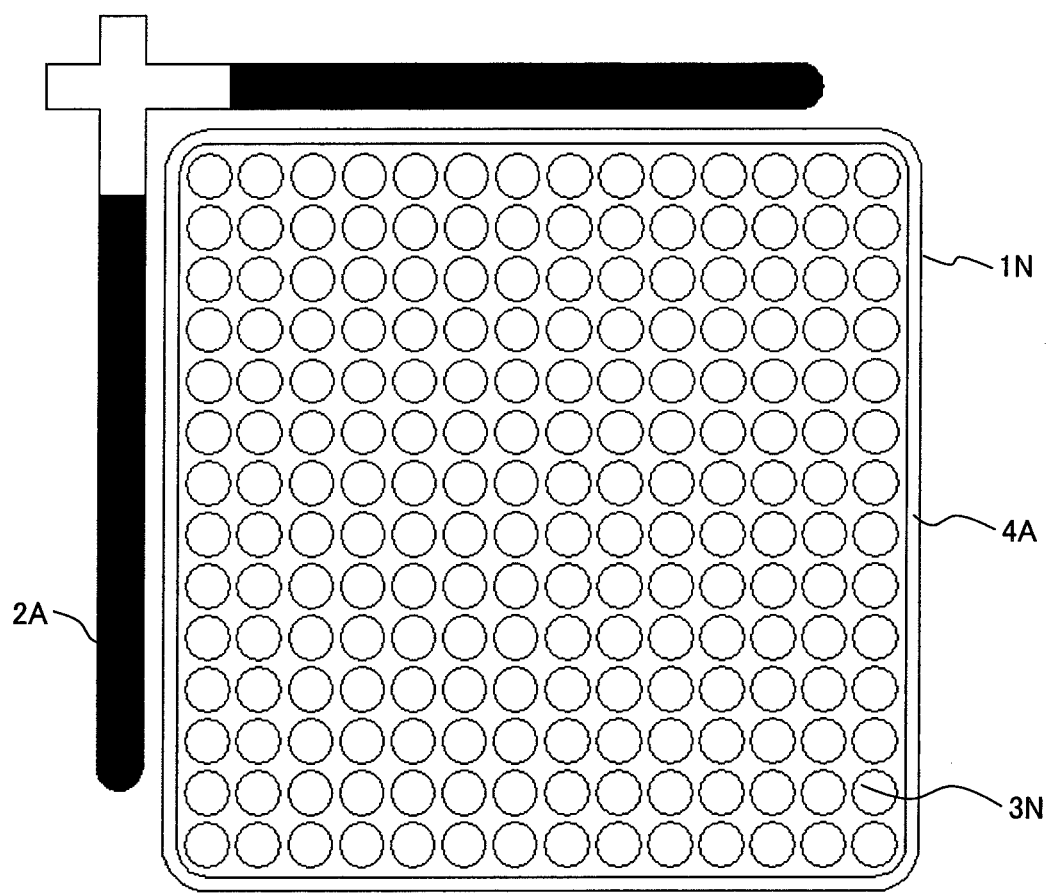
FIG. 27 is an explanatory drawing showing a fuel assembly lattice in the core shown in FIG. 26.

The fuel assembly 1M has three zones within its active fuel length (see FIG. 25). The upper blanket zone 5 is 20 mm high, the lower blanket zone 9 is 20 mm high, and the fissile zone 15 formed between these blanket zones is 201 mm high. When the fuel assembly 1M is a new fuel assembly with a burnup of 0, each fuel rod 3M is loaded with depleted uranium in the two blanket zones and with TRU oxide fuel in the fissile zone 15. The enrichment of fissionable Pu in the TRU oxide fuel is 7.4 wt %. The blanket zones are not loaded with TRU. The fuel assembly 1M also includes fuel rods 3A to 3E, each of which is the fuel rod 3M. The TRU oxide fuel present in the fissile zone 15 includes TRU having the composition indicated in Table 6. When the fuel assembly 1M is a new fuel assembly, the ratio of Pu-239 in all TRU elements is 4.0 wt %.

The core flow rate control apparatus 33 sets a core flow rate setting, which is determined from ratio information (4.0 wt %) and the characteristics shown in FIG. 2. The core flow rate control apparatus 33 controls the internal pump 26 and increases the core flow rate until it reaches the set core flow rate. When the core flow rate reaches the set core flow rate, the core flow rate control apparatus 33 stops the increase of the rotation of the internal pump 26. After that, the core flow rate is maintained at the set flow rate until the BWR 19 is shut down in the operation cycle.

In the present embodiment as well, adjustment is performed so that the set core flow rate determined by the ratio of Pu-239 in TRU in the new fuel assembly 1M loaded in the core 20D, which is 4.0 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1M taken out of the core 20D can have less TRU than the new fuel assembly 1M.

Specifically, according to the present embodiment, the BWR 19 generating a 450 MW electric power by using a reactor pressure vessel having almost the same size as the ABWR can achieve a discharge burnup of 75 GWd/t for the core 20D. In the present embodiment, fission efficiency of TRU is 80%, the void coefficient is $-4 \times 10^{-5}$ $\Delta k/k/\%$ void, MCPR is 1.3, the TRU isotope ratio conservation can be achieved, and the amount of TRU can be reduced.

Seventh Embodiment

A light water reactor according to a seventh embodiment which is another embodiment of the present invention will be described below in detail with reference to FIGS. 26 to 29 as well as Table 7. The light water reactor of the present embodiment has a structure in which the core 20 and the fuel assembly 1 in the first embodiment are respectively replaced with a core 20E shown in FIGS. 26 and 28 and a fuel assembly 1N shown in FIGS. 27 and 29. Other

TABLE 7

| Nuclide | Composition (wt %) |
| --- | --- |
| Np-237 | 0.2 |
| Pu-238 | 5.4 |
| Pu-239 | 12.9 |
| Pu-240 | 40.5 |
| Pu-241 | 4.9 |
| Pu-242 | 20.9 |
| Am-241 | 4.8 |
| Am-242M | 0.2 |
| Am-243 | 4.0 |
| Cm-244 | 3.8 |
| Cm-245 | 1.1 |
| Cm-246 | 0.9 |
| Cm-247 | 0.2 |
| Cm-248 | 0.2 | structures of the core 20E are the same as in the first embodiment. In the present embodiment, only structures different from the first embodiment will be described. The electric power of the core in the present embodiment is 830 MW, which is lower than the electric power in the first embodiment. The core 20E is a parfait-type core.

Figure 28:
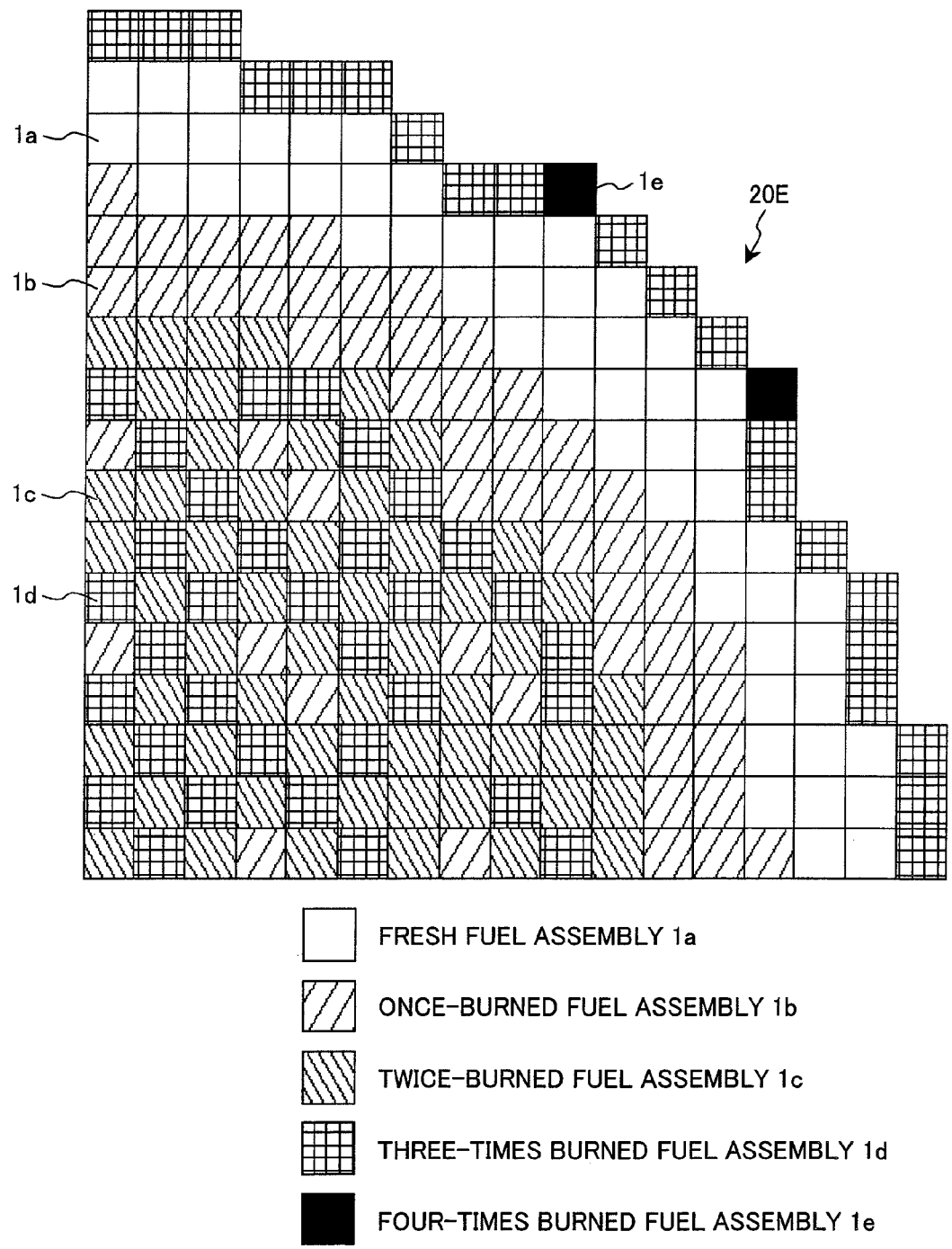
FIG. 28 is an explanatory drawing showing the arrangement of fuel assemblies in an equilibrium core of the core shown in FIG. 26.

The fuel assembly 1N having a square transverse cross section, which is loaded in the core 20E, has 196 fuel rods 3N with a diameter of 8.1 mm in a square grid in a channel box 4A. The pitch between fuel rods 3N is 9.4 mm. Fourteen fuel rods 3M are disposed in a fuel rod row in the outermost peripheral layer. The transverse cross section of the fuel pellet occupies 41% of the transverse cross section of a unit fuel rod lattice. In the core 20E, 872 fuel assemblies 1N are disposed. A cross-shaped control rod 2A is provided for each four fuel assemblies 1N. A water exclusion plate (not shown) is suspended from an upper lattice plate disposed at the top of the core 20E on a side on which no cross-shaped control rods 2A are inserted in a gap area outside the channel box 4A shown in FIG. 27. The water drain plate has a function for excluding water from the gap area outside the channel box 4A. FIG. 28 shows the core 20E in state of an equilibrium core. The fuel assemblies 1d, the operation cycle of which is the fourth cycle, and fuel assemblies 1e, the operation cycle of which is the fifth cycle, are disposed in an outermost peripheral region of the core. A core outer region includes the fuel assemblies 1a, the operation cycle of which is the first cycle. In a core inner region, the fuel assemblies 1b, 1c, and 1d, the operation cycles which are respectively the second cycle, third cycle, and fourth cycle, are dispersed. There is an intermediate region, in which a plurality of fuel assemblies 1b are disposed in a loop, between the core inner region and the core outer region. In this type of core 20E, the power distribution in its radial directions is more flattened.

Figure 29:
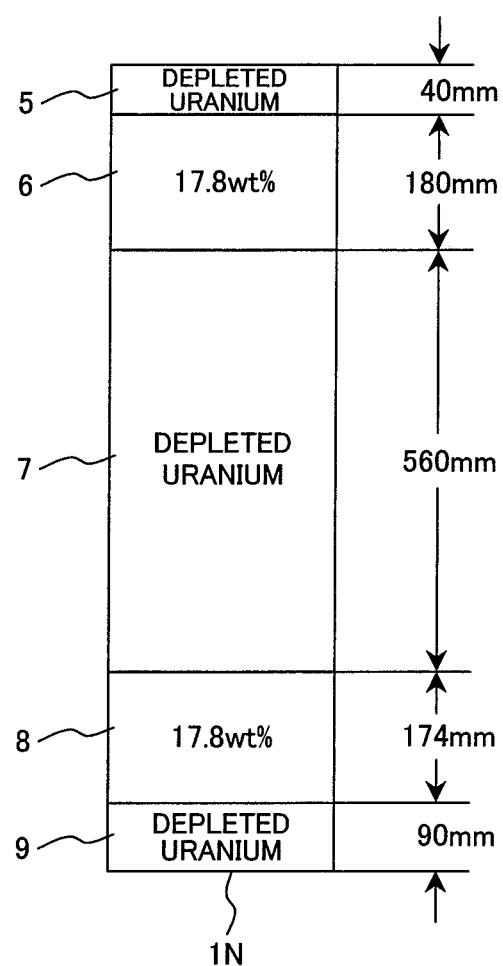
FIG. 29 is an explanatory drawing showing an enrichment distribution of fissionable Pu in a new fuel assembly, in its axial direction, which is to be loaded in the equilibrium core shown in FIG. 28.

The fuel assembly 1N has five zones within its active fuel length (see FIG. 29). The upper blanket zone 5 is 40 mm high, the upper fissile zone 6 is 180 mm high, the internal blanket zone 7 is 560 mm high, the lower fissile zone 8 is 174 mm high, and the lower blanket zone 9 is 90 mm high. When the fuel assembly 1N is a new fuel assembly with a burnup of 0, each fuel rod 3N of the fuel assembly 1N is loaded with depleted uranium in the three blanket zones and with TRU oxide fuel in the upper fissile zone 6 and lower fissile zone 8. The enrichment of fissionable Pu in the TRU fuel is 17.8 wt %. The blanket zones are not loaded with TRU. The TRU oxide fuel present in the upper fissile zone 6 and lower fissile zone 8 includes TRU having the composition indicated in Table 7. When the fuel assembly 1N is a new fuel assembly, the ratio of Pu-239 in all TRU elements is 12.9 wt %.

The core flow rate control apparatus 33 sets a set core flow rate, which is determined from ratio information (12.9 wt %) and the characteristics shown in FIG. 2. The core flow rate control apparatus 33 controls the internal pump 26 and increases the core flow rate until it reaches the set core flow rate. When the core flow rate reaches the set core flow rate, the core flow rate control apparatus 33 stops the increase of the rotation of the internal pump 26. After that, the core flow rate is maintained at the set flow rate until the BWR 19 is shut down in the operation cycle.

In the present embodiment as well, adjustment is performed so that the set core flow rate determined by the ratio of Pu-239 in TRU in the new fuel assembly 1N loaded in the core, which is 12.9 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1N taken out of the core can have less TRU than the new fuel assembly 1N.

Specifically, according to the present embodiment, a current ABWR generating an 848 MW electric power can be used to achieve a discharge burnup of 45 GWd/t for the core 20E. In the present embodiment, the fission efficiency of TRU is 43%, the void coefficient is $-2\times10^{-5}$ $\Delta k/k/\%$ void, MCPR is 1.3, the TRU isotope ratio conservation can be achieved, and the amount of TRU can be reduced.

Eighth Embodiment

Figure 30:
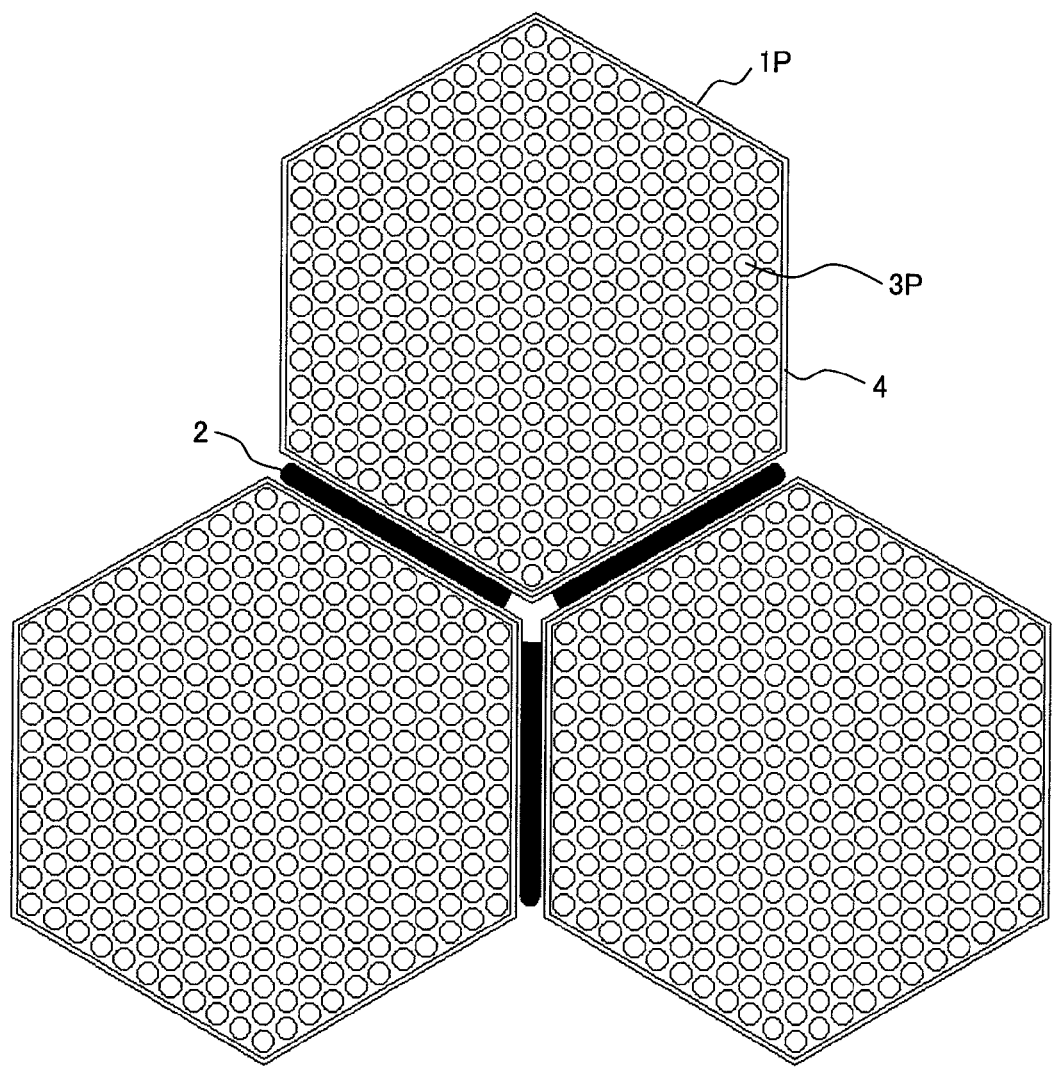
FIG. 30 is an explanatory drawing showing a fuel assembly lattice in a light water reactor according to a eighth embodiment which is another embodiment of the present invention.
Figure 31:
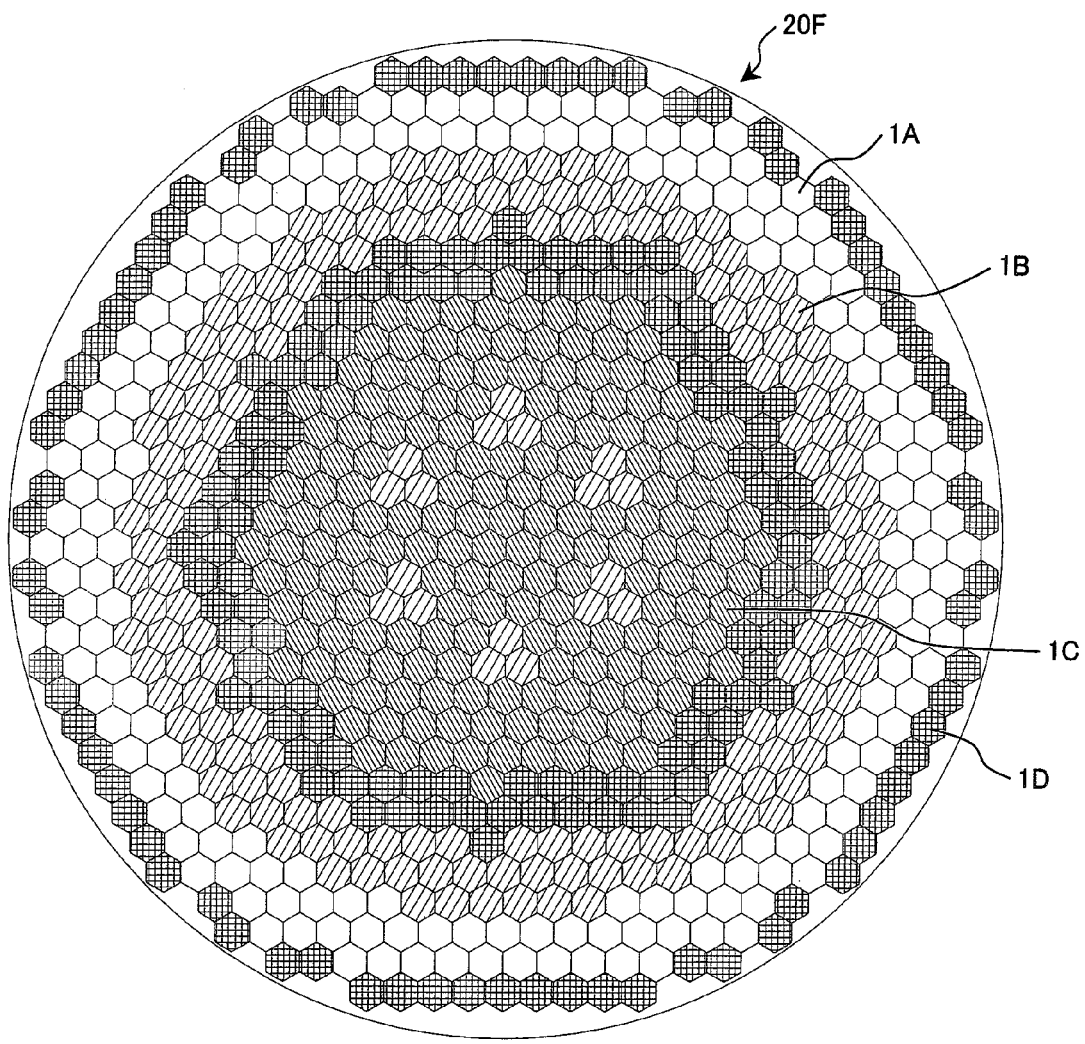
FIG. 31 is an explanatory drawing showing the arrangement of fuel assemblies in an equilibrium core of the light water reactor according to the eighth embodiment.
Figure 31:
Figure 31:
Figure 31:
Figure 31:

A light water reactor according to an eighth embodiment which is another embodiment of the present invention will be described below in detail with reference to FIGS. 30 to 32 as well as Table 8. The light water reactor of the present embodiment has a structure in which the core 20 and the fuel assembly 1 in the first embodiment are respectively replaced with a core 20F shown in FIG. 31 and a fuel assembly 1P shown in FIGS. 30 and 32. Other

TABLE 8

| Nuclide | Composition (wt %) |
|---|---|
| Np-237 | 0.5 |
| Pu-238 | 4.2 |
| Pu-239 | 31.6 |
| Pu-240 | 38.7 |
| Pu-241 | 5.8 |
| Pu-242 | 8.9 |
| Am-241 | 4.2 |
| Am-242M | 0.2 |
| Am-243 | 2.3 |
| Cm-244 | 2.3 |
| Cm-245 | 0.7 |
| Cm-246 | 0.4 |
| Cm-247 | 0.1 |
| Cm-248 | 0.1 | structures of the core 20F are the same as in the first embodiment. In the present embodiment, only structures different from the first embodiment will be described. The electric power of the core in the present embodiment is 1350 MW. The core 20F is a parfait-type core.

The fuel assembly 1P disposed in the core 20F has 331 fuel rods 3P with a diameter of 8.7 mm in a regular triangle lattice in the channel box 4. The gap between fuel rods 3P is 1.6 mm. The fuel rod row in the outermost peripheral layer includes 10 fuel rods 3P. The transverse cross section of the fuel pellet occupies 47% of the transverse cross section of a unit fuel rod lattice. In a state of an equilibrium core, the core 20F disposes the fuel assemblies 1D, the operation cycle of which is the fourth cycle, in the outermost peripheral region and the fuel assemblies 1A, the operation cycle of which is the first cycle, in a core outer region. In a core inner region, the fuel assemblies 1B, 1C, and 1D, the operation cycles of which are respectively the second cycle, third cycle, and fourth cycle, are dispersed. There is an intermediate region, in which a plurality of fuel assemblies 1B are disposed in a loop, between the core inner region and the core outer region. In this type of core 20F, the power distribution in its radial directions is more flattened. Each of the fuel assemblies 1A to 1E shown in FIG. 31 is the fuel assembly 1P.

Figure 32:
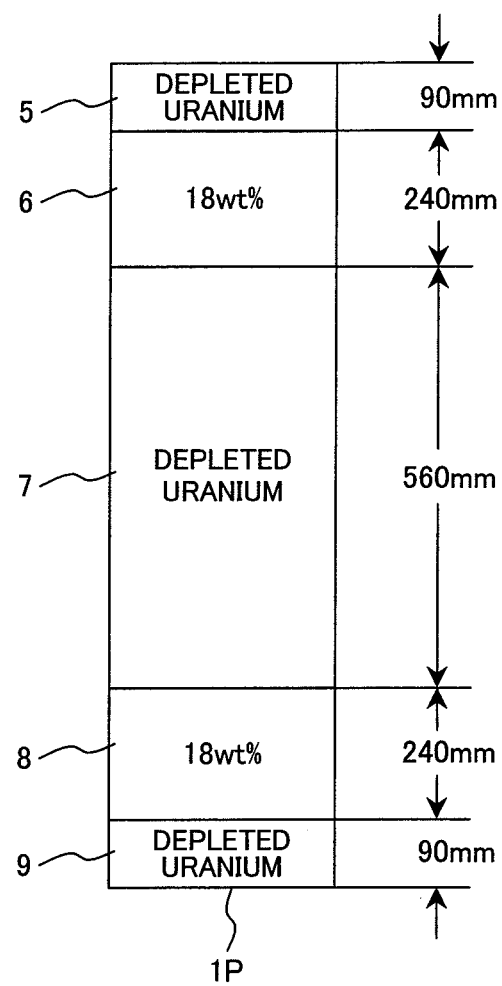
FIG. 32 is an explanatory drawing showing an enrichment distribution of fissionable Pu in a new fuel assembly, in its axial direction, which is to be loaded in an equilibrium core of the core shown in FIG. 31.

The fuel assembly 1P has five zones within its active fuel length (see FIG. 32). The upper blanket zone 5 is 90 mm high, the upper fissile zone 6 is 240 mm high, the internal blanket zone 7 is 560 mm high, the lower fissile zone 8 is 240 mm high, and the lower blanket zone 9 is 90 mm high. When the fuel assembly 1P is a new fuel assembly with a burnup of 0, each fuel rod 3P of the fuel assembly 1P is loaded with depleted uranium in the three blanket zones and with mixed oxide fuel in the upper fissile zone 6 and lower fissile zone 8, the mixed oxide fuel including 108 parts by weight of depleted uranium per 100 parts by weight of TRU. The enrichment of fissionable Pu in the mixed oxide fuel is 18 wt %. The blanket zones are not loaded with TRU. The fuel assembly 1P also includes fuel rods 3A to 3E, each of which is the fuel rod 3P. The mixed oxide fuel includes TRU having the composition indicated in Table 8. When the fuel assembly 1P is a new fuel assembly, the ratio of Pu-239 in all TRU elements is 31.6 wt %.

The core flow rate control apparatus 33 sets a set core flow rate, which is determined from ratio information (31.6 wt %) and the characteristics shown in FIG. 2. The core flow rate control apparatus 33 controls the internal pump 26 and increases the core flow rate until it reaches the set core flow rate. The core flow rate is maintained at the set flow rate until the BWR 19 is shut down in the operation cycle.

In the present embodiment as well, adjustment is performed so that the set core flow rate determined by the ratio of Pu-239 in TRU in the new fuel assembly 1P loaded in the core, which is 31.6 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1P taken out of the core can have less TRU than the new fuel assembly 1P.

According to the present embodiment, the BWR 19 generating a 1350 MW electric power, which is the same as the electric power of a current ABWR, by using a reactor pressure vessel having almost the same size as the ABWR can increase the discharger burnup of 57 GWd/t for the core 20F. In the present embodiment, the void coefficient is $-2\times10^{-5}$ $\Delta k/k/\%$ void, the fission efficiency of TRU is 15%, MCPR is 1.3, the TRU isotope ratio conservation can be achieved, and the amount of TRU can be reduced.

Ninth Embodiment

Figure 33:
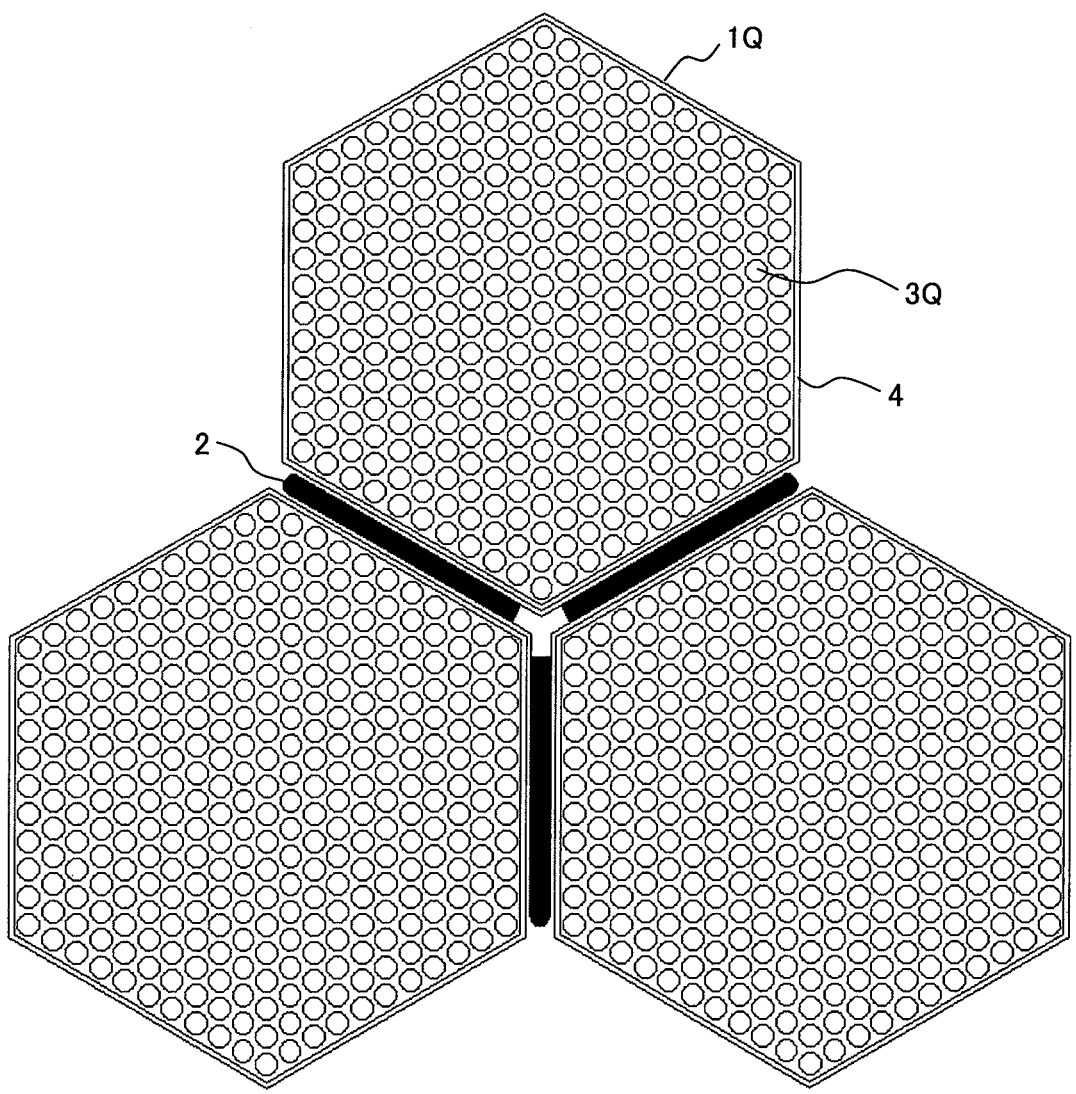
FIG. 33 is an explanatory drawing showing a fuel assembly lattice in a light water reactor according to a ninth embodiment which is another embodiment of the present invention.
Figure 34:
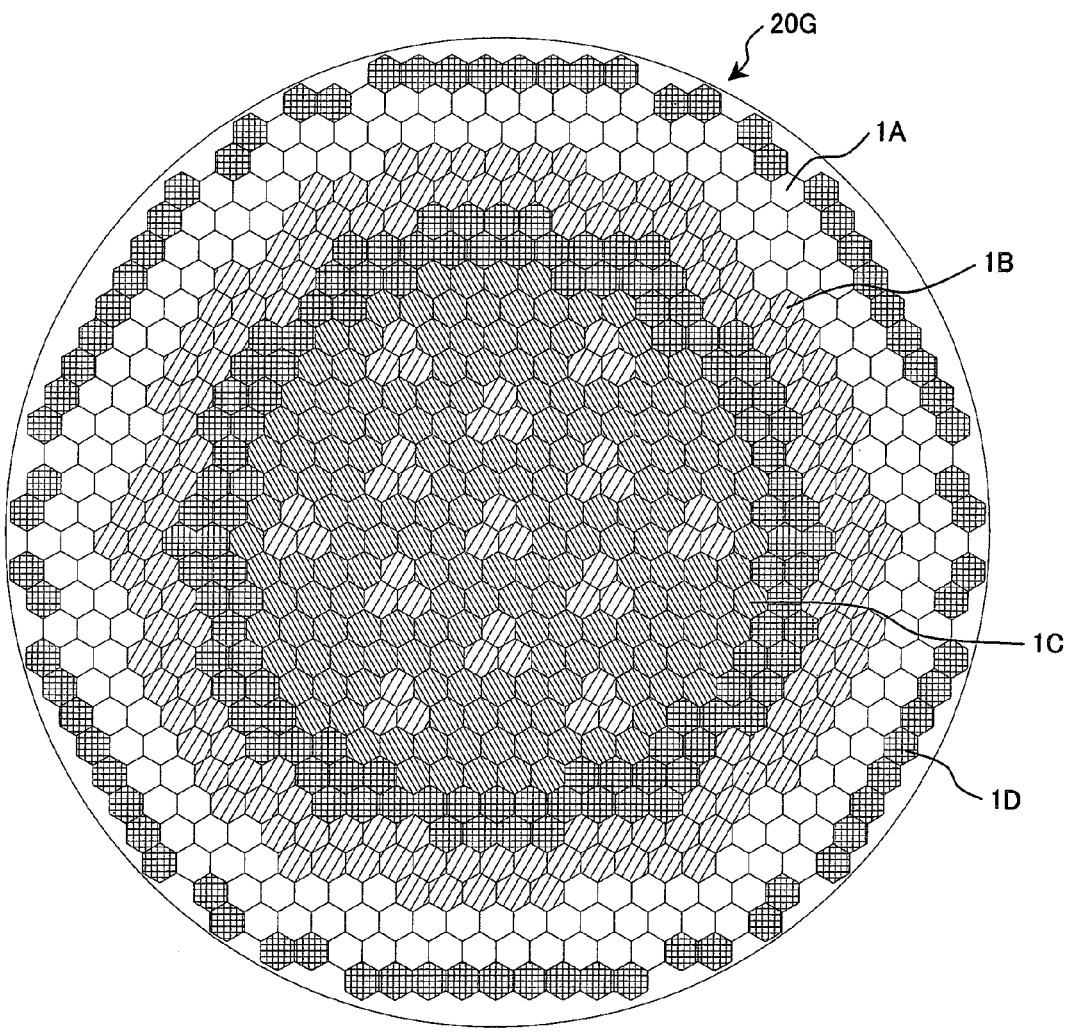
FIG. 34 is an explanatory drawing showing the arrangement of fuel assemblies in an equilibrium core of the light water reactor according to the ninth embodiment.
Figure 34:
Figure 34:
Figure 34:
Figure 34:

A light water reactor according to a ninth embodiment which is another embodiment of the present invention will be described below in detail with reference to FIGS. 33 to 35 as well as Table 9. The light water reactor of the present embodiment has a structure in which the core 20 and the fuel assembly 1 in the first embodiment are respectively replaced with a core 20G shown in FIG. 34 and a fuel assembly 1Q shown in FIGS. 33 and 35. Other

TABLE 9

| Nuclide | Composition (wt %) |
|---|---|
| Np-237 | 0.4 |
| Pu-238 | 4.6 |
| Pu-239 | 26.4 |
| Pu-240 | 39.9 |
| Pu-241 | 5.8 |
| Pu-242 | 11.2 |
| Am-241 | 4.4 |
| Am-242M | 0.2 |
| Am-243 | 2.7 |
| Cm-244 | 2.8 |
| Cm-245 | 0.9 |
| Cm-246 | 0.5 |
| Cm-247 | 0.1 |
| Cm-248 | 0.1 | structures of the core 20G are the same as in the first embodiment. In the present embodiment, only structures different from the first embodiment will be described. The core 20G is a parfait-type core.

The fuel assembly 1Q disposed in the core 20G has 331 fuel rods 3Q with a diameter of 8.5 mm in a regular triangle lattice in the channel box 4. The gap between fuel rods 3Q is 1.8 mm. The fuel rod row in the outermost peripheral layer includes 10 fuel rods 3Q. The transverse cross section of the fuel pellet occupies 45% of the transverse cross section of a unit fuel rod lattice. In a state of an equilibrium core, the core 20F disposes the fuel assemblies 1D, the operation cycle of which is the fourth cycle, in the outermost peripheral region and the fuel assemblies 1A, the operation cycle of which is the first cycle, in a core outer region. In a core inner region, the fuel assemblies 1B, 1C, and 1D, the operation cycles of which are respectively the second cycle, third cycle, and fourth cycle, are dispersed. There is an intermediate region, in which a plurality of fuel assemblies 1B are disposed in a loop, between the core inner region and the core outer region. In this type of core 20G, the power distribution in its radial directions is more flattened. Each of the fuel assemblies 1A to 1E shown in FIG. 34 is the fuel assembly 1Q.

Figure 35:
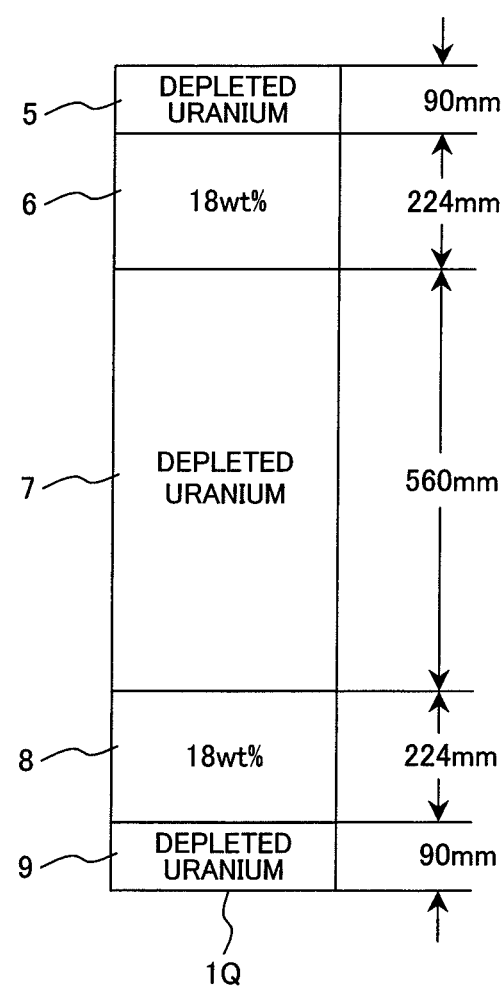
FIG. 35 is an explanatory drawing showing an enrichment distribution of fissionable Pu in a new fuel assembly, in its axial direction, which is to be loaded in an equilibrium core of the core shown in FIG. 34.

The fuel assembly 1Q has five zones within its active fuel length (see FIG. 35). The upper blanket zone 5 is 90 mm high, the upper fissile zone 6 is 224 mm high, the internal blanket zone 7 is 560 mm high, the lower fissile zone 8 is 224 mm high, and the lower blanket zone 9 is 90 mm high. When the fuel assembly 1Q is a new fuel assembly with a burnup of 0, each fuel rod 3Q of the fuel assembly 1Q is loaded with depleted uranium in the three blanket zones and with mixed oxide fuel in the upper fissile zone 6 and lower fissile zone 8, the mixed oxide fuel including 79 parts by weight of depleted uranium per 100 parts by weight of TRU. The enrichment of fissionable Pu in the mixed oxide fuel is 18 wt %. The blanket zones are not loaded with TRU. The fuel assembly 1Q also includes fuel rods 3A to 3E, each of which is the fuel rod 3Q. The mixed oxide fuel includes TRU having the composition indicated in Table 9. When the fuel assembly 1Q is a new fuel assembly, the ratio of Pu-239 in all TRU elements is 26.4 wt %.

The core flow rate control apparatus 33 sets a set core flow rate, which is determined from ratio information (26.4 wt %) and the characteristics shown in FIG. 2. The core flow rate control apparatus 33 controls the internal pump 26 and increases the core flow rate until it reaches the set core flow rate. The core flow rate is maintained at the set flow rate until the BWR 19 is shut down in the operation cycle.

In the present embodiment as well, adjustment is performed so that the set core flow rate determined by the ratio of Pu-239 in TRU in the new fuel assembly 1Q loaded in the core, which is 26.4 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1Q taken out of the core can have less TRU than the new fuel assembly 1Q.

According to the present embodiment, the BWR 19 generating a 1350 MW electric power, which is the same as the electric power of a current ABWR, by using a reactor pressure vessel having almost the same size as the ABWR can increase the discharge burnup of 58 GWd/t for the core 20G. In the present embodiment, the void coefficient is $-3 \times 10^{-5}$ $\Delta k/k/\%$ void, the fission efficiency of TRU is 22%, MCPR is 1.3, the TRU isotope ratio conservation can be achieved, and the amount of TRU can be reduced.

Tenth Embodiment

A light water reactor according to a tenth embodiment which is another embodiment of the present invention will be described below in detail with reference to FIGS. 36 and 37 as well as Table 10. The light water reactor of the present embodiment has a structure in which the fuel assembly 1Q disposed in the core 20G in the ninth embodiment is replaced with a fuel assembly 1R shown in FIGS. 36 and 37. Other structures of the core 20G are the

TABLE 10

| Nuclide | Composition (wt %) |
|---|---|
| Np-237 | 0.3 |
| Pu-238 | 5.1 |
| Pu-239 | 19.7 |
| Pu-240 | 40.6 |
| Pu-241 | 5.3 |
| Pu-242 | 15.3 |
| Am-241 | 4.7 |
| Am-242M | 0.2 |
| Am-243 | 3.4 |
| Cm-244 | 3.4 |
| Cm-245 | 1.1 |
| Cm-246 | 0.7 |
| Cm-247 | 0.1 |
| Cm-248 | 0.1 | same as in the ninth embodiment. In the present embodiment, only structures different from the ninth embodiment will be described. The core used in this embodiment is also a parfait-type core.

Figure 36:
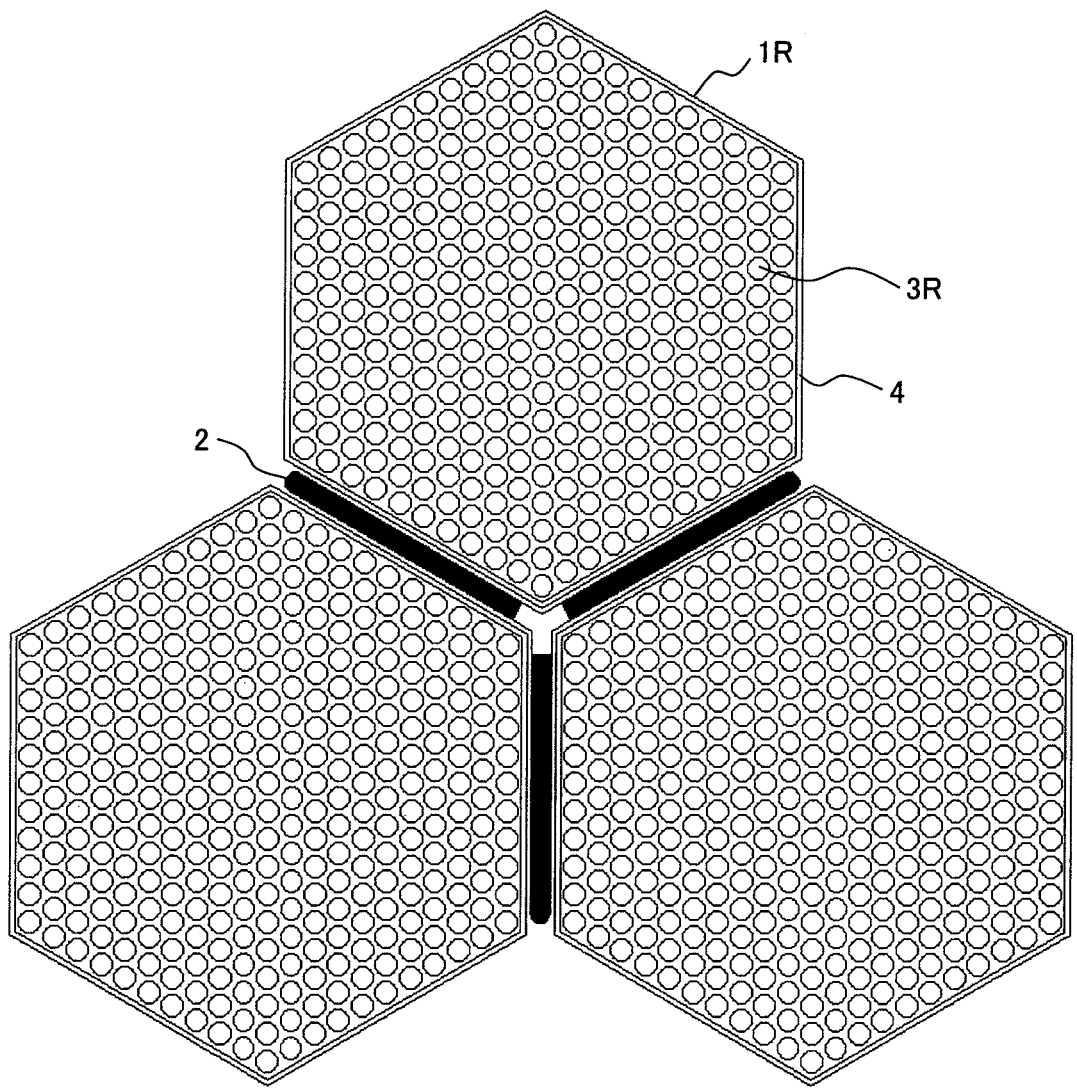
FIG. 36 is an explanatory drawing showing a fuel assembly lattice in a light water reactor according to a tenth embodiment which is another embodiment of the present invention.
Figure 37:
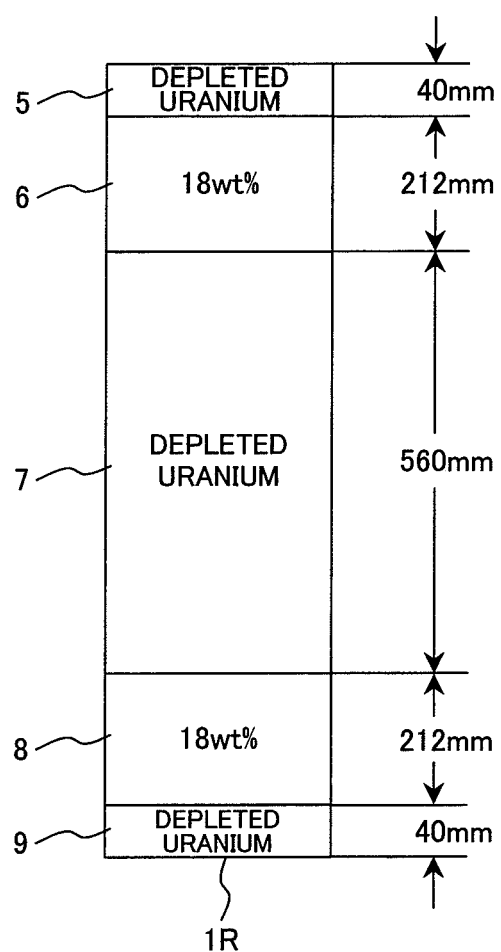
FIG. 37 is an explanatory drawing showing an enrichment distribution of fissionable Pu in a new fuel assembly, in its axial direction, which is to be loaded in a core of the light water reactor according to the tenth embodiment.

As shown in FIGS. 36 and 37, the fuel assembly 1R has 331 fuel rods 3R with a diameter of 8.1 mm in a regular triangle lattice in the channel box 4. The gap between fuel rods 3R is 2.2 mm. The fuel rod row in the outermost peripheral layer includes 10 fuel rods 3R. The transverse cross section of the fuel pellet occupies 40% of the transverse cross section of a unit fuel rod lattice. The fuel assemblies 1R in the present embodiment are disposed in its radial directions in the same arrangement as in FIG. 34.

As with the fuel assembly 1Q, the fuel assembly 1R has five zones within its active fuel length (see FIG. 37). The upper blanket zone 5 is 40 mm high, the upper fissile zone 6 is 212 mm high, the internal blanket zone 7 is 560 mm high, the lower fissile zone 8 is 212 mm high, and the lower blanket zone 9 is 40 mm high. When the fuel assembly 1R is a new fuel assembly with a burnup of 0, each fuel rod 3R of the fuel assembly 1R is loaded with depleted uranium in the three blanket zones and with mixed oxide fuel in the upper fissile zone 6 and lower fissile zone 8, the mixed oxide fuel including 39 parts by weight of depleted uranium per 100 parts by weight of TRU. The enrichment of fissionable Pu in the mixed oxide fuel is 18 wt %. The blanket zones are not loaded with TRU. The fuel assembly 1R also includes fuel rods 3A to 3E, each of which is the fuel rod 3R. The mixed oxide fuel present in the upper fissile zone 6 and lower fissile zone 8 includes TRU having the composition indicated in Table 10. When the fuel assembly 1R is a new fuel assembly, the ratio of Pu-239 in all TRU elements is 19.7 wt %.

The core flow rate control apparatus 33 sets a set core flow rate, which is determined from ratio information (19.7 wt %) and the characteristics shown in FIG. 2. The core flow rate control apparatus 33 controls the internal pump 26 and increases the core flow rate until it reaches the set core flow rate. The core flow rate is maintained at the set core flow rate until the BWR 19 is shut down in the operation cycle.

In the present embodiment as well, adjustment is performed so that the set core flow rate determined by the ratio of Pu-239 in TRU in the new fuel assembly 1R loaded in the core, which is 19.7 wt %, is reached, so the TRU isotope ratio conservation can be implemented as in the first embodiment.

In the present embodiment, therefore, the burnup can be further increased and TRU multi-recycling becomes feasible. In the present embodiment, the fuel assembly 1R taken out of the core can have less TRU than the new fuel assembly 1R.

According to the present embodiment, the BWR 19 generating a 1350 MW electric power, which is the same as the electric power of a current ABWR, by using a reactor pressure vessel having almost the same size as the ABWR can increase the discharge burnup of 59 GWd/t for the core. In the embodiment, the void coefficient is $-4\times10^{-5}$ $\Delta k/k/\%$ void, the fission efficiency of TRU is 34%, MCPR is 1.3, the TRU isotope ratio conservation can be achieved, and the amount of TRU can be reduced.

Eleventh Embodiment

A light water reactor according to an eleventh embodiment which is another embodiment of the present invention will be described below in detail with reference to FIGS. 38 and 39 as well as Table 11. The light water reactor of the present embodiment has a structure in which the fuel assembly 1K disposed in the core 20C in the fourth embodiment is replaced with a fuel assembly 1S shown in FIGS. 38 and 39. Other structures of the core are the same

TABLE 11

| Nuclide | Composition (wt %) |
|---|---|
| Np-237 | 0.2 |
| Pu-238 | 5.1 |
| Pu-239 | 12.9 |
| Pu-240 | 40.8 |
| Pu-241 | 4.7 |
| Pu-242 | 21.2 |
| Am-241 | 4.7 |
| Am-242M | 0.2 |
| Am-243 | 4.1 |
| Cm-244 | 3.7 |
| Cm-245 | 1.1 |
| Cm-246 | 0.9 |
| Cm-247 | 0.2 |
| Cm-248 | 0.2 | as in the fourth embodiment. In the present embodiment, only structures different from the fourth embodiment will be described. The core used in the present embodiment is also a parfait-type core.

Figure 38:
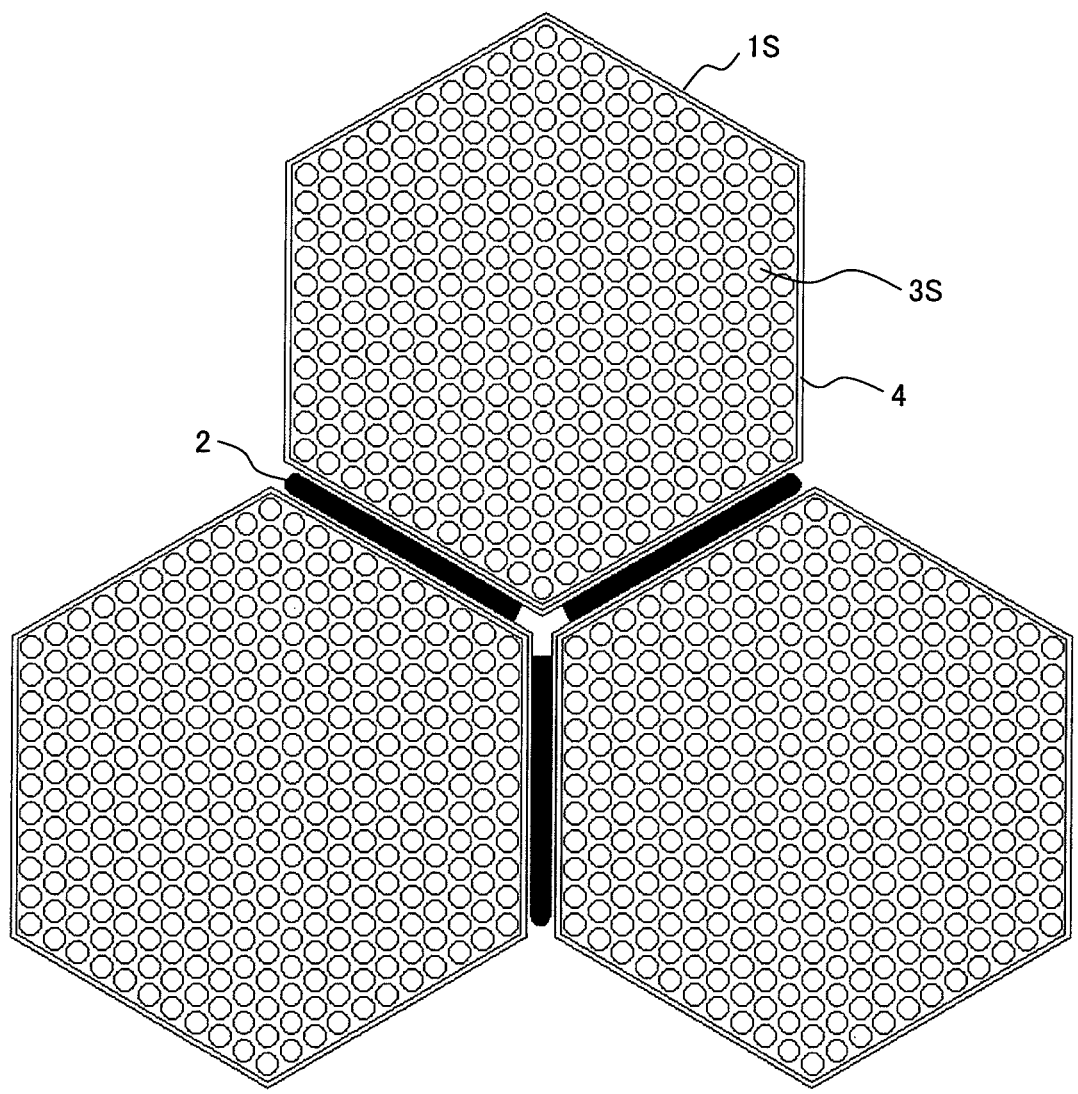
FIG. 38 is an explanatory drawing showing a fuel assembly lattice in a light water reactor according to a eleventh embodiment which is another embodiment of the present invention.
Figure 39:
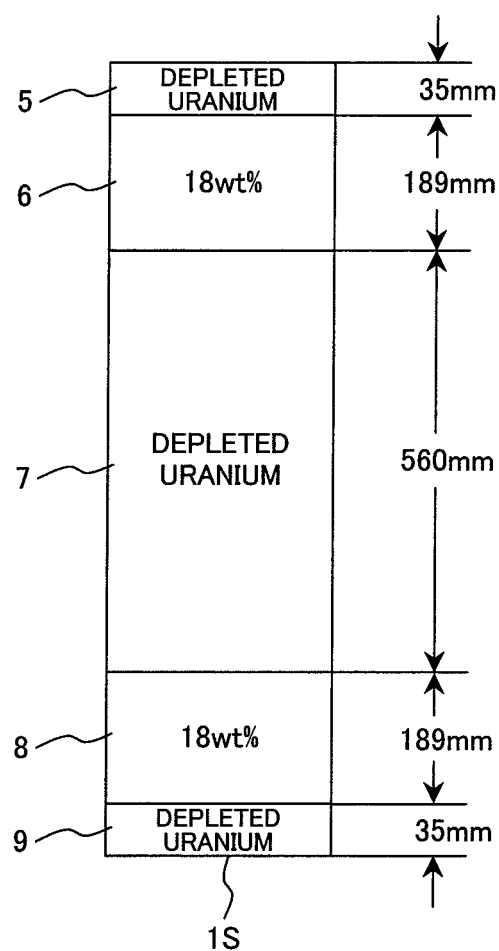
FIG. 39 is an explanatory drawing showing an enrichment distribution of fissionable Pu in a new fuel assembly, in its axial direction, which is to be loaded in a core of the light water reactor according to the eleventh embodiment.

As shown in FIGS. 38 and 39, the fuel assembly 1S has 331 fuel rods 3S with a diameter of 7.6 mm in a regular triangle lattice in the channel box 4. The gap between fuel rods 3S is 2.7 mm. The fuel rod row in the outermost peripheral layer includes 10 fuel rods 3S. The transverse cross section of the fuel pellet occupies 35% of the transverse cross section of a unit fuel rod lattice. The fuel assemblies 1S in the present embodiment are disposed in its radial directions in the same arrangement as in FIG. 19.

As with the fuel assembly 1K, the fuel assembly 1S has five zones within its active fuel length (see FIG. 39). The upper blanket zone 5 is 35 mm high, the upper fissile zone 6 is 189 mm high, the internal blanket zone 7 is 560 mm high, the lower fissile zone 8 is 189 mm high, and the lower blanket zone 9 is 35 mm high. When the fuel assembly 1S is a new fuel assembly with a burnup of 0, each fuel rod 3S of the fuel assembly 1S is loaded with depleted uranium in the three blanket zones and with TRU oxide fuel in the upper fissile zone 6 and lower fissile zone 8. The enrichment of fissionable Pu in the TRU oxide fuel is 18 wt %. The blanket zones are not loaded with TRU. The fuel assembly 1S also includes fuel rods 3A to 3E, each of which is the fuel rod 3S. The TRU oxide fuel present in the upper fissile zone 6 and lower fissile zone 8 includes TRU having the composition indicated in Table 10. When the fuel assembly 1S is a new fuel assembly, the ratio of Pu-239 in all TRU elements is 12.9 wt %.

The core flow rate control apparatus 33 sets a set core flow rate, which is determined from ratio information (12.9 wt %) and the characteristics shown in FIG. 2. The core flow rate control apparatus 33 controls the internal pump 26 and increases the core flow rate until it reaches the set core flow rate. The core flow rate is maintained at the set core flow rate until the BWR 19 is shut down in the operation cycle.

In the present embodiment as well, adjustment is performed so that the set core flow rate setting determined by the ratio of Pu-239 in TRU in the new fuel assembly 1S loaded in the core, which is 12.9 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1S taken out of the core can have less TRU than the new fuel assembly 1S.

According to the present embodiment, the BWR 19 generating a 1350 MW electric power, which is the same as the electric power of a current ABWR, by using a reactor pressure vessel having almost the same size as the ABWR can attain a discharge burnup of 65 GWd/t for the core. In the embodiment, the fission efficiency of TRU is 47%, the void coefficient is $-3\times10^{-4}$ $\Delta k/k/\%$ void, MCPR is 1.3, the TRU isotope ratio conservation can be achieved, and the amount of TRU can be reduced.

Twelfth Embodiment

Figure 40:
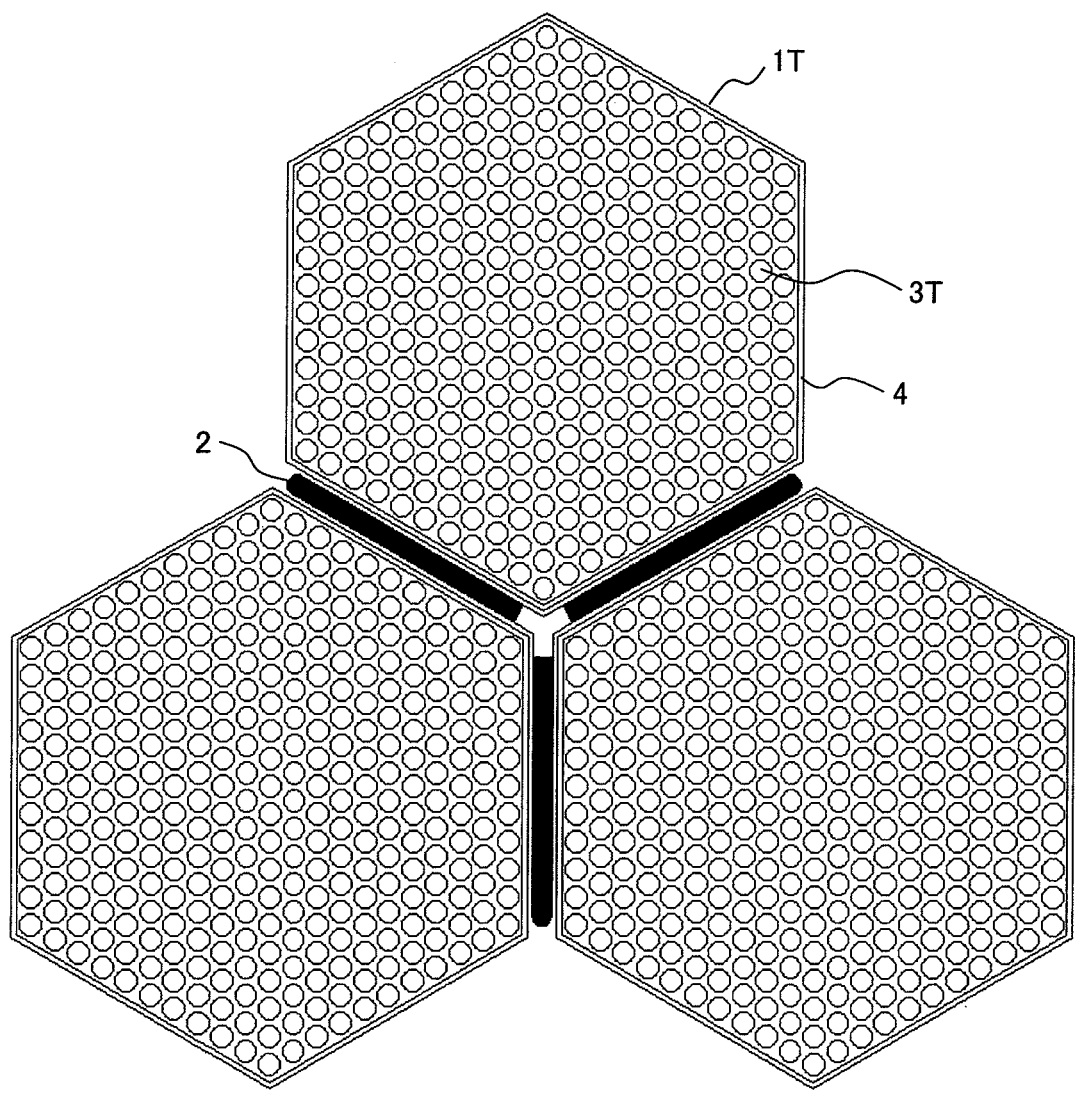
FIG. 40 is an explanatory drawing showing a fuel assembly lattice in a light water reactor according to a twelfth embodiment which is another embodiment of the present invention.

A light water reactor according to a twelfth embodiment which is another embodiment of the present invention will be described below in detail with reference to FIGS. 40 and 41 as well as Table 12. The light water reactor of the present embodiment has a structure in which the fuel assembly 1K disposed in the core 20C in the fourth embodiment is replaced with a fuel assembly 1T shown in FIGS. 40 and 41. Other structures of the core of the

TABLE 12

| Nuclide | Composition (wt %) |
|---|---|
| Np-237 | 0.2 |
| Pu-238 | 5.2 |
| Pu-239 | 11.0 |
| Pu-240 | 40.5 |
| Pu-241 | 4.8 |
| Pu-242 | 22.6 |
| Am-241 | 4.6 |
| Am-242M | 0.2 |
| Am-243 | 4.3 |
| Cm-244 | 4.1 |
| Cm-245 | 1.2 |
| Cm-246 | 0.9 |
| Cm-247 | 0.2 |
| Cm-248 | 0.2 | present embodiment are the same as in the fourth embodiment. In the present embodiment, only structures different from the fourth embodiment will be described. The core used in this embodiment is also a parfait-type core.

The fuel assembly 1T has 331 fuel rods 3T with a diameter of 7.5 mm in a regular triangle lattice in the channel box 4. The gap between fuel rods 3T is 2.8 mm. The fuel rod row in the outermost peripheral layer includes 10 fuel rods 3T. The transverse cross section of the fuel pellet occupies 34% of the transverse cross section of a unit fuel rod lattice. The fuel assemblies 1T of the present embodiment are disposed in its radial directions in the same arrangement as in FIG. 19.

Figure 41:
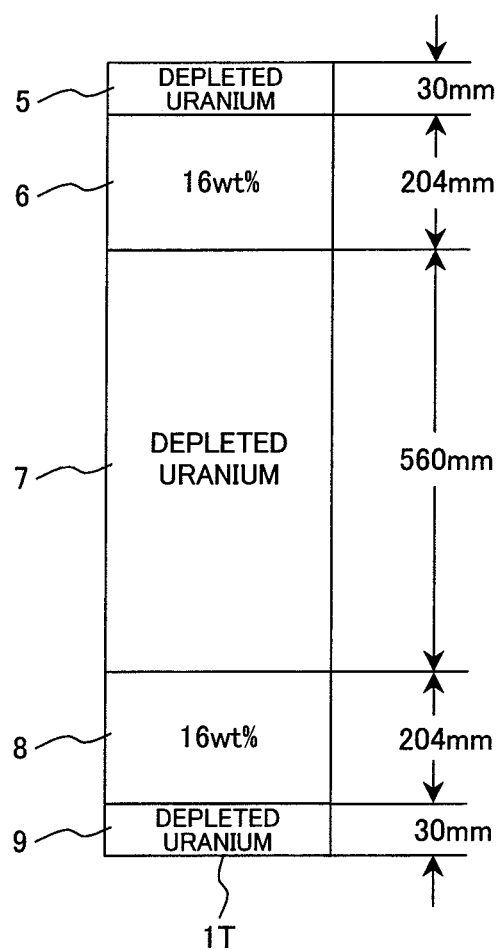
FIG. 41 is an explanatory drawing showing an enrichment distribution of fissionable Pu in a new fuel assembly, in its axial direction, which is to be loaded in a core of the light water reactor according to the twelfth embodiment.

As with the fuel assembly 1K, the fuel assembly 1T has five zones within its active fuel length (see FIG. 41). The upper blanket zone 5 is 30 mm high, the upper fissile zone 6 is 204 mm high, the internal blanket zone 7 is 560 mm high, the lower fissile zone 8 is 204 mm high, and the lower blanket zone 9 is 30 mm high. When the fuel assembly 1T is a new fuel assembly with a burnup of 0, each fuel rod 3T of the fuel assembly 1T is loaded with depleted uranium in the three blanket zones and with TRU oxide fuel in the upper fissile zone 6 and lower fissile zone 8. The enrichment of fissionable Pu in the TRU oxide fuel is 16 wt %. The blanket zones are not loaded with TRU. The fuel assembly 1T also includes fuel rods 3A to 3E, each of which is the fuel rod 3T. The TRU oxide fuel present in the upper fissile zone 6 and lower fissile zone 8 includes TRU having the composition indicated in Table 12. When the fuel assembly 1T is a new fuel assembly, the ratio of Pu-239 in all TRU elements is 11.0 wt %.

The core flow rate control apparatus 33 sets a set core flow rate, which is determined from ratio information (11.0 wt %) and the characteristics shown in FIG. 2. The core flow rate control apparatus 33 controls the internal pump 26 and increases the core flow rate until it reaches the set core flow rate. The core flow rate is maintained at the set flow rate until the BWR 19 is shut down in the operation cycle.

In the present embodiment as well, adjustment is performed so that the set core flow rate determined by the ratio of Pu-239 in TRU in the new fuel assembly 1T loaded in the core, which is 11.0 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1T taken out of the core can have less TRU than the new fuel assembly 1T.

According to the present embodiment, the BWR 19 generating a 1350 MW electric power, which is the same as the electric power of a current ABWR, by using a reactor pressure vessel having almost the same size as the ABWR can attain a discharge burnup of 65 GWd/t for the core. In the present embodiment, the fission efficiency of TRU is 50%, the void coefficient is $-2 \times 10^{-4}$ Δk/k/% void, MCPR is 1.3, the TRU isotope ratio conservation can be achieved, and the amount of TRU can be reduced.

Thirteenth Embodiment

A light water reactor according to a thirteenth embodiment which is another embodiment of the present invention will be described below in detail with reference to FIG. 42 as well as Table 1. The light water reactor of the present embodiment has a structure in which the fuel assembly 1 disposed in the core 20 in the first embodiment is replaced with a fuel assembly 1U shown in FIG. 42. Other structures of the core of the present embodiment are the same as in the first embodiment. In the present embodiment, only structures different from the first embodiment will be described. The core used in the present embodiment is also a parfait-type core.

Figure 42:
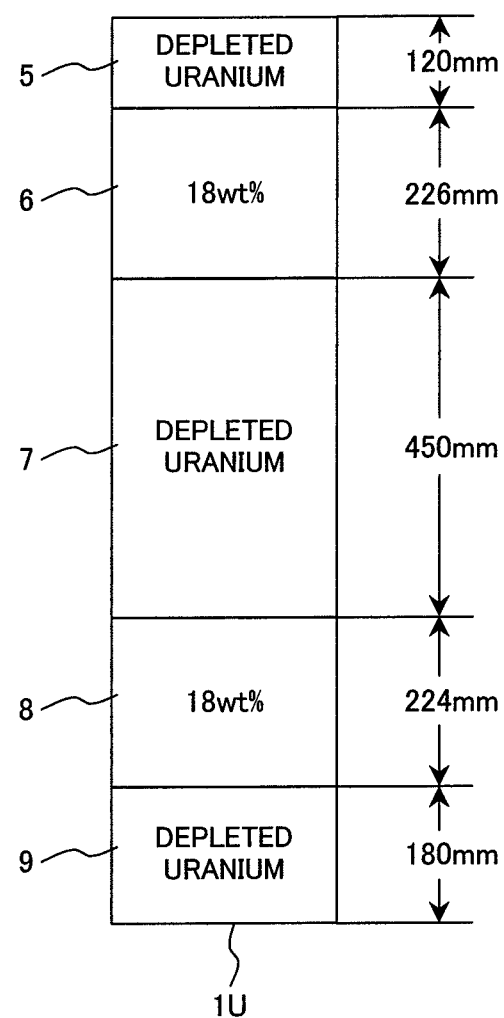
FIG. 42 is an explanatory drawing showing an enrichment distribution of fissionable Pu in a new fuel assembly, in its axial direction, which is to be loaded in a core of the light water reactor according to a thirteenth embodiment which is another embodiment of the present invention.

The fuel assembly 1U is formed by arranging the five zones in the fuel assembly 1 as shown in FIG. 42. The fuel assembly 1U has the same structure as the fuel assembly 1. In the fuel assembly 1U, the upper blanket zone 5 is 120 mm high, the upper fissile zone 6 is 226 mm high, the internal blanket zone 7 is 450 mm high, the lower fissile zone 8 is 224 mm high, and the lower blanket zone 9 is 180 mm high. When the fuel assembly 1U is a new fuel assembly with a burnup of 0, each fuel rod of the fuel assembly 1U is loaded with depleted uranium in the three blanket zones and with mixed oxide fuel in the upper fissile zone 6 and lower fissile zone 8, the mixed oxide fuel including 172 parts by weight of depleted uranium per 100 parts by weight of TRU. The enrichment of fissionable Pu in the TRU oxide fuel is 18 wt %. The blanket zones are not loaded with TRU. The fuel assembly 1U also includes fuel rods 3A to 3E. The mixed oxide fuel present in the upper fissile zone 6 and lower fissile zone 8 includes TRU having the composition indicated in Table 1. When the fuel assembly 1U is a new fuel assembly, the ratio of Pu-239 in all TRU elements is 44 wt %.

The core flow rate control apparatus 33 sets a set core flow rate, which is determined from ratio information (44 wt %) and the characteristics shown in FIG. 2. The core flow rate control apparatus 33 controls the internal pump 26 and increases the core flow rate until it reaches the set core flow rate. The core flow rate is maintained at the set core flow rate until the BWR 19 is shut down in the operation cycle.

In the present embodiment as well, adjustment is performed so that the set core flow rate determined by the ratio of Pu-239 in TRU in the new fuel assembly 1U loaded in the core, which is 44 wt %, is reached, so the TRU isotope ratio conservation can be implemented as in the first embodiment. In the present embodiment, therefore, the burnup can be further increased and TRU multi-recycling becomes feasible. In the present embodiment, the fuel assembly 1U taken out of the core can have less TRU than the new fuel assembly 1U.

According to the present embodiment, the BWR 19 generating a 1350 MW electric power, which is the same as the electric power of a current ABWR, by using a reactor pressure vessel having almost the same size as the ABWR can achieve a discharge burnup of 45 GWd/t in a core zone including the upper and lower fissile zones and the internal blanket zone excluding the upper and lower blanket zones, a discharge burnup of 52 GWd/t in the core zone, which is larger than the burnup in the breeder reactor in the light water reactor described in JP 3428150 B, and a burnup of 45 GWd/t in the core including the upper and lower blanket zones. In the present embodiment, MCPR is 1.3, the void coefficient is $-2 \times 10^{-5}$ Δk/k/% void, the TRU isotope ratio conservation can be achieved while the absolute value of the negative void coefficient value is greater than in the first embodiment, and a breeding ratio of 1.01 can be attained.

What is claimed is:

1. A boiling water reactor, comprising:
   a reactor pressure vessel;
   a core disposed in said reactor pressure vessel and loaded with a plurality of fuel assemblies including transuranic nuclides; and
   a coolant supplying apparatus which supplies a coolant to said core,
   wherein a ratio of Pu-239 in all of said transuranic nuclides included in said fuel assembly, which is loaded in said core, with a burnup of 0 is 3% or more but 45% or less; and
   in said fuel assembly having a channel box and a plurality of fuel rods disposed in said channel box, a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

2. The boiling water reactor according to claim 1, wherein said ratio of Pu-239 in all of said transuranic nuclides is 40% or more but 45% or less.

3. The boiling water reactor according to claim 1, wherein said ratio of Pu-239 in all of said transuranic nuclides is 3% or more but less than 40%.

4. The boiling water reactor according to claim 1, wherein said core is a parfait core being disposed axially an upper blanket zone, an upper fissile zone, an internal blanket zone, a lower fissile zone, and a lower blanket zone in turn from a top thereof.

5. The boiling water reactor according to claim 1, wherein said core is a one fissile zone core being disposed axially an upper blanket zone, a fissile zone, and a lower blanket zone in turn from a top thereof.

6. The boiling water reactor according to claim 1, wherein said ratio of Pu-239 in all of said transuranic nuclides included in said fuel assembly with said burnup of 0 is 3% or more but 15% or less.

7. The boiling water reactor according to claim 1, wherein said channel box is a hexagonal channel box and the transverse cross section of the unit fuel rod lattice which includes the portion of the moderator surrounding said fuel rod in said hexagonal channel box is a hexagonal transverse cross section.

8. The boiling water reactor according to claim 7, wherein the hexagonal transverse cross section of the unit fuel rod lattice includes the transverse cross section of a substantially circular cross section of said fuel rod and a surrounding region of the moderator surrounding said fuel rod in a hexagonal shape in cross section.

9. A boiling water reactor, comprising:
a reactor pressure vessel;
a core disposed in said reactor pressure vessel and loaded with a plurality of fuel assemblies including transuranic nuclides; and
a coolant supplying apparatus which supplies a coolant to said core,
wherein a ratio of Pu-239 in all Pu elements included in said fuel assembly, which is loaded in said core, with a burnup of 0 is 3% or more but 50% or less, and a ratio of Pu-240 in said all Pu elements is 35% or more but 45% or less; and
in said fuel assembly having a channel box and a plurality of fuel rods disposed in said channel box, a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

10. The boiling water reactor according to claim 9, wherein said ratio of Pu-239 in all of said transuranic nuclides is 40% or more but 45% or less.

11. The boiling water reactor according to claim 9, wherein said ratio of Pu-239 in all of said transuranic nuclides is 3% or more but less than 40%.

12. The boiling water reactor according to claim 9, wherein said core is a parfait core being disposed axially an upper blanket zone, an upper fissile zone, an internal blanket zone, a lower fissile zone, and a lower blanket zone in turn from a top thereof.

13. The boiling water reactor according to claim 9, wherein said core is a one fissile zone core being disposed axially an upper blanket zone, a fissile zone, and a lower blanket zone in turn from a top thereof.

14. The boiling water reactor according to claim 9, wherein said ratio of Pu-239 in all of said transuranic nuclides included in said fuel assembly with said burnup of 0 is 3% or more but 15% or less.

15. The boiling water reactor according to claim 9, wherein said channel box is a hexagonal channel box and the transverse cross section of the unit fuel rod lattice which includes the portion of the moderator surrounding said fuel rod in said hexagonal channel box is a hexagonal transverse cross section.

16. The boiling water reactor according to claim 15, wherein the hexagonal transverse cross section of the unit fuel rod lattice includes the transverse cross section of a substantially circular cross section of said fuel rod and a surrounding region of the moderator surrounding said fuel rod in a hexagonal shape in cross section.

17. A boiling water reactor comprising:
a reactor pressure vessel;
a core disposed in said reactor pressure vessel and loaded with a plurality of fuel assemblies including transuranic nuclides;
a coolant supplying apparatus which supplies a coolant within said reactor pressure vessel to said core by pressurizing said coolant; and
a coolant flow rate control apparatus which adjusts a flow rate of the coolant supplied to said core by controlling said coolant supplying apparatus, and said coolant flow rate control apparatus setting a coolant flow rate in an operation cycle to a set coolant flow rate which is determined based on a ratio of Pu-239 in transuranic nuclides included in said fuel assembly with a burnup of 0, which is loaded in said core before an operation starts in said operation cycle, so that ratios of a plurality of isotopes of transuranic nuclides present in said core upon the completion of said operation in said operation cycle are substantially the same as ratios of said plurality of isotopes in a state in which said operation in said operation cycle can be started;
wherein said ratio of Pu-239 in all of said transuranic nuclides included in said fuel assembly with a burnup of 0 is 3% or more but 45% or less; and
wherein in said fuel assembly having a channel box and a plurality of fuel rods disposed in said channel box, a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

18. The boiling water reactor according to claim 17, wherein said ratio of Pu-239 in all of said transuranic nuclides is 40% or more but 45% or less.

19. The boiling water reactor according to claim 17, wherein said ratio of Pu-239 in all of said transuranic nuclides is 3% or more but less than 40%.

20. The boiling water reactor according to claim 17, wherein said ratio of Pu-239 in all of said transuranic nuclides included in said fuel assembly with said burnup of 0 is 3% or more but 15% or less.

21. The boiling water reactor according to claim 20, wherein said core is a parfait core being disposed axially an upper blanket zone, an upper fissile zone, an internal blanket zone, a lower fissile zone, and a lower blanket zone in turn from a top thereof.

22. The boiling water reactor according to claim 20,
wherein the state in which said ratios of said plurality of isotopes of transuranic nuclides present in said core upon the completion of said operation in said operation cycle are substantially the same as ratios of said plurality of isotopes in a state in which said operation in said operation cycle can be started, is a state in which ratios of a plurality of isotopes of transuranic nuclides present in said fuel assembly taken out of said core are substantially the same as ratios of said plurality of isotopes present in said fuel assembly with a burnup of 0, which is to be loaded in said core.

23. The boiling water reactor according to claim 17,
wherein said core is a parfait core being disposed axially an upper blanket zone, an upper fissile zone, an internal blanket zone, a lower fissile zone, and a lower blanket zone in turn from a top thereof.

24. The boiling water reactor according to claim 17,
wherein said core is a one fissile zone core being disposed axially an upper blanket zone, a fissile zone, and a lower blanket zone in turn from a top thereof.

25. The boiling water reactor according to claim 17, further comprising:
a plurality of control rods; and
a control rod drive control apparatus which controls an operation of said control rods based on a measured reactor power.

26. The boiling water reactor according to claim 17, wherein said channel box is a hexagonal channel box and the transverse cross section of the unit fuel rod lattice which includes the portion of the moderator surrounding said fuel rod in said hexagonal channel box is a hexagonal transverse cross section.

27. The boiling water reactor according to claim 26, wherein the hexagonal transverse cross section of the unit fuel rod lattice includes the transverse cross section of a substantially circular cross section of said fuel rod and a surrounding region of the moderator surrounding said fuel rod in a hexagonal shape in cross section.

28. A core of a boiling water reactor, having a plurality of fuel assemblies including a plurality of isotopes of transuranic nuclides,
wherein a ratio of Pu-239 in all of said transuranic nuclides included in said fuel assembly loaded in said core with a burnup of 0, is 3% or more but 45% or less;
wherein said fuel assembly has a channel box and a plurality of fuel rods disposed in said channel box; and
wherein a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

29. The core of a boiling water reactor according to claim 28,
wherein said ratio of Pu-239 in all of said transuranic nuclides is 40% or more but 45% or less.

30. The core of a boiling water reactor according to claim 28,
wherein said ratio of Pu-239 in all of said transuranic nuclides is 3% or more but less than 40%.

31. The core of a boiling water reactor according to claims 28,
wherein an upper blanket zone, an upper fissile zone, an internal blanket zone, a lower fissile zone, and a lower blanket zone are axially disposed in turn from a top thereof.

32. The core of a boiling water reactor according to claim 28,
wherein an upper blanket zone, a fissile zone, and a lower blanket zone are axially disposed in turn from a top thereof.

33. The core of a boiling water reactor according to claim 28,
wherein said ratio of Pu-239 in all of said transuranic nuclides included in said fuel assembly with a burnup of 0 is 3% or more but 15% or less.

34. The core of a boiling water reactor according to claim 33,
wherein said core is a parfait core disposing axially an upper blanket zone, an upper fissile zone, an internal blanket zone, a lower fissile zone, and a lower blanket zone in turn from a top thereof.

35. The core of a boiling water reactor according to claim 28, wherein said channel box is a hexagonal channel box and the transverse cross section of the unit fuel rod lattice which includes the portion of the moderator surrounding said fuel rod in said hexagonal channel box is a hexagonal transverse cross section.

36. The core of a boiling water reactor according to claim 35, wherein the hexagonal transverse cross section of the unit fuel rod lattice includes the transverse cross section of a substantially circular cross section of said fuel rod and a surrounding region of the moderator surrounding said fuel rod in a hexagonal shape in cross section.

37. A core of a boiling water reactor having a plurality of fuel assemblies including a plurality of isotopes of transuranic nuclides,
wherein a ratio of Pu-239 in all Pu elements included in said fuel assembly loaded in said core with a burnup of 0 is 3% or more but 50% or less, and a ratio of Pu-240 in said all Pu elements is 35% or more but 45% or less;
wherein said fuel assembly has a channel box and a plurality of fuel rods disposed in said channel box; and
wherein a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

38. The core of a boiling water reactor according to claim 37,
wherein an upper blanket zone, an upper fissile zone, an internal blanket zone, a lower fissile zone, and a lower blanket zone are axially disposed in turn from a top thereof.

39. The core of a boiling water reactor according to claim 38,
wherein an upper blanket zone, a fissile zone, and a lower blanket zone are axially disposed in turn from a top thereof.

40. The core of a boiling water reactor according to claim 38,
wherein said ratio of Pu-239 in all of said transuranic nuclides included in said fuel assembly with a burnup of 0 is 3% or more but 15% or less.

41. The core of a boiling water reactor according to claim 40,
wherein said core is a parfait core disposing axially an upper blanket zone, an upper fissile zone, an internal blanket zone, a lower fissile zone, and a lower blanket zone in turn from a top thereof.

42. The boiling water reactor according to claim 37, wherein said ratio of Pu-239 in all of said transuranic nuclides is 40% or more but 45% or less.

43. The core of a boiling water reactor according to claim 37, wherein said channel box is a hexagonal channel box and the transverse cross section of the unit fuel rod lattice which includes the portion of the moderator surrounding said fuel rod in said hexagonal channel box is a hexagonal transverse cross section.

44. The core of a boiling water reactor according to claim 43, wherein the hexagonal transverse cross section of the unit fuel rod lattice includes the transverse cross section of a substantially circular cross section of said fuel rod and a surrounding region of the moderator surrounding said fuel rod in a hexagonal shape in cross section.

45. A fuel assembly for a boiling water reactor, comprising:
a channel box; and
a plurality of fuel rods disposed in the channel box, and having nuclear fuel material including a plurality of isotopes of transuranic nuclides,
wherein a ratio of Pu-239 in all of said transuranic nuclides included in said nuclear fuel material is 3% or more but 45% or less when a burnup is 0; and
wherein a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

46. The fuel assembly according to claim 45,
wherein said ratio of Pu-239 in all of said transuranic nuclides is 40% or more but 45% or less when said burnup is 0.

47. The fuel assembly according to claim 45,
wherein said ratio of Pu-239 in all of said transuranic nuclides is 3% or more but less than 40% when said burnup is 0.

48. The fuel assembly according to claim 47,
wherein when said burnup is 0, said ratio of Pu-239 in all of said transuranic nuclides is 3% or more but 15% or less.

49. The fuel assembly according to claim 45,
wherein an upper blanket zone, an upper fissile zone, an internal blanket zone, a lower fissile zone, and a lower blanket zone are axially disposed in an active fuel length in turn from a top thereof.

50. The fuel assembly according to claim 49,
wherein when the burnup is 0, each of said blanket zones includes depleted uranium and does not include said transuranic nuclides, and each of said fissile zones includes said nuclear fuel material including said isotopes.

51. The fuel assembly according to claim 45,
wherein an upper blanket zone, a fissile zone, and a lower blanket zone are axially disposed in an active fuel length in turn from a top thereof.

52. The fuel assembly according to claim 51,
wherein when the burnup is 0, each of said blanket zones includes depleted uranium and does not include said transuranic nuclides, and each of said fissile zones includes said nuclear fuel material including said isotopes.

53. The fuel assembly according to claim 45,
wherein ratios of said plurality of isotopes of said transuranic nuclides included in said nuclear fuel material when said fuel assembly is taken out of a core are substantially the same as ratios of said plurality of isotopes included in said nuclear fuel material when said fuel assembly is loaded in said core and has a burnup of 0.

54. The fuel assembly according to claim 45, wherein said channel box is a hexagonal channel box and the transverse cross section of the unit fuel rod lattice which includes the portion of the moderator surrounding said fuel rod in said hexagonal channel box is a hexagonal transverse cross section.

55. The fuel assembly according to claim 54, wherein the hexagonal transverse cross section of the unit fuel rod lattice includes the transverse cross section of a substantially circular cross section of said fuel rod and a surrounding region of the moderator surrounding said fuel rod in a hexagonal shape in cross section.

56. A fuel assembly for a boiling water reactor, comprising:
a channel box; and
a plurality of fuel rods disposed in the channel box, and having nuclear fuel material including a plurality of isotopes of transuranic nuclides;
wherein a ratio of Pu-239 in all Pu elements included in said nuclear fuel material is 3% or more but 50% or less when a burnup is 0;
wherein a ratio of Pu-240 in said all Pu elements is 35% or more but 45% or less when said burnup is 0; and
wherein a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

57. The fuel assembly according to claim 56,
wherein an upper blanket zone, an upper fissile zone, an internal blanket zone, a lower fissile zone, and a lower blanket zone are axially disposed in an active fuel length in turn from a top thereof.

58. The fuel assembly according to claim 57,
wherein when the burnup is 0, each of said blanket zones includes depleted uranium and does not include said transuranic nuclides, and each of said fissile zones includes said nuclear fuel material including said isotopes.

59. The fuel assembly according to claim 56,
wherein an upper blanket zone, a fissile zone, and a lower blanket zone are axially disposed in an active fuel length in turn from a top thereof.

60. The fuel assembly according to claim 59,
wherein when the burnup is 0, each of said blanket zones includes depleted uranium and does not include said transuranic nuclides, and each of said fissile zones includes said nuclear fuel material including said isotopes.

61. The fuel assembly according to claim 59,
wherein ratios of said plurality of isotopes of said transuranic nuclides being included in said nuclear fuel material when said fuel assembly is taken out of a core are substantially the same as ratios of said plurality of isotopes being included in said nuclear fuel material when said fuel assembly is loaded in said core and has a burnup of 0.

62. The fuel assembly according to claim 56, wherein said ratio of Pu-239 in all of said transuranic nuclides is 40% or more but 45% or less.

63. The fuel assembly according to claim 56, wherein said ratio of Pu-239 in all of said transuranic nuclides is 3% or more but less than 40%.

64. The fuel assembly according to claim 56, wherein said ratio of Pu-239 in all of said transuranic nuclides included in said fuel assembly with said burnup of 0 is 3% or more but 15% or less.

65. The fuel assembly according to claim 56, wherein said channel box is a hexagonal channel box and the transverse cross section of the unit fuel rod lattice which includes the portion of the moderator surrounding said fuel rod in said hexagonal channel box is a hexagonal transverse cross section.

66. The fuel assembly according to claim 65, wherein the hexagonal transverse cross section of the unit fuel rod lattice includes the transverse cross section of a substantially circular cross section of said fuel rod and a surrounding region of a moderator surrounding said fuel rod in a hexagonal shape in cross section.

67. A boiling water reactor comprising:
a reactor pressure vessel;
a core disposed in said reactor pressure vessel and loaded with a plurality of fuel assemblies including transuranic nuclides; and
a coolant supplying apparatus which supplies a coolant to said core by pressurizing said coolant; and
a coolant flow rate control apparatus which adjusts a flow rate of the coolant supplied to said core by controlling said coolant supplying apparatus, and said coolant flow rate control apparatus sets a coolant flow rate in an operation cycle to a set coolant flow rate which is determined based on a ratio of Pu-239 in transuranic nuclides included in said fuel assembly with a burnup of 0, which is loaded in said core before an operation starts in said operation cycle, so that ratios of a plurality of isotopes of transuranic nuclides present in said core upon the completion of said operation in said operation cycle are substantially the same as ratios of said plurality of isotopes in a state in which said operation in said operation cycle can be started;

wherein a ratio of Pu-239 in all Pu elements included in said fuel assembly, which is loaded in said core, with a burnup of 0 is 3% or more but 50% or less;
wherein a ratio of Pu-240 in said all Pu elements is 35% or more but 45% or less;
wherein said fuel assembly has a channel box and a plurality of fuel rods disposed in said channel box; and
wherein a transverse cross section of a fuel pellet in said fuel rod occupies 30% or more but 55% or less of a transverse cross section of a unit fuel rod lattice in said channel box, the transverse cross section of the unit fuel rod lattice in said channel box including a transverse cross section of said fuel rod and a transverse cross section of a portion of a moderator surrounding said fuel rod in said channel box.

68. The boiling water reactor according to claim 67,
wherein said ratio of Pu-239 in all of said transuranic nuclides is 40% or more but 45% or less.

69. The boiling water reactor according to claim 67,
wherein said ratio of Pu-239 in all of said transuranic nuclides is 3% or more but less than 40%.

70. The boiling water reactor according to claim 67, wherein said core is a parfait core being disposed axially an upper blanket zone, an upper fissile zone, an internal blanket zone, a lower fissile zone, and a lower blanket zone in turn from a top thereof.

71. The boiling water reactor according to claim 67, wherein said core is a one fissile zone core being disposed axially an upper blanket zone, a fissile zone, and a lower blanket zone in turn from a top thereof.

72. The boiling water reactor according to claim 67,
wherein said ratio of Pu-239 in all of said transuranic nuclides included in said fuel assembly with said burnup of 0 is 3% or more but 15% or less.

73. The boiling water reactor according to claim 67, wherein said channel box is a hexagonal channel box and the transverse cross section of the unit fuel rod lattice which includes the portion of the moderator surrounding said fuel rod in said hexagonal channel box is a hexagonal transverse cross section.

74. The boiling water reactor according to claim 73, wherein the hexagonal transverse cross section of the unit fuel rod lattice includes the transverse cross section of a substantially circular cross section of said fuel rod and a surrounding region of a moderator surrounding said fuel rod in a hexagonal shape in cross section.

* * * * *